US006758089B2

(12) United States Patent
Breed et al.

(10) Patent No.: US 6,758,089 B2
(45) Date of Patent: Jul. 6, 2004

(54) WIRELESS SENSING AND COMMUNICATION SYSTEM OF ROADWAYS

(75) Inventors: David S. Breed, Boonton Township, Morris County, NJ (US); Wilbur E. DuVall, Kimberling City, MO (US); Wendell C. Johnson, Signal Hill, CA (US)

(73) Assignee: Intelligent Technologies International Inc., Denville, NJ (US)

(*) Notice: Subject to any disclaimer, the term of this patent is extended or adjusted under 35 U.S.C. 154(b) by 29 days.

(21) Appl. No.: 10/190,805

(22) Filed: Jul. 8, 2002

(65) Prior Publication Data

US 2003/0005759 A1 Jan. 9, 2003

Related U.S. Application Data

(60) Provisional application No. 60/304,011, filed on Jul. 9, 2001.

(51) Int. Cl.$^{7}$ .......................... E01C 23/00; G01M 17/02
(52) U.S. Cl. .......................................... 73/146; 340/901
(58) Field of Search ............................... 73/146, 146.2, 73/146.3, 146.4, 146.5, 146.8; 340/901, 905

(56) References Cited

U.S. PATENT DOCUMENTS

| | | | | |
|---|---|---|---|---|
| 5,289,183 A | * | 2/1994 | Hassett et al. | 340/905 |
| 5,801,647 A | * | 9/1998 | Survo et al. | 340/905 |
| 5,829,782 A | | 11/1998 | Breed et al. | 280/735 |
| 5,852,243 A | * | 12/1998 | Chang et al. | 73/659 |
| 5,943,295 A | | 8/1999 | Varga et al. | 367/99 |
| 6,161,071 A | * | 12/2000 | Shuman et al. | 701/48 |
| 6,301,544 B1 | * | 10/2001 | Sonderegger | 701/117 |
| 6,345,228 B1 | * | 2/2002 | Lees | 701/117 |
| 6,370,475 B1 | | 4/2002 | Breed et al. | 701/301 |
| 6,441,748 B1 | * | 8/2002 | Takagi et al. | 340/901 |

FOREIGN PATENT DOCUMENTS

WO 0150088 7/2001

OTHER PUBLICATIONS

SRI International, Centimeter–Level GPS for Highway Systems, J.W. Sinko et al., Jul., 1998.

(List continued on next page.)

*Primary Examiner*—Edward Lefkowitz
*Assistant Examiner*—Andre Allen
(74) *Attorney, Agent, or Firm*—Brian Roffe

(57) ABSTRACT

Wireless sensing and communication system including sensors located on the vehicle, in the roadway or in the vicinity of the vehicle or roadway and which provide information which is transmitted to one or more interrogators in the vehicle by a wireless radio frequency mechanism. Power to operate a particular sensor is supplied by the interrogator or the sensor is independently connected to either a battery, generator, vehicle power source or some source of power external to the vehicle. The sensors can provide information about the vehicle and its interior or exterior environment, about individual components, systems, vehicle occupants, subsystems, or about the roadway, ambient atmosphere, travel conditions and external objects. The sensors arranged on the roadway or ancillary structures would include pressure sensors, temperature sensors, moisture content or humidity sensors, and friction sensors.

54 Claims, 26 Drawing Sheets

OTHER PUBLICATIONS

SRI International, An Evolutionary Automated Highway System Concept Based on GPS, J.W. Sinko, Sep., 1996 (p. 5, second column to p. 7).

SRI International, Using GPS for Automated Vehicle Convoying, T.M. Nguyen, Sep. 1998.

V. Morellas et al., Preview Based Control of a Tractor Trailer Using DGPS for Preventing Road Departure Accidents, 1998 IEEE International Conference on Intelligent Vehicles, pp. 797–805.

S. Bajikar et al., Evaluation of In–Vehicle GPS–Based Lane Position Sensing for Preventing Road Departure, 1998 IEEE International Conference on Intelligent Vehicle, pp. 397–402.

B. Schiller et al., Collision Avoidance for Highway Vehicles Using the Virtual Bumper Controller, 1998 IEEE International Conference on Intelligent Vehicles, pp. 149–155.

M. O'Shea and V. Shuman, Looking Ahead: Map Database in Predictive Positioning and Safety Systems.

J. Pierowicz, Use of Map Data Information in an On–Board Intersection Violation Detection System, 1998 IEEE.

Goran M. Djuknic and Robert E. Richton, Geolocation and Assisted GPS, Feb. 2001.

* cited by examiner

Prior Art

Prior Art

WIRELESS SENSING AND COMMUNICATION SYSTEM OF ROADWAYS

CROSS REFERENCE TO RELATED APPLICATION

This application claims priority under 35 U.S.C. §119(e) of U.S. provisional patent application Ser. No. 60/304,011 filed Jul. 9, 2001.

This application is related to, on the grounds that it includes common subject matter, U.S. patent application Ser. No. 09/765,558 filed Jan. 19, 2001 and U.S. patent application Ser. No. 10/079,065 filed Feb. 19, 2002.

FIELD OF THE INVENTION

The invention relates to the field of vehicular sensor systems and more particularly, to the field of wireless sensing and communications for sensing conditions of a roadway and the environment surrounding the roadway.

BACKGROUND OF THE INVENTION

This invention is related to the use of sensors arranged in fixed locations in conjunction with roadways, e.g., embedded in the roadway or ancillary structures, to enable information about the roadway and its environment to be obtained from the presence of these sensors and the information provided by the sensors to be considered in the operation of the vehicle and in the actions to be undertaken to alter the conditions of the roadway, if appropriate.

The invention is also related to the monitoring of vehicular components, systems and subsystems as well as to the measurement of physical and chemical characteristics relating to the vehicle or its components, systems and subsystems and using the measurements to control and/or affect one or more vehicular system. Some of the systems which are monitored include the tires.

With respect to monitoring of the tires, such tire monitoring is extremely important since NHTSA (National Highway Traffic Safety Administration) has recently linked 148 deaths and more than 525 injuries in the United States to separations, blowouts and other tread problems in Firestone's ATX, ATX II and Wilderness AT tires, 5 million of which were recalled in 2000. Many of the tires were standard equipment on the Ford Explorer. Ford recommends that the Firestone tires on the Explorer sport utility vehicle be inflated to 26 psi, while Firestone recommends 30 psi. It is surprising that a tire can go from a safe condition to an unsafe condition based on an under inflation of 4 psi.

Recent studies in the United States conducted by the Society of Automotive Engineers show that low tire pressure causes about 260,000 accidents annually. Another finding is that about 75% of tire failures each year are preceded by slow air leaks or inadequate tire inflation. Nissan, for example, warns that incorrect tire pressures can compromise the stability and overall handling of a vehicle and can contribute to an accident. Additionally, most non-crash auto fatalities occur while drivers are changing flat tires. Thus, tire failures are clearly a serious automobile safety problem that requires a solution.

About 16% of all car accidents are a result of incorrect tire pressure. Thus, effective pressure and wear monitoring is extremely important. Motor Trend magazine stated that one of the most overlooked maintenance areas on a car is tire pressure. An estimated 40 to 80 percent of all vehicles on the road are operating with under-inflated tires. When under-inflated, a tire tends to flex its sidewall more, increasing its rolling resistance which decreases fuel economy. The extra flex also creates excessive heat in the tire that can shorten its service life.

The Society of Automotive Engineers reports that about 87 percent of all flat tires have a history of under-inflation. About 85% of pressure loss incidents are slow punctures caused either by small-diameter objects trapped in the tire or by larger diameter nails. The leak will be minor as long as the nail is trapped. If the nail comes out, pressure can decrease rapidly. Incidents of sudden pressure loss are potentially the most dangerous for drivers and account for about 15% of all cases.

A properly inflated tire loses approximately 1 psi per month. A defective time can lose pressure at a more rapid rate. About 35 percent of the recalled Bridgestone tires had improper repairs.

Research from a variety of sources suggests that under-inflation can be significant to both fuel economy and tire life. Industry experts have determined that tires under-inflated by a mere 10% wear out about 15% faster. An average driver with an average set of tires can drive an extra 5,000 to 7,000 miles before buying new tires by keeping the tire properly inflated.

The American Automobile Association has determined that under inflated tires cut a vehicle's fuel economy by as much as 2% per psi below the recommended level. If each of a car's tires is supposed to have a pressure of 30 psi and instead has a pressure of 25 psi, the car's fuel efficiency drops by about 10%. Depending on the vehicle and miles driven that could cost from $100 to $500 a year.

The ability to control a vehicle is strongly influenced by tire pressure. When the tire pressure is kept at proper levels, optimum vehicle braking, steering, handling and stability are accomplished. Low tire pressure can also lead to damage to both the tires and wheels.

A Michelin study revealed that the average driver doesn't recognize a low tire until it's 14 psi too low. One of the reasons is that today's radial tire is hard to judge visually because the sidewall flexes even when properly inflated.

Despite all the recent press about keeping tires properly inflated, new research shows that most drivers do not know the correct inflation pressure. In a recent survey, only 45 percent of respondents knew where to look to find the correct pressure, even though 78 percent thought they knew. Twenty-seven percent incorrectly believed the sidewall of the tire carries the correct information and did not know that the sidewall only indicates the maximum pressure for the tire, not the optimum pressure for the vehicle. In another survey, about 60% of the respondents reported that they check tire pressure but only before going on a long trip. The National Highway Traffic Safety Administration estimates that at least one out of every five tires is not properly inflated.

The problem is exacerbated with the new run-flat tires where a driver may not be aware that a tire is flat until it is destroyed. Run-flat tires can be operated at air pressures below normal for a limited distance and at a restricted speed (125 miles at a maximum of 55 mph). The driver must therefore be warned of changes in the condition of the tires so that she can adapt her driving to the changed conditions.

One solution to this problem is to continuously monitor the pressure and perhaps the temperature in the tire. Pressure loss can be automatically detected in two ways: by directly measuring air pressure within the tire or by indirect tire rotation methods. Various indirect methods are based on the number of revolutions each tire makes over an extended period of time through the ABS system and others are based on monitoring the frequency changes in the sound emitted by the tire. In the direct detection case, a sensor is mounted into each wheel or tire assembly, each with its own identity. An on-board computer collects the signals, processes and displays the data and triggers a warning signal in the case of pressure loss.

Under-inflation isn't the only cause of sudden tire failure. A variety of mechanical problems including a bad wheel bearing or a "dragging" brake can cause the tire to heat up and fail. In addition, as may have been a contributing factor in the Firestone case, substandard materials can lead to intra-tire friction and a buildup of heat. The use of re-capped truck tires is another example of heat caused failure as a result by intra-tire friction. An overheated tire can fail suddenly without warning.

As discussed in more detail below, tire monitors, such as those disclosed below, permit the driver to check the vehicle tire pressures from inside the vehicle.

The *Transportation Recall Enhancement, Accountability, and Documentation Act,* (H.R. 5164, or Public Law No. 106–414) known as the TREAD Act, was signed by President Clinton on Nov. 1, 2000. Section 12, TIRE PRESSURE WARNING, states that: "Not later than one year after the date of enactment of this Act, the Secretary of Transportation, acting through the National Highway Traffic Safety Administration, shall complete a rulemaking for a regulation to require a warning system in a motor vehicle to indicate to the operator when a tire is significantly under-inflated. Such requirement shall become effective not later than 2 years after the date of the completion of such rulemaking." Thus, it is expected that a rule requiring continuous tire monitoring will take effect for the 2004 model year.

This law will dominate the first generation of such systems as automobile manufacturers move to satisfy the requirement. In subsequent years, more sophisticated systems that in addition to pressure will monitor temperature, tire footprint, wear, vibration, etc. Although the Act requires that the tire pressure be monitored, it is believed by the inventors that other parameters are as important as the tire pressure or even more important than the tire pressure as described in more detail below.

Consumers are also in favor of tire monitors. Johnson Controls' market research showed that about 80 percent of consumers believe a low tire pressure warning system is an important or extremely important vehicle feature. Thus, as with other safety products such as airbags, competition to meet customer demands will soon drive this market.

Although, as with most other safety products, the initial introductions will be in the United States, speed limits in the United States and Canada are sufficiently low that tire pressure is not as critical an issue as in Europe, for example, where the drivers often drive much faster.

The advent of microelectromechanical (MEMS) pressure sensors, especially those based on surface acoustical wave (SAW) technology, has now made the wireless and powerless monitoring of tire pressure feasible. This is the basis of the tire pressure monitors described below. According to a Frost and Sullivan report on the U.S. Micromechanical Systems (MEMS) market (June 1997): "A MEMS tire pressure sensor represents one of the most profound opportunities for MEMS in the automotive sector.

Prior to discussing the invention, some prior art will be discussed.

There are many wireless tire temperature and pressure monitoring systems disclosed in the prior art patents such as for example, U.S. Pat. Nos. 4,295,102, 4,296,347, 4,317,372, 4,534,223, 5,289,160, 5,612,671, 5,661,651, 5,853,020 and 5,987,980 and International Publication No. WO 01/07271(A1), all of which are illustrative of the state of the art of tire monitoring and are incorporated by reference herein.

Devices for measuring the pressure and/or temperature within a vehicle tire directly can be categorized as those containing electronic circuits and a power supply within the tire, those which contain electronic circuits and derive the power to operate these circuits either inductively, from a generator or through radio frequency radiation, and those that do not contain electronic circuits and receive their operating power only from received radio frequency radiation. For the reasons discussed above, the discussion herein is mainly concerned with the latter category. This category contains devices that operate on the principles of surface acoustic waves (SAW) and the disclosure below is concerned primarily with such SAW devices.

International Publication No. WO 01/07271 describes a tire pressure sensor that replaces the valve and valve stem in a tire.

U.S. Pat. No. 5,231,827 contains a good description and background of the tire-monitoring problem. The device disclosed, however, contains a battery and electronics and is not a SAW device. Similarly, the device described in U.S. Pat. No. 5,285,189 contains a battery as do the devices described in U.S. Pat. Nos. 5,335,540 and 5,559,484. U.S. Pat. No. 5,945,908 applies to a stationary tire monitoring system and does not use SAW devices.

One of the first significant SAW sensor patents is U.S. Pat. No. 4,534,223. This patent describes the use of SAW devices for measuring pressure and also a variety of methods for temperature compensation but does not mention wireless transmission.

U.S. Pat. No. 5,987,980 describes a tire valve assembly using a SAW pressure transducer in conjunction with a sealed cavity. This patent does disclose wireless transmission. The assembly includes a power supply and thus this also distinguishes it from a preferred system of this invention. It is not a SAW system and thus the antenna for interrogating the device in this design must be within one meter, which is closer than needed for a preferred device of this invention.

U.S. Pat. No. 5,698,786 relates to the sensors and is primarily concerned with the design of electronic circuits in an interrogator. U.S. Pat. No. 5,700,952 also describes circuitry for use in the interrogator to be used with SAW devices. In neither of these patents is the concept of using a SAW device in a wireless tire pressure monitoring system described. These patents also do not describe including an identification code with the temperature and/or pressure measurements in the sensors and devices.

U.S. Pat. No. 5,804,729 describes circuitry for use with an interrogator in order to obtain more precise measurements of the changes in the delay caused by the physical or chemical property being measured by the SAW device. Similar comments apply to U.S. Pat. No. 5,831,167. Other related prior art includes U.S. Pat. No. 4,895,017.

Other patents disclose the placement of an electronic device in the sidewall or opposite the tread of a tire but they do not disclose either an accelerometer or a surface acoustic wave device. In most cases, the disclosed system has a battery and electronic circuits.

One method of measuring pressure that is applicable to this invention is disclosed in V. V. Varadan, Y. R. Roh and V. K. Varadan "Local/Global SAW Sensors for Turbulence", IEEE 1989 Ultrasonics Symposium p. 591–594 makes use of a polyvinylidene fluoride (PVDF) piezoelectric film to measure pressure. Mention is made in this article that other piezoelectric materials can also be used. Experimental results are given where the height of a column of oil is measured based on the pressure measured by the piezoelectric film used as a SAW device. In particular, the speed of the surface acoustic wave is determined by the pressure exerted by the oil on the SAW device. For the purposes of the instant invention, air pressure can also be measured in a similar manner by first placing a thin layer of a rubber material onto the surface of the SAW device which serves as a coupling agent from the air pressure to the SAW surface. In this manner, the absolute pressure of a tire, for example, can be measured without the need for a diaphragm and reference pressure greatly simplifying the pressure measurement. Other examples of the use of PVDF film as a pressure transducer can be found in U.S. Pat. Nos. 4,577,510 and 5,341,687, which are incorporated by reference herein, although they are not used as SAW devices.

The following U.S. patents provide relevant information to this invention, and to the extent necessary, all of them are incorporated by reference herein: U.S. Pat. Nos. 4,361,026, 4,620,191, 4,703,327, 4,724,443, 4,725,841, 4,734,698, 5,691,698, 5,841,214, 6,060,815, 6,107,910, 6,114,971, 6,144,332.

In recent years, SAW devices have been used as sensors in a broad variety of applications. Compared with sensors utilizing alternative technologies, SAW sensors possess outstanding properties, such as high sensitivity, high resolution, and ease of manufacturing by microelectronic technologies. However, the most attractive feature of SAW sensors is that they can be interrogated wirelessly. SAW sensors, however, are not believed to have been used before in vehicles or on roadways even though they have been proposed for use as tire pressure and temperature monitors as discussed above.

OBJECTS OF THE INVENTION

It is an object of the invention to provide new and improved sensors for use in conjunction with a passing vehicle which transmit information about a state measured or detected by the sensor or the location of the sensor wirelessly.

It is another object of the invention to incorporate surface acoustic wave technology into sensors for use in conjunction with a vehicle.

Yet another object of the present invention to provide new and improved sensors for detecting the condition or friction of a road surface which utilize wireless data transmission, wireless power transmission, and/or surface acoustic wave technology.

It is another object of the invention to utilize any of the foregoing sensors for a vehicular component control system in which a component, system or subsystem in the vehicle is controlled based on the information provided by the sensor.

A more general object of the invention is to provide new and improved sensors which obtain and provide information about the vehicle, about individual components, systems, vehicle occupants, subsystems, or about the roadway, ambient atmosphere, travel conditions and external objects.

In order to achieve one or more of the objects mentioned above, the wireless sensing and communication system in accordance with the invention includes sensors that are located on the vehicle, in the roadway or in the vicinity of the vehicle or roadway and which provide information which is transmitted to one or more interrogators in the vehicle by a wireless radio frequency means or mechanism, using wireless radio frequency transmission technology. In some cases, the power to operate a particular sensor is supplied by the interrogator while in other cases, the sensor is independently connected to either a battery, generator, vehicle power source or some source of power external to the vehicle.

The sensors for a system installed in a vehicle would likely include tire pressure, temperature and acceleration monitoring sensors, weight or load measuring sensors, switches, temperature, acceleration, angular position, angular rate, angular acceleration, proximity, rollover, occupant presence, humidity, presence of fluids or gases, strain, road condition and friction, chemical sensors and other similar sensors providing information to a vehicle system, vehicle operator or external site. The sensors can provide information about the vehicle and its interior or exterior environment, about individual components, systems, vehicle occupants, subsystems, or about the roadway, ambient atmosphere, travel conditions and external objects.

The sensors arranged on the roadway or ancillary structures would include pressure sensors, temperature sensors, moisture content or humidity sensors, and friction sensors.

The system can use one or more interrogators each having one or more antennas that transmit radio frequency energy to the sensors and receive modulated radio frequency signals from the sensors containing sensor and/or identification information. One interrogator can be used for sensing multiple switches or other devices. For example, an interrogator may transmit a chirp form of energy at 905 MHz to 925 MHz to a variety of sensors located within or in the vicinity of the vehicle. These sensors may be of the RFID electronic type or of the surface acoustic wave (SAW) type. In the electronic type, information can be returned immediately to the interrogator in the form of a modulated RF signal. In the case of SAW devices, the information can be returned after a delay. Naturally, one sensor can respond in both the electronic and SAW delayed modes.

When multiple sensors are interrogated using the same technology, the returned signals from the various sensors can be time, code, space or frequency multiplexed. For example, for the case of the SAW technology, each sensor can be provided with a different delay. Alternately, each sensor can be designed to respond only to a single frequency or several frequencies. The radio frequency can be amplitude or frequency modulated. Space multiplexing can be achieved through the use of two or more antennas and correlating the received signals to isolate signals based on direction.

In general, the sensors will respond with an identification signal followed by or preceded by information relating to the sensed value, state and/or property. In the case of a SAW-based switch, for example, the returned signal may indicate that the switch is either on or off or, in some cases, an intermediate state can be provided signifying that a light should be dimmed, rather than or on or off, for example.

The ability to obtain information about the roadway is important as such information can be transmitted to another vehicle or a remote monitoring location where information from all roadways in a selected area is accumulated. For the purposes herein, remote will mean any location that is not on the vehicle which may be another vehicle, an infrastructure receiver or the like. This will enable highway management personnel to direct traffic, direct snow removal equipment, road sanding/salting equipment to appropriate locations. To this end, the interrogator on the vehicle which receives information from the sensors about the roadway can be coupled to a communications device constructed to transmit the information obtained by the sensors to a remote location. The communications device may comprise a cellular phone, a satellite transmitter or a transmitter capable of sending information over the Internet. In the latter case, the vehicle could be assigned a domain name or e-mail address and would transmit information to a web site or host computer.

In this regard, a driving condition monitoring system for a vehicle on a roadway in accordance with one embodiment of the invention may comprise sensors located on or in a vicinity of the roadway, the sensors being structured and arranged to provide information about the roadway, travel conditions relating to the roadway and external objects on or in the vicinity of the roadway, at least one interrogator arranged on the vehicle for receiving information obtained by the sensors and transmitted by the sensors using a wireless radio frequency mechanism, and a communications device coupled to the interrogator for transmitting the information obtained by the sensors to a remote location. The sensors may be embedded in the roadway, arranged in mounting or structures proximate the roadway and/or arranged to transmit information including an identification. Also, the sensors could be arranged on a pole adjacent the roadway. Possible information obtained from the sensors may include friction of a surface of the roadway, temperature of the roadway and/or moisture content of the roadway.

It is also envisioned that when a location-determining system is arranged on the vehicle for determining the location of the vehicle, using for example GPS technology, the location of the vehicle is also transmitted b the communications device. This will enable the information from the sensors to be more accurately correlated to the geographic location of the conditions being sensed by the sensors.

A method for monitoring driving conditions on a roadway using a vehicle in accordance with the invention comprises the steps of arranging sensors on or in a vicinity of the roadway, each sensors providing information about the roadway, travel conditions relating to the roadway and external objects on or in the vicinity of the roadway, arranging at least one interrogator on the vehicle, and transmitting a signal from the interrogator(s) to cause the sensors to transmit the information using a wireless radio frequency mechanism. The sensors may be arranged as discussed above and information obtained by the sensors transmitted to a remote location via a cellular phone, a satellite or the Internet.

Another embodiment of a driving condition monitoring system for a roadway comprises sensors located on or in a vicinity of the roadway and arranged to generate and transmit information about the roadway, travel conditions relating to the roadway and external objects on or in the vicinity of the roadway, a receiver adapted to be arranged on a vehicle for receiving information generated and transmitted by the sensors, and a transmitter adapted to be arranged on the vehicle for transmitting information received by the receiver to at least one remote location. The sensors may be arranged to transmit information in response to an activation signal, in which case, an interrogator would be arranged on the vehicle for transmitting activation signals. A location-determining system can be arranged on the vehicle for determining the location of the vehicle, in which case, the location of the vehicle is also transmitted with the information from the sensors. The system can also include additional sensors mounted on the vehicle and arranged to generate information on the status of the additional sensors, conditions of an environment around the vehicle, conditions of the vehicle and conditions of any occupants of the vehicle. As such, the transmitter is coupled to these additional sensors and transmits the information generated by the additional sensors.

A method for monitoring driving conditions comprises the steps of arranging sensors on or in a vicinity of the roadway, each sensor generating and transmitting information about the roadway, travel conditions relating to the roadway and external objects on or in the vicinity of the roadway, arranging a receiver on vehicle for receiving information generated and transmitted by the sensors, and transmitting information received by the receiver from the vehicles to at least one remote location. Optionally, an activation signal may be transmitted from the vehicle to cause the sensors to transmit information, e.g., an RFID interrogator signal. A location-determining system could be on the vehicle to determine the location of the vehicle and the location of the vehicle then being transmitted to the remote location. As above, additional sensors may be mounted on the vehicle to generate information on the status of the additional sensors, conditions of an environment around the vehicle, conditions of the vehicle and conditions of any occupants of the vehicle. This information is also transmittable to the remote location.

Great economies are achieved by using a single interrogator or even a small number of interrogators to interrogate many types of devices. For example, a single interrogator may monitor tire pressure and temperature, the weight of an occupying item of the seat, the position of the seat and seatback, as well as a variety of switches controlling windows, door locks, seat position, etc. in a vehicle. Such an interrogator may use one or multiple antennas and when multiple antennas are used, may switch between the antennas depending on what is being monitored.

More particularly, the tire monitoring system of this invention actually comprises three separate systems corresponding to three stages of product evolution. Generation 1 is a tire valve cap that provides information as to the pressure within the tire as described below. Generation 2 requires the replacement of the tire valve stem, or the addition of a new stem-like device, with a new valve stem that also measures temperature and pressure within the tire or it may be a device that attaches to the vehicle wheel rim. Generation 3 is a product that is attached to the inside of the tire adjacent the tread and provides a measure of the diameter of the footprint between the tire and the road, the tire pressure and temperature, indications of tire wear and, in some cases, the coefficient of friction between the tire and the road.

Surface acoustic wave technology permits the measurement of many physical and chemical parameters without the requirement of local power or energy. Rather, the energy to run devices can be obtained from radio frequency electromagnetic waves. These waves excite an antenna that is coupled to the SAW device. Through various means, the properties of the acoustic waves on the surface of the SAW device are modified as a function of the variable to be measured. The SAW device belongs to the field of microelectromechanical systems (MEMS) and can be produced in high-volume at low cost.

For the generation 1 system, a valve cap contains a SAW material at the end of the valve cap, which may be polymer covered. This device senses the absolute pressure in the valve cap. Upon attaching the valve cap to the valve stem, a depressing member gradually depresses the valve permitting the air pressure inside the tire to communicate with a small volume inside the valve cap. As the valve cap is screwed onto the valve stem, a seal prevents the escape of air to the atmosphere. The SAW device is electrically connected to the valve cap, which is also electrically connected to the valve stem that acts as an antenna for transmitting and receiving radio frequency waves. An interrogator located within 20 feet of the tire periodically transmits radio waves that power the SAW device. The SAW device measures the absolute pressure in the valve cap that is equal to the pressure in the tire. U.S. Pat. Nos. 5,641,902, 5,819,779 and 4,103,549 illustrate a valve cap pressure sensor where a visual output is provided. Other related prior art includes U.S. Pat. No. 4,545,246.

The generation 2 system permits the measurement of both the tire pressure and tire temperature. In this case, the tire valve stem is removed and replaced with a new tire valve stem that contains a SAW device attached at the bottom of the valve stem. This device actually contains two SAW devices, one for measuring temperature and the second for measuring pressure through a novel technology discussed below. This second generation device therefore permits the measurement of both the pressure and the temperature inside the tire. Alternately, this device can be mounted inside the tire, attached to the rim or attached to another suitable location. An external pressure sensor is mounted in the interrogator to measure the pressure of the atmosphere to compensate for altitude and/or barometric changes.

The generation 3 device contains a pressure and temperature sensor, as in the case of the generation 2 device, but additionally contains one or more accelerometers which measure at least one component of the acceleration of the vehicle tire tread adjacent the device. This acceleration varies in a known manner as the device travels in an approximate circle attached to the wheel. This device is capable of determining when the tread adjacent the device is in contact with road surface. It is also able to measure the coefficient of friction between the tire and the road surface. In this manner, it is capable of measuring the length of time that this tread portion is in contact with the road and thereby provides a measure of the diameter of the tire footprint on the road. A technical discussion of the operating principle of a tire inflation and load detector based on flat area detection follows:

When tires are inflated and not in contact with the ground, the internal pressure is balanced by the circumferential tension in the fibers of the shell. Static equilibrium demands that tension is equal to the radius of curvature multiplied by the difference between the internal and the external gas pressure. Tires support the weight of the automobile by changing the curvature of the part of the shell that touches the ground. The relation mentioned above is still valid. In the part of the shell that gets flattened, the radius of curvature increases while the tension in the tire structure stays the same. Therefore, the difference between the external and internal pressures becomes small to compensate for the growth of the radius. If the shell were perfectly flexible, the tire contact with the ground would develop into a flat spot with an area equal to the load divided by the pressure.

A tire operating at correct values of load and pressure has a precise signature in terms of variation of the radius of curvature in the loaded zone. More flattening indicates under-inflation or overloading, while less flattening indicates over-inflation or under-loading. Note that tire loading has essentially no effect on internal pressure.

From the above, one can conclude that monitoring the curvature of the tire as it rotates can provide a good indication of its operational state. A sensor mounted inside the tire at its largest diameter can accomplish this measurement. Preferably, the sensor would measure mechanical strain. However, a sensor measuring acceleration in any one axis could also serve the purpose.

In the case of the strain measurement, the sensor would indicate a constant strain as it spans the arc over which the tire is not in contact with the ground, and a pattern of increased stretch during the arc of close proximity with the ground. A simple ratio of the times of duration of these two states would provide a good indication of inflation, but more complex algorithms could be employed, where the values and the shape of the period of increased strain are utilized.

In the case of acceleration measurement, the system would utilize the fact that the part of the tire in contact with the ground possesses zero velocity for a finite period of time, while the rest of the tire is accelerating and decelerating in a cyclic fashion. The resulting acceleration profiles in the circumferential axis or the radial axis present a characteristic near-zero portion, the length of which, when related to the rest of the rotation, is a result of the state of tire inflation.

As an indicator of tire health, the measurement of strain on the largest inside diameter of the tire is believed to be superior to the measurement of stress, such as inflation pressure, because, the tire could be deforming, as it ages or otherwise progresses toward failure, without any changes in inflation pressure. Radial strain could also be measured on the inside of the tire sidewall thus indicating the degree of flexure that the tire undergoes.

The accelerometer approach has the advantage of giving a signature from which a harmonic analysis of once-per-revolution disturbances could indicate developing problems such as hernias, flat spots, loss of part of the tread, sticking of foreign bodies to the tread, etc.

As a bonus, both of the above-mentioned sensors give clear once-per-revolution signals for each tire that could be used as inputs for speedometers, odometers, differential slip indicators, tire wear indicators, etc.

Tires can fail for a variety of reasons including low pressure, high temperature, delamination of the tread, excessive flexing of the sidewall, and wear (see, e.g., Summary Root Cause Analysis Bridgestone/Firestone, Inc." http://www.bridgestone-firestone.com/homeimgs/rootcause. htm, Printed March, 2001). Most tire failures can be predicted based on tire pressure alone and the TREAD Act thus addresses the monitoring of tire pressure. However, some failures, such as the Firestone tire failures, can result from substandard materials especially those that are in contact with a steel-reinforcing belt. If the rubber adjacent the steel belt begins to move relative to the belt, then heat will be generated and the temperature of the tire will rise until the tire fails catastrophically. This can happen even in properly inflated tires.

Finally, tires can fail due to excessive vehicle loading and excessive sidewall flexing even if the tire is properly inflated. This can happen if the vehicle is overloaded or if the wrong size tire has been mounted on the vehicle. In most cases, the tire temperature will rise as a result of this additional flexing, however, this is not always the case, and it may even occur too late. Therefore, the device which measures the diameter of the tire footprint on the road is a superior method of measuring excessive loading of the tire.

Generation 1 devices monitor pressure only while generation 2 devices also monitor the temperature and therefore will provide a warning of imminent tire failure more often than through monitoring pressure alone. Generation 3 devices will give an indication that the vehicle is overloaded before either a pressure or temperature monitoring system can respond. The generation 3 system can also be augmented to measure the vibration signature of the tire and thereby detect when a tire has worn to the point that the steel belt is contacting the road. In this manner, the generation 3 system also provides an indication of a worn out tire and, as will be discussed below, an indication of the road coefficient of friction.

Each of these devices communicates to an interrogator with pressure, temperature, and acceleration as appropriate. In none of these generational devices is a battery mounted within the vehicle tire required, although in some cases a generator can be used. In most cases, the SAW devices will optionally provide an identification number corresponding to the device to permit the interrogator to separate one tire from another.

Key advantages of the tire monitoring system disclosed herein over most of the currently known prior art are:

very small size and insignificant weight eliminating the need for wheel counterbalance, cost competitive for tire monitoring only, significant cost advantage when systems are combined, exceeds customers' price targets, high update rate, self-diagnostic, automatic wheel identification, no batteries required—powerless, no wires required—wireless.

SAW devices have been used for sensing many parameters including devices for chemical sensing and materials characterization in both the gas and liquid phase. They also are used for measuring pressure, strain, temperature, acceleration, angular rate and other physical states of the environment.

The monitoring of temperature and or pressure of a tire can take place infrequently. It is adequate to check the pressure and temperature of vehicle tires once every ten seconds to once per minute. To utilize the centralized interrogator of this invention, the tire monitoring system would preferably use SAW technology and the device could be located in the valve stem, wheel, tire side wall, tire tread, or other appropriate location with access to the internal tire pressure of the tires. A preferred system is based on a SAW technology discussed above.

At periodic intervals, such as once every minute, the interrogator sends a radio frequency signal at a frequency such as 905 MHz to which the tire monitor sensors have been sensitized. When receiving this signal, the tire monitor sensors (of which there are five in a typical configuration) respond with a signal providing an optional identification number, temperature and pressure data. In one implementation, the interrogator would use multiple, typically two or four, antennas which are spaced apart. By comparing the time of the returned signals from the tires to the antennas, the location of each of the senders can be approximately determined. That is, the antennas can be so located that each tire is a different distance from each antenna and by comparing the return time of the signals sensed by the antennas, the location of each tire can be determined and associated with the returned information. If at least three antennas are used, then returns from adjacent vehicles can be eliminated.

An identification number can accompany each transmission from each tire sensor and can also be used to validate that the transmitting sensor is in fact located on the subject vehicle. In traffic situations, it Is possible to obtain a signal from the tire of an adjacent vehicle. This would immediately show up as a return from more than five vehicle tires and the system would recognize that a fault had occurred. The sixth return can be easily eliminated, however, since it could contain an identification number that is different from those that have heretofore been returned frequently to the vehicle system or based on a comparison of the signals sensed by the different antennas. Thus, when the vehicle tire is changed or tires are rotated, the system will validate a particular return signal as originating from the tire-monitoring sensor located on the subject vehicle.

This same concept is also applicable for other vehicle-mounted sensors. This permits a plug and play scenario whereby sensors can be added to, changed, or removed from a vehicle and the interrogation system will automatically adjust. The system will know the type of sensor based on the identification number, frequency, delay and/or its location on the vehicle. For example, a tire monitor could have a different code in the identification number from a switch or weight-monitoring device. This also permits new kinds of sensors to be retroactively installed on a vehicle. If a totally new type of the sensor is mounted to the vehicle, the system software would have to be updated to recognize and know what to do with the information from the new sensor type. By this method, the configuration and quantity of sensing systems on a vehicle can be easily changed and the system interrogating these sensors need only be updated with software upgrades which could occur automatically over the Internet.

Preferred tire-monitoring sensors for use with this invention use surface acoustic wave (SAW) technology. A radio frequency interrogating signal is sent to all of the tire gages simultaneously and the received signal at each tire gage is sensed using an antenna. The antenna is connected to the IDT transducer that converts the electrical wave to an acoustic wave that travels on the surface of a material such as lithium niobate, or other piezoelectric material such as zinc oxide, Langasite or the polymer polyvinylidene fluoride (PVDF). During its travel on the surface of the piezoelectric material, either the time delay, resonant frequency, amplitude, or phase of the signal (or even possibly combinations thereof) is modified based on the temperature and/or pressure in the tire. This modified wave is sensed by one or more IDT transducers and converted back to a radio frequency wave that is used to excite an antenna for re-broadcasting the wave back to interrogator. The interrogator receives the wave at a time delay after the original transmission that is determined by the geometry of the SAW transducer and decodes this signal to determine the temperature and/or pressure in the subject tire By using slightly different geometries for each of the tire monitors, slightly different delays can be achieved and randomized so that the probability of two sensors having the same delay is small. The interrogator transfers the decoded information to a central processor that then determines whether the temperature and/or pressure of each of the tires exceed specifications. If so, a warning light can be displayed informing the vehicle driver of the condition. In some cases, this random delay is all that is required to separate the five tire signals and to identify which tires are on the vehicle and thus ignore responses from adjacent vehicles.

With an accelerometer mounted in the tire, as is the case for the generation 3 system, information is present to diagnose other tire problems. For example, when the steel belt wears through the rubber tread, it will make a distinctive noise and create a distinctive vibration when it contacts the pavement. This can be sensed by the SAW accelerometer. The interpretation of various such signals can be done using neural network technology. Similar systems are described more detail in U.S. Pat. No. 5,829,782, incorporated by reference herein. As the tread begins to separate from the tire as in the Bridgestone cases, a distinctive vibration is created which can also be sensed by a tire-mounted accelerometer.

As the tire rotates, stresses are created in the rubber tread surface between the center of the footprint and the edges. If the coefficient of friction on the pavement is low, these stresses can cause the shape of the footprint to change. The generation 3 system, which measures the circumferential length of the footprint, can therefore also be used to measure the friction coefficient between the tire and the pavement.

Similarly, the same or a different interrogator can be used to monitor various components of the vehicle's safety system including occupant position sensors, vehicle acceleration sensors, vehicle angular position, velocity and acceleration sensors, related to both frontal, side or rear impacts as well as rollover conditions. The interrogator could also be used in conjunction with other detection devices such as weight sensors, temperature sensors, accelerometers which are associated with various systems in the vehicle to enable such systems to be controlled or affected based on the measured state.

Some specific examples of the use of interrogators and responsive devices will now be described.

The antennas used for interrogating the vehicle tire pressure transducers will be located outside of the vehicle passenger compartment. For many other transducers to be sensed the antennas must be located at various positions within passenger compartment. This invention contemplates, therefore, a series of different antenna systems, which can be electronically switched by the interrogator circuitry. Alternately, in some cases, all of the antennas can be left connected and total transmitted power increased.

There are several applications for weight or load measuring devices in a vehicle including the vehicle suspension system and seat weight sensors for use with automobile safety systems. As reported in U.S. Pat. Nos. 4,096,740, 4,623,813, 5,585,571, 5,663,531, 5,821,425 and 5,910,647 and International Publication No. WO 00/65320(A1), all of which are incorporated by reference herein to the extent the disclosure of these publications is necessary, SAW devices are appropriate candidates for such weight measurement systems. In this case, the surface acoustic way on the lithium niobate, or other piezoelectric material, is modified in delay time, resonant frequency, amplitude and/or phase based on strain of the member upon which the SAW device is mounted. For example, the conventional bolt that is typically used to connect the passenger seat to the seat adjustment slide mechanism can be replaced with a stud which is threaded on both ends. A SAW strain device is mounted to the center unthreaded section of the stud and the stud is attached to both the seat and the slide mechanism using appropriate threaded nuts. Based on the particular geometry of the SAW device used, the stud can result in as little as a 3 mm upward displacement of the seat compared to a normal bolt mounting system. No wires are required to attach the SAW device to the stud. The interrogator transmits a radio frequency pulse at, for example, 925 MHz that excites antenna on the SAW strain measuring system. After a delay caused by the time required for the wave to travel the length of the SAW device, a modified wave is retransmitted to the interrogator providing an indication of the strain of the stud with the weight of an object occupying the seat corresponding to the strain. For a seat that is normally bolted to the slide mechanism with four bolts, at least four SAW strain sensors would be used. Since the individual SAW devices are very small, multiple devices can be placed on a stud to provide multiple redundant measurements, or permit bending strains to be determined, and/or to permit the stud to be arbitrarily located with at least one SAW device always within direct view of the interrogator antenna. In some cases, the bolt or stud will be made on non-conductive material to limit the blockage of the RF signal. In other cases, it will be insulated from the slide (mechanism) and used as an antenna.

If two longitudinally spaced apart antennas are used to receive the SAW transmissions from the seat weight sensors, one antenna in front of the seat and the other behind the seat, then the position of the seat can be determined eliminating the need for current seat position sensors. A similar system can be used for other seat and seatback position measurements.

For strain gage weight sensing, the frequency of interrogation would be considerably higher than that of the tire monitor, for example. However, if the seat is unoccupied then the frequency of interrogation can be substantially reduced. For an occupied seat, information as to the identity and/or category and position of an occupying item of the seat can be obtained through the multiple weight sensors described. For this reason, and due to the fact that during the pre-crash event the position of an occupying item of the seat may be changing rapidly, interrogations as frequently as once every 10 milliseconds can be desirable. This would also enable a distribution of the weight being applied to the seat to be obtained which provides an estimation of the position of the object occupying the seat. Using pattern recognition technology, e.g., a trained neural network, sensor fusion, fuzzy logic, etc., the identification of the object can be ascertained based on the determined weight and/or determined weight distribution There are many other methods by which SAW devices can be used to determine the weight and/or weight distribution of an occupying item other than the method described above and all such uses of SAW strain sensors for determining the weight and weight distribution of an occupant are contemplated. For example, SAW devices with appropriate straps can be used to measure the deflection of the seat cushion top or bottom caused by an occupying item, or if placed on the seat belts, the load on the belts can determined wirelessly and powerlessly. Geometries similar to those disclosed in U.S. Pat. No. 6,242,701 (which discloses multiple strain gage geometries, the entire disclosure of this patent is incorporated by reference herein to the extent the disclosure is necessary) using SAW strain-measuring devices can also be constructed, e g., any of the multiple strain gage geometries shown therein.

Although a preferred method for using the invention is to interrogate each of the SAW devices using wireless means, in some cases it may be desirable to supply power to and/or obtain information from one or more of the devices using wires. As such, the wires would be an optional feature.

One advantage of the weight sensors of this invention along with the geometries disclosed in the '701 patent and herein below, is that in addition to the axial stress in the seat support, the bending moments in the structure can be readily determined. For example, if a seat is supported by four "legs", it is possible to determine the state of stress, assuming that axial twisting can be ignored, using four strain gages on each leg support for a total of 16 such gages. If the seat is supported by three legs, then this can be reduced to 12. Naturally, a three-legged support is preferable than four since with four, the seat support is over-determined severely complicating the determination of the stress caused by an object on the seat. Even with three supports, stresses can be introduced depending on the nature of the support at the seat rails or other floor-mounted supporting structure. If simple supports are used that do not introduce bending moments into the structure, then the number of gages per seat can be reduced to three providing a good model of the seat structure is available. Unfortunately, this is usually not the case and most seats have four supports and the attachments to the vehicle not only introduce bending moments into the structure but these moments vary from one position to another and with temperature. The SAW strain gages of this invention lend themselves to the placement of multiple gages onto each support as needed to approximately determine the state of stress and thus the weight of the occupant depending on the particular vehicle application. Furthermore, the wireless nature of these gages greatly simplifies the placement of such gages at those locations that are most appropriate.

One additional point should be mentioned. In many cases, the determination of the weight of an occupant from the static strain gage readings yields inaccurate results due to the indeterminate stress state in the support structure. However, the dynamic stresses to a first order are independent of the residual stress state. Thus, the change in stress that occurs as a vehicle travels down a roadway caused by dips in the roadway can provide an accurate measurement of the weight of an object in a seat. This is especially true if an accelerometer is used to measure the vertical excitation provided to the seat.

Some vehicle models provide load leveling and ride control functions that depend on the magnitude and distribution of load carried by the vehicle suspension. Frequently, wire strain gage technology is used for these functions. That is, the wire strain gages are used to sense the load and/or load distribution of the vehicle on the vehicle suspension system. Such strain gages can be advantageously replaced with strain gages based on SAW technology with the significant advantages in terms of cost, wireless monitoring, dynamic range, and signal level. In addition, SAW strain gage systems can be significantly more accurate than wire strain gage systems.

A strain detector in accordance with this invention can convert mechanical strain to variations in electrical signal frequency with a large dynamic range and high accuracy even for very small displacements. The frequency variation is produced through use of a surface acoustic wave delay line as the frequency control element of an oscillator. A surface acoustic wave delay line comprises a transducer deposited on a piezoelectric material such as quartz or lithium niobate which is disposed so as to be deformed by strain in the member which is to be monitored. Deformation of the piezoelectric substrate changes the frequency control characteristics of the surface acoustic wave delay line, thereby changing the frequency of the oscillator. Consequently, the oscillator frequency change is a measure of the strain in the member being monitored and thus the weight applied to the seat. A SAW strain transducer is capable of a degree of accuracy substantially greater than that of a conventional resistive strain gage.

Other applications of weight measuring systems for an automobile include measuring the weight of the fuel tank or other containers of fluid to determine quantity of fluid contained therein.

One problem with SAW devices is that if they are designed to operate at the GHz frequency, the feature sizes become exceeding small and the devices are difficult to manufacture. On the other hand, if the frequencies are considerably lower, for example, in the tens of megahertz range, then the antenna sizes become excessive. It is also more difficult to obtain antenna gain at the lower frequencies. This is also related to antenna size. One method of solving this problem is to transmit an interrogation signal in the many GHz range which is modulated at the hundred MHz range. At the SAW transducer, the transducer is tuned to the modulated frequency. Using a nonlinear device such as a Shocky diode, the modified signal can be mixed with the incoming high frequency signal and retransmitted through the same antenna. For this case, the interrogator could continuously broadcast the carrier frequency.

In addition to measuring the weight of an occupying item on a seat, the location of the seat and setback can also be determined by the interrogator. Since the SAW devices inherently create a delayed return signal, either that delay must be very accurately known or an alternate approach is required. One such alternate approach is to use the heterodyne principal described above to cause the antenna to return a signal of a different frequency. By comparing the phases of the sending and received signal, the distance to the device can be determined. Also, as discussed above, multiple antennas can be used for seat position and seatback position sensing.

With respect to switches, devices based on RFID technology can be used as switches in a vehicle as described in U.S. Pat. Nos. 6,078,252 and 6,144,288, and U.S. provisional patent application Ser. No. 60/231,378 all of which are incorporated by reference herein. There are many ways that it can be accomplished. A switch can be used to connect an antenna to either an RFID electronic device or to an RFID SAW device. This of course requires contacts to the closed by the switch activation. An alternate approach is to use pressure from an occupant's finger, for example, to alter the properties of the acoustic wave on the SAW material much as in a SAW touch screen. These properties that can be modified include the amplitude of the acoustic wave, and its phase, and/or the time delay or an external impedance connected to one of the SAW reflectors as disclosed in U.S. Pat. No. 6,084,503, incorporated by reference herein. In this implementation, the SAW transducer can contain two sections, one which is modified by the occupant and the other which serves as a reference. A combined signal is sent to the interrogator that decodes the signal to determine that the switch has been activated. By any of these technologies, switches can be arbitrarily placed within the interior of an automobile, for example, without the need for wires. (The wires would be an optional feature.) Since wires and connectors are the clause of most warranty repairs in an automobile, not only is the cost of switches substantially reduced but also the reliability of the vehicle electrical system is substantially improved.

The interrogation of switches can take place with moderate frequency such as once every 100 milliseconds. Either through the use of different frequencies or different delays, a large number of switches can be either time, code, space or frequency multiplexed to permit separation of the signals obtained by the interrogator.

Another approach is to attach a variable impedance device across one of the reflectors on the SAW device. The impedance can therefore used to determine the relative reflection from the reflector compared to other reflectors on the SAW device. In this way, the magnitude as well as the presence of a force exerted by an occupant's finger, for example, can be used to provide a rate sensitivity to the desired function. In an alternate design, as shown U.S. Pat. No. 6,144,288, incorporated by reference herein, the switch is used to connect the antenna to the SAW device. Of course, in this case the interrogator will not get a return from the SAW switch unless it is depressed.

Temperature measurement is another field in which SAW technology can be applied and the invention encompasses several embodiments of SAW temperature sensors.

U.S. Pat. No. 4,249,418, incorporated by reference herein, is one of many examples of prior art SAW temperature sensors. Temperature sensors are commonly used within vehicles and many more applications might exist if a low cost wireless temperature sensor is available, i.e., the invention. The SAW technology can be used for such temperature sensing tasks. These tasks include measuring the vehicle coolant temperature, air temperature within passenger compartment at multiple locations, seat temperature for use in conjunction with seat warming and cooling systems, outside temperatures and perhaps tire surface temperatures to provide early warning to operators of road freezing conditions. One example, is to provide air temperature sensors in the passenger compartment in the vicinity of ultrasonic transducers used in occupant sensing systems as described in the current assignee's U.S. Pat No. 5,943,295 (Varga et al.), incorporated by reference herein, since the speed of sound in the air varies by approximately 20% from −40° C. to 85° C. The subject matter of this patent is included in the invention to form a part thereof Current ultrasonic occupant sensor systems do not measure or compensate for this change in the speed of sound with the effect of significantly reducing the accuracy of the systems at the temperature extremes. Through the judicious placement of SAW temperature sensors in the vehicle, the passenger compartment air temperature can be accurately estimated and the information provided wirelessly to the ultrasonic occupant sensor system thereby permitting corrections to be made for the change in speed of sound.

Acceleration sensing is another field in which SAW technology can be applied and the invention encompasses several embodiments of SAW accelerometers.

U.S. Pat. Nos. 4,199,990, 4,306,456 and 4,549,436, all of which are incorporated by reference herein, are examples of prior art SAW accelerometers. Most airbag crash sensors for determining whether the vehicle is experiencing a frontal or side impact currently use micromachined accelerometers.

These accelerometers are usually based on the deflection of a mass which is sensed using either capacitive or piezoresistive technologies. SAW technology has heretofore not been used as a vehicle accelerometer or for vehicle crash sensing. Due to the importance of this function, at least one interrogator could be dedicated to this critical function. Acceleration signals from the crash sensors should be reported at least preferably every 100 microseconds. In this case, the dedicated interrogator would send an interrogation pulse to all crash sensor accelerometers every 100 microseconds and receive staggered acceleration responses from each of the SAW accelerometers wirelessly. This technology permits the placement of multiple low-cost accelerometers at ideal locations for crash sensing including inside the vehicle side doors, in the passenger compartment and in the frontal crush zone. Additionally crash sensors can now be located in the rear of the vehicle in the crush zone to sense rear impacts. Since the acceleration data is transmitted wirelessly, concern about the detachment or cutting of wires from the sensors disappears. One of the main concerns, for example, of placing crash sensors in the vehicle doors where they most appropriately can sense vehicle side impacts, is the fear that an impact into the A-pillar of the automobile would sever the wires from the door-mounted crash sensor before the crash was sensed. This problem disappears with the current wireless technology of this invention. If two accelerometers are placed at some distance from each other, the roll rate of the vehicle can be determined and thus the tendency of the vehicle to rollover can be predicted in time to automatically take corrective action and/or deploy a curtain airbag or other airbag(s).

Although the sensitivity of measurement is considerably greater than that obtained with conventional piezoelectric accelerometers, the frequency deviation remains low in absolute value. Accordingly, the frequency drift of thermal origin has to be made as low as possible by selecting a suitable cut of the piezoelectric material. The resulting accuracy is impressive as presented in U.S. Pat. No. 4,549, 436, incorporated by reference herein, which discloses an angular accelerometer with a dynamic a range of 1 million, temperature coefficient of 0.005%/deg F, an accuracy of 1 microradian/sec$^2$, a power consumption of 1 milliwatt, a drift of 0.01% per year, a volume of 1 cc/axis and a frequency response of 0 to 1000 Hz. The subject matter of this patent is hereby included in the invention to constitute a part of the invention. A similar design can be used for acceleration sensing.

In a similar manner as the polymer coated SAW device is used to measure pressure, a similar device wherein a seismic mass is attached to a SAW device through a polymer interface can be made to sense acceleration. This geometry has a particular advantage for sensing accelerations below 1 G, which has proved to be very difficult in conventional micromachined accelerometers due to their inability to both measure low accelerations and withstand shocks.

Gyroscopes are another field in which SAW technology can be applied and the invention encompasses several embodiments of SAW gyroscopes.

The SAW technology is particularly applicable for gyroscopes as described in International Publication No. WO 00/79217A2 to Varadan et al. The output of such gyroscopes can be determined with an interrogator that is also used for the crash sensor accelerometers, or a dedicated interrogator can be used. Gyroscopes having an accuracy of approximately 1 degree per second have many applications in a vehicle including skid control and other dynamic stability functions. Additionally, gyroscopes of similar accuracy can be used to sense impending vehicle rollover situations in time to take corrective action.

SAW gyroscopes of the type described in WO 00/79217A2 have the capability of achieving accuracies approaching 3 degrees per hour. This high accuracy permits use of such gyroscopes in an inertial measuring unit (IMU) that can be used with accurate vehicle navigation systems and autonomous vehicle control based on differential GPS corrections. Such a system is described in the current assignee's U.S. patent application Ser. No. 09/177,041. Such navigation systems depend on the availability of four or more GPS satellites and an accurate differential correction signal such as provided by the OmniStar Corporation or NASA or through the National Differential GPS system now being deployed. The availability of these signals degrades in urban canyon environments, tunnels, and on highways when the vehicle is in the vicinity of large trucks. For this application, an IMU system should be able to accurately control the vehicle for perhaps 15 seconds and preferably for up to five minutes. An IMU based on SAW technology or the technology of U.S. Pat. No. 4,549,436 discussed above are the best-known devices capable of providing sufficient accuracies for this application at a reasonable cost. Other accurate gyroscope technologies such as fiber optic systems are more accurate but can cost many thousands of dollars. In contrast, in high volume production, an IMU of the required accuracy based on SAW technology should cost less than $100.

Once an IMU of the accuracy described above is available in the vehicle, this same device can be used to provide significant improvements to vehicle stability control and rollover prediction systems.

Keyless entry systems are another field in which SAW technology can be applied and the invention encompasses several embodiments of access control systems using SAW devices.

A common use of SAW technology is for access control to buildings. RFID technology using electronics is also applicable for this purpose; however, the range of electronic RFID technology is usually limited to one meter or less. In contrast, the SAW technology can permit sensing up to about 30 meters. As a keyless entry system, an automobile can be configured such that the doors unlock as the holder of a card containing the SAW ID system approaches the vehicle and similarly, the vehicle doors can be automatically locked when occupant with the card travels beyond a certain distance from the vehicle. When the occupant enters the vehicle, the doors can again automatically lock either through logic or through a current system wherein doors automatically lock when the vehicle is placed in gear. An occupant with such a card would also not need to have an ignition key. The vehicle would recognize that the SAW based card was inside vehicle and then permit the vehicle to be started by issuing an oral command if a voice recognition system is present or by depressing a button, for example, without the need for an ignition key.

Occupant presence and position sensing is another field in which SAW technology can be applied and the invention encompasses several embodiments of SAW occupant presence and/or position sensors.

Many sensing systems are available for the use to identify and locate occupants or other objects in a passenger compartment of the vehicle. Such sensors include ultrasonic sensors, chemical sensors (e.g. carbon dioxide), cameras, radar systems, heat sensors, capacitance, magnetic or other field change sensors, etc. Most of these sensors require power to operate and return information to a central processor for analysis. An ultrasonic sensor, for example, may be mounted in or near the headliner of the vehicle and periodically it transmits a few ultrasonic waves and receives reflections of these waves from occupying items of the passenger seat. Current systems on the market are controlled by electronics in a dedicated ECU.

An alternate method as taught in this invention is to use an interrogator to send a signal to the headliner-mounted ultrasonic sensor causing that sensor to transmit and receive ultrasonic waves. The sensor in this case would perform mathematical operations on the received waves and create a vector of data containing perhaps twenty to forty values and transmit that vector wirelessly to the interrogator. By means of this system, the ultrasonic sensor need only be connected to the vehicle power system and the information could be transferred to and from the sensor wirelessly. Such a system significantly reduces the wiring complexity especially when there may be multiple such sensors distributed in the passenger compartment. Now, only a power wire needs to be attached to the sensor and there does not need to be any direct connection between the sensor and the control module. Naturally, the same philosophy would apply to radar-based sensors, electromagnetic sensors of all kinds including cameras, capacitive or other electromagnetic field change sensitive sensors etc. In some cases, the sensor itself can operate on power supplied by the interrogator through radio frequency transmission. In this case, even the connection to the power line can be omitted. This principle can be extended to the large number of sensors and actuators that are currently in the vehicle where the only wires that are needed are those to supply power to the sensors and actuators and the information is supplied wirelessly.

Such wireless powerless sensors can also be use, for example, as close proximity sensors based on measurement of thermal radiation from an occupant. Such sensors can be mounted on any of the surfaces in the passenger compartment, including the seats, which are likely to receive such radiation.

A significant number of people are suffocated each year in automobiles due to excessive heat, carbon dioxide, carbon monoxide, or other dangerous fumes. The SAW sensor technology is particularly applicable to solving these kinds of problems. The temperature measurement capabilities of SAW transducers have been discussed above. If the surface of a SAW device is covered with a material which captures carbon dioxide, for example, such that the mass, elastic constants or other property of surface coating changes, the characteristics of the surface acoustic waves can be modified as described in detail in U.S. Pat. No. 4,637,987 and elsewhere. Once again, an interrogator can sense the condition of these chemical-sensing sensors without the need to supply power and connect the sensors with either wireless communication or through the power wires. If a concentration of carbon monoxide is sensed, for example, an alarm can be sounded, the windows opened, and/or the engine extinguished. Similarly, if the temperature within the passenger compartment exceeds a certain level, the windows can be automatically opened a little to permit an exchange of air reducing the inside temperature and thereby perhaps saving the life of an infant or pet left in the vehicle unattended.

In a similar manner, the coating of the surface wave device can contain a chemical which is responsive to the presence of alcohol. In this case, the vehicle can be prevented from operating when the concentration of alcohol vapors in the vehicle exceeds some determined limit.

Each year a number of children and animals are killed when they are locked into a vehicle trunk. Since children and animals emit significant amounts of carbon dioxide, a carbon dioxide sensor connected to the vehicle system wirelessly and powerlessly provides an economic way of detecting the presence of a life form in the trunk. If a life form is detected, then a control system can release a trunk lock thereby opening the trunk. Alarms can also be sounded or activated when a life form is detected in the trunk.

Although they will not be discussed in detail, SAW sensors operating in the wireless mode can also be used to sense for ice on the windshield or other exterior surfaces of the vehicle, condensation on the inside of the windshield or other interior surfaces, rain sensing, heat load sensing and many other automotive sensing functions. They can also be used to sense outside environmental properties and states including temperature, humidity, etc.

SAW sensors can be economically used to measure the temperature and humidity at numerous places both inside and outside of a vehicle. When used to measure humidity inside the vehicle, a source of water vapor can be activated to increase the humanity when desirable and the air conditioning system can be activated to reduce the humidity when necessary. Temperature and humidity measurements outside of the vehicle can be an indication of potential road icing problems. Such information can be used to provide early warning to a driver of potentially dangerous conditions. Although the invention described herein is related to land vehicles, many of these advances are equally applicable to other vehicles such as boats, airplanes and even, in some cases, homes and buildings. The invention disclosed herein, therefore, is not limited to automobiles or other land vehicles.

Road condition sensing is another field in which SAW technology can be applied and the invention encompasses several embodiments of SAW road condition sensors.

The temperature and moisture content of the surface of a roadway are critical parameters in determining the icing state of the roadway. Attempts have been made to measure the coefficient of friction between a tire and the roadway by placing strain gages in the tire tread. Naturally, such strain gages are ideal for the application of SAW technology especially since they can be interrogated wirelessly from a distance and they require no power for operation. As discussed above, SAW accelerometers can also perform this function The measurement of the friction coefficient, however, is not predictive and the vehicle operator is only able to ascertain the condition after the fact. SAW based transducers have the capability of being interrogated as much as 100 feet from the interrogator. Therefore, the judicious placement of low-cost powerless SAW temperature and humidity sensors in or on the roadway at critical positions can provide an advance warning to vehicle operators that road is slippery ahead. Such devices are very inexpensive and therefore could be placed at frequent intervals along a highway.

An infrared sensor that looks down the highway in front of the vehicle can actually measure the road temperature prior to the vehicle traveling on that part of the roadway. This system also would not give sufficient warning if the operator waited for the occurrence of a frozen roadway. The probability of the roadway becoming frozen, on the other hand, can be predicted long before it occurs, in most cases, by watching the trend in the temperature.

Some lateral control of the vehicle can also be obtained from SAW transducers or electronic RFID tags placed down the center of the lane, either above the vehicles or in the roadway, for example. A vehicle having two receiving antennas approaching such devices, through triangulation, is able to determine the lateral location of the vehicle relative to these SAW devices. If the vehicle also has an accurate map of the roadway, the identification number associated with each such device can be used to obtain highly accurate longitudinal position determinations. Ultimately, the SAW devices can be placed on structures beside the road and perhaps on every mile or tenth of a mile marker. If three antennas are used, as discussed herein, the distances to the SAW device can be determined.

Electronic RFID tags are also suitable for lateral and longitudinal positioning purposes, however, the range available for electronic RFID systems is considerably less than that of SAW based systems. On the other hand, as taught in co-pending U.S. provisional patent application Ser. No. 60/231,378, the time of flight of the RFID system can be used to determine the distance from the vehicle to the RFID tag. Because of the inherent delay in the SAW devices and its variation with temperature, accurate distance measurement is probably not practical based on time of flight but somewhat less accurate distance measurements based on relative time of arrival can be made. Even if the exact delay imposed by the SAW device was accurately known at one temperature, such devices are usually reasonably sensitive to changes in temperature, hence they make good temperature sensors, and thus the accuracy of the delay in the SAW device is more difficult to maintain. An interesting variation of an electronic RFID that is particularly applicable to this and other applications of this invention is disclosed in A. Pohl, L. Reindl, "New passive sensors", Proc. 16th IEEE Instrumentation and Measurement Technology Conf., IMTC/99, 1999, pp. 1251–1255. which is incorporated by reference herein in its entirety.

Many SAW devices are based on lithium niobate or similar strong piezoelectric materials. Such materials have high thermal expansion coefficients. An alternate material is quartz that has a very low thermal expansion coefficient. However, its piezoelectric properties are inferior to lithium niobate. One solution to this problem is to use lithium niobate as the coupling system between the antenna and the material upon which the surface acoustic wave travels. In this matter, the advantages of a low thermal expansion coefficient material can be obtained while using the lithium niobate for its strong piezoelectric properties. Other useful materials such as Langasite have properties that are intermediate between lithium niobate and quartz. Note that it is also possible to use combinations of materials to achieve particular objectives with property measurement since different materials respond differently to different sensed properties or environments.

The use of SAW tags as an accurate precise positioning system as described above would be applicable for accurate vehicle location, as discussed in U.S. patent application Ser. No. 09/177,041, for lanes in tunnels, for example, or other cases where loss of satellite lock is common.

The various technologies discussed above can be used in combination. The electronic RFID tag can be incorporated into a SAW tag providing a single device that provides both an instant reflection of the radio frequency waves as well as a re-transmission at a later time. This marriage of the two technologies permits the strengths of each technology to be exploited in the same device. For most of the applications described herein, the cost of mounting such a tag in a vehicle or on the roadway far exceeds the cost of the tag itself. Therefore, combining the two technologies does not significantly affect the cost of implementing tags onto vehicles or roadways or side structures.

An alternate method to the electronic RFID tag is to simply use a radar reflector and measure the time of flight to the reflector and back. The radar reflector can even be made of a series of reflecting surfaces displaced from each other to achieve some simple coding.

Another field in which SAW technology can be applied is for "ultrasound-on-a-surface" type of devices.

U.S. Pat. No. 5,629,681, assigned to the same assignee herein and incorporated by reference herein, describes many uses of ultrasound in a tube. Many of the applications are also candidates for ultrasound-on-a-surface devices. In this case, a micromachined SAW device will in general be replaced by a much larger structure.

Touch screens based on surface acoustic waves are well known in the art. The use of this technology for a touch pad for use with a heads-up display is disclosed in the current assignee's U.S. patent application Ser. No. 09/645,709. The use of surface acoustic waves in either one or two dimensional applications has many other possible uses such as for pinch protection on window and door closing systems, crush sensing crash sensors, occupant presence detector and butt print measurement systems, generalized switches such as on the circumference or center of the steering wheel, etc. Since these devices typically require significantly more power than the micromachined SAW devices discussed above, most of these applications will require a power connection. On the other hand, the output of these devices can go through a SAW micromachined device or, in some other manner, be attached to an antenna and interrogated using a remote interrogator thus eliminating the need for a direct wire communication link.

One example would be to place a surface acoustic wave device on the circumference of the steering wheel. Upon depressing a section of this device, the SAW wave would be attenuated. The interrogator would notify the acoustic wave device at one end of the device to launch an acoustic wave and then monitor output from the antenna. Depending on the phase, time delay, and/or amplitude of the output wave, the interrogator would know where the operator had depressed the steering wheel SAW switch and therefore know the function desired by the operator.

Piezoelectric generators are another field in which SAW technology can be applied and the invention encompasses several embodiments of SAW piezoelectric generators.

An alternate approach for some applications, such as tire monitoring, where it is difficult to interrogate the SAW device as the wheel, and thus the antenna, is rotating, the transmitting power can be significantly increased if there is a source of energy inside the tire. Many systems now use a battery but this leads to problems related to having to periodically replace the battery and temperature effects. In some cases, the manufacturers recommend that the battery be replaced as often as every 6 to 12 months. Batteries also sometimes fail to function properly at cold temperatures and have their life reduced when operated at high temperatures. For these reasons, there is a strong belief that a tire monitoring system should obtain its power from some source external of the tire. Similar problems can be expected for other applications.

One novel solution to this problem is to use the flexing of the tire itself to generate electricity. If a thin film of PVDF is attached to the tire inside and adjacent to the tread, then as the tire rotates the film will flex and generate electricity. This energy can then be stored on one or more capacitors and used to power the tire monitoring circuitry. Also, since the amount of energy that is generated depends of the flexure of the tire, this generator can also be used to monitor the health of the tire in a similar manner as the generation 3 accelerometer system described above.

As mentioned above, the transmissions from different SAW devices can be time multiplexed by varying the delay time from device to device, frequency multiplexed by varying the natural frequencies of the SAW devices, code multiplexed by varying the identification code of the SAW devices or space multiplexed by using multiple antennas. Considering the time multiplexing case, varying the length of the SAW device and thus the delay before retransmission can separate different classes of devices. All seat sensors can have one delay which would be different from tire monitors or light switches etc.

Definitions

The term "gage" as used herein interchangeably with the terms "sensor" and "sensing device".

Exemplifying embodiments of the invention are described above and unless specifically noted, it is the applicants' intention that the words and phrases in the specification and claims be given the ordinary and accustomed meaning to those of ordinary skill in the applicable art(s). If applicants intend any other meaning, they will specifically state they are applying a special meaning to a word or phrase.

Likewise, applicants' use of the word "function" herein is not intended to indicate that the applicants seek to invoke the special provisions of 35 U.S.C. §112, sixth paragraph, to define their invention. To the contrary, if applicants wish to invoke the provisions of 35 U.S.C.§112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. §112, sixth paragraph, to define their invention, it is the applicants' intention that their inventions not be limited to the specific structure, material or acts that are described in the preferred embodiments herein. Rather, if applicants claim their inventions by specifically invoking the provisions of 35 U.S.C. §112, sixth paragraph, it is nonetheless their intention to cover and include any and all structure, materials or acts that perform the claimed function, along with any and all known or later developed equivalent structures, materials or acts for performing the claimed function.

Further, the applicants intend that everything disclosed above can be used in combination on a single vehicle or structure.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENT

Figure 1A:
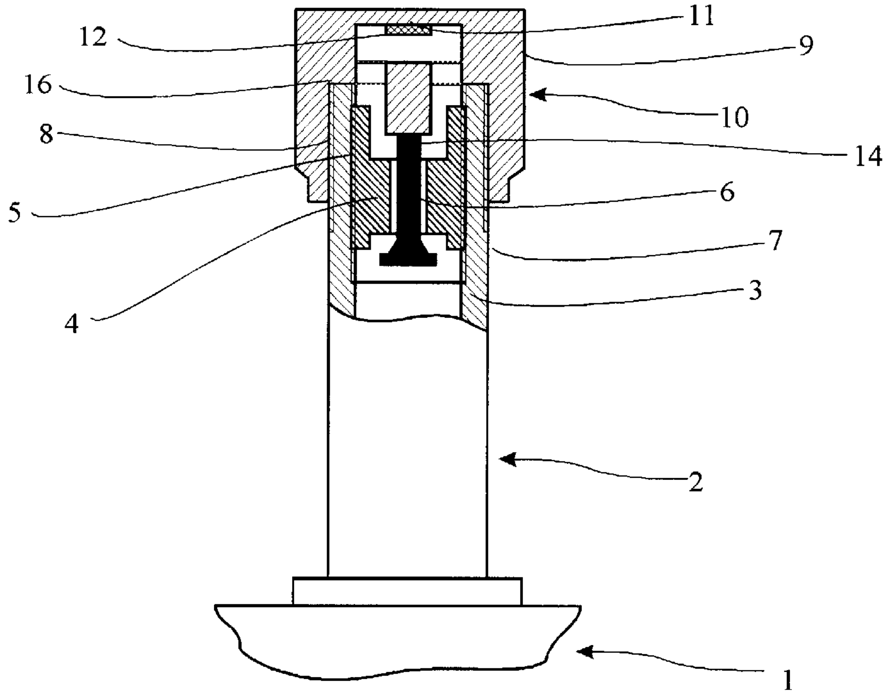
FIG. 1A is a partial cutaway view of a tire pressure monitor using an absolute pressure measuring SAW device.

Referring now to the drawings wherein the same reference numerals refer to the same or similar elements, a first embodiment of a valve cap 10 including a tire pressure monitoring system in accordance with the invention is shown generally at 10 in FIG. 1A. A tire 1 has a protruding, substantially cylindrical valve stem 2 which is shown in a partial cutaway view in FIG. 1A. The valve stem 2 comprises a sleeve 3 and a tire valve assembly 5. The sleeve 3 of the valve stem 2 is threaded on both its inner surface and its outer surface. The tire valve assembly 5 is arranged in the sleeve 3 and includes threads on an outer surface which are mated with the threads on the inner surface of the sleeve 3. The valve assembly 5 comprises a valve seat 4 and a valve pin 6 arranged in an aperture in the valve seat 4. The valve assembly 5 is shown in the open condition in FIG. 1A whereby air flows through a passage between the valve seat 4 and the valve pin 6.

The valve cap 10 includes a substantially cylindrical body 9 and is attached to the valve stem 2 by means of threads 8 arranged on an inner cylindrical surface of body 9 which are mated with the threads on the outer surface of the sleeve 3. The valve cap 10 comprises a valve pin depressor 14 arranged in connection with the body 9 and a SAW pressure sensor 11. The valve pin depressor 14 engages the valve pin 6 upon attachment of the valve cap 10 to the valve stem 2 and depresses it against its biasing spring, not shown, thereby opening the passage between the valve seat 4 and the valve pin 6 allowing air to pass from the interior of tire 1 into a reservoir or chamber 12 in the body 9. Chamber 12 contains the SAW pressure sensor 11 as described in more detail below.

Pressure sensor 11 is an absolute pressure-measuring device. It functions based on the principle that the increase in air pressure and thus air density in the chamber 12 increases the mass loading on a SAW device changing the velocity of surface acoustic wave on the piezoelectric material. The pressure sensor 11 is therefore positioned in an exposed position in the chamber 12.

Figure 1B:
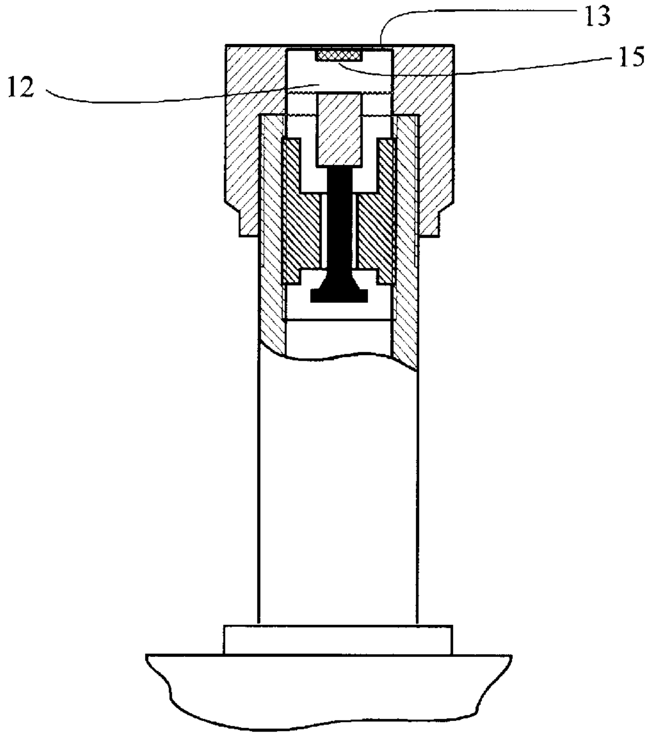
FIG. 1B is a partial cutaway view of a tire pressure monitor using a differential pressure measuring SAW device.

A second embodiment of a valve cap 10' in accordance with the invention is shown in FIG. 1B and comprises a SAW strain sensing device 15 that is mounted onto a flexible membrane 13 attached to the body 9' of the valve cap 10' and in a position in which it is exposed to the air in the chamber 12'. When the pressure changes in chamber 12', the deflection of the membrane 13 changes thereby changing the stress in the SAW device 15.

Strain sensor 15 is thus a differential pressure-measuring device. It functions based on the principle that changes in the flexure of the membrane 13 can be correlated to changes in pressure in the chamber 12' and thus, if an initial pressure and flexure are known, the change in pressure can be determined from the change in flexure.

FIGS. 1A and 1B therefore illustrate two different methods of using a SAW sensor in a valve cap for monitoring the pressure inside a tire. The precise manner in which the SAW sensors 11,15 operate is discussed fully below but briefly, each sensor 11,15 includes an antenna and an interdigital transducer which receives a wave via the antenna from an interrogator which proceeds to travel along a substrate (the membrane in the embodiment shown in FIG. 1B). The time in which the waves travel across the substrate and return to the interdigital transducer is dependent on the temperature, the mass loading on the substrate (in the embodiment of FIG. 1A) or the flexure of membrane 13 (in the embodiment of FIG. 1B). The antenna transmits a return wave which is receives and the time delay between the transmitted and returned wave is calculated and correlated to the pressure in the chamber 12 or 12'.

Sensors 11 and 15 are electrically connected to the metal valve cap 10 that is electrically connected to the valve stem 2. The valve stem 2 is electrically isolated from the tire rim and serves as an antenna for transmitting radio frequency electromagnetic signals from the sensors 11 and 15 to a vehicle mounted interrogator, not shown, to be described in detail below. As shown in FIG. 1A., a pressure seal 16 is arranged between an upper rim of the sleeve 3 and an inner shoulder of the body 9 of the valve cap 10 and serves to prevent air from flowing out of the tire 1 to the atmosphere.

The speed of the surface acoustic wave on the piezoelectric substrate changes with temperature in a predictable manner as well as with pressure. For the valve cap implementations, a separate SAW device can be attached to the outside of the valve cap and protected with a cover where it is subjected to the same temperature as the SAW sensors 11 or 15 but is not subject to pressure or strain. This requires that each valve cap comprise two SAW devices, one for pressure sensing and another for temperature sensing. Since the valve cap is exposed to ambient temperature, a preferred approach is to have a single device on the vehicle which measures ambient temperature outside of the vehicle passenger compartment. Many vehicles already have such a temperature sensor. For those installations where access to this temperature data is not convenient, a separate SAW temperature sensor can be mounted associated with the interrogator antenna, as illustrated below, or some other convenient place.

Although the valve cap 10 is provided with the pressure seal 16, there is a danger that the valve cap 10 will not be properly assembled onto the valve stem 2 and a small quantity of the air will leak over time. FIG. 2 provides an alternate design where the SAW temperature and pressure measuring devices are incorporated into the valve stem. This embodiment is thus particularly useful in the initial manufacture of a tire.

The valve stem assembly is shown generally at 20 and comprises a brass valve stem 7 which contains a tire valve assembly 5. The valve stem 7 is covered with a coating 21 of a resilient material such as rubber, which has been partially removed in the drawing. A metal conductive ring 22 is electrically attached to the valve stem 7. A rubber extension 23 is also attached to the lower end of the valve stem 7 and contains a SAW pressure and temperature sensor 24. The SAW pressure and temperature sensor 24 can be of at least two designs wherein the SAW sensor is used as an absolute pressure sensor as shown in FIG. 2A or an as a differential sensor based on membrane strain as shown in FIG. 2B.

Figure 2A:
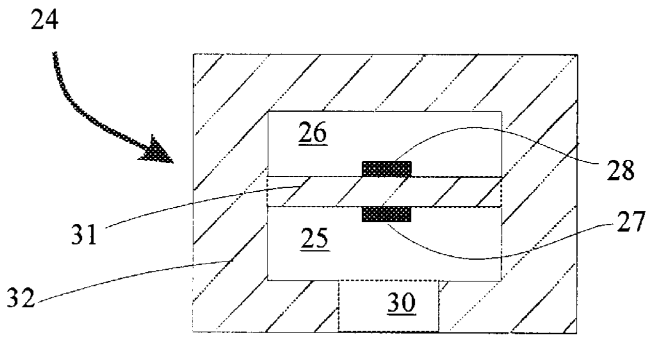
FIG. 2A is a sectioned view of the SAW tire pressure and temperature monitor of FIG. 2 incorporating an absolute pressure SAW device.
Figure 2:
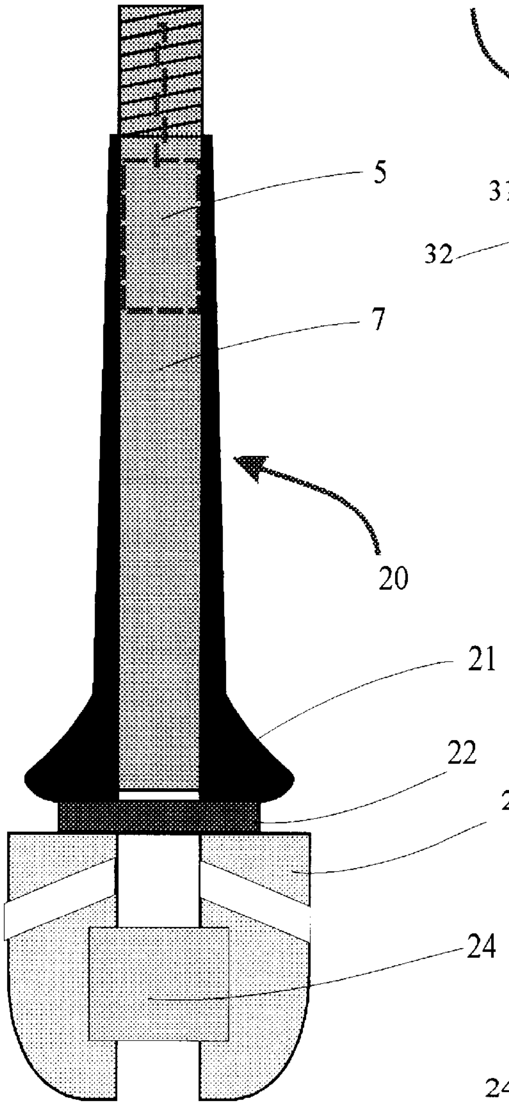
FIG. 2 is a partial cutaway view of an interior SAW tire temperature and pressure monitor mounted onto and below the valve stem.

In FIG. 2A, the SAW sensor 24 comprises a capsule 32 having an interior chamber in communication with the interior of the tire via a passageway 30. A SAW absolute pressure sensor 27 is mounted onto one side of a rigid membrane or separator 31 in the chamber in the capsule 32. Separator 31 divides the interior chamber of the capsule 32 into two compartments 25 and 26, with only compartment 25 being in flow communication with the interior of the tire. The SAW absolute pressure sensor 27 is mounted in compartment 25 which is exposed to the pressure in the tire through passageway 30. A SAW temperature sensor 28 is attached to the other side of the separator 31 and is exposed to the pressure in compartment 26. The pressure in compartment 26 is unaffected by the tire pressure and is determined by the atmospheric pressure when the device was manufactured and the effect of temperature on this pressure. The speed of sound on the SAW temperature sensor 28 is thus affected by temperature but not by pressure in the tire.

The operation of SAW sensors 27 and 28 is discussed elsewhere more fully but briefly, since SAW sensor 27 is affected by the pressure in the tire, the wave which travels along the substrate is affected by this pressure and the time delay between the transmission and reception of a wave can be correlated to the pressure. Similarly, since SAW sensor 28 is affected by the temperature in the tire, the wave which travels along the substrate is affected by this temperature and the time delay between the transmission and reception of a wave can be correlated to the temperature.

Figure 2B:
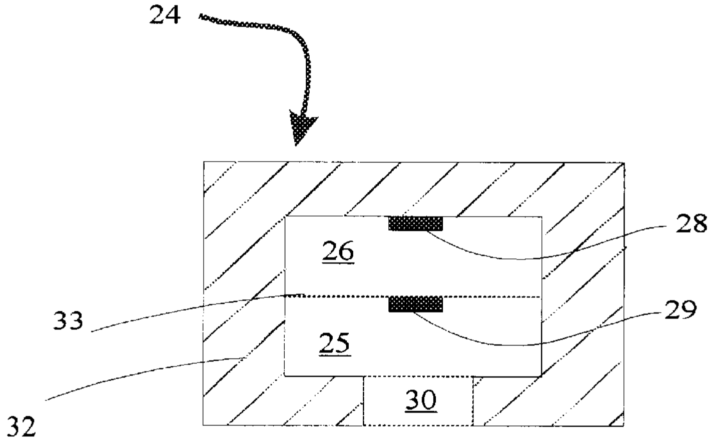
FIG. 2B is a sectioned view of the SAW tire pressure and temperature monitor of FIG. 2 incorporating a differential pressure SAW device.

FIG. 2B illustrates an alternate configuration of sensor 24 where a flexible membrane 33 is used instead of the rigid separator 31 shown in the embodiment of FIG. 2A, and a SAW device is mounted on flexible member 33. In this embodiment, the SAW temperature sensor 28 is mounted to a different wall of the capsule 32. A SAW device 29 is thus affected both by the strain in membrane 33 and the absolute pressure in the tire. Normally, the strain effect will be much larger with a properly designed membrane 33.

The operation of SAW sensors 28 and 29 is discussed elsewhere more fully but briefly, since SAW sensor 28 is affected by the temperature in the tire, the wave which travels along the substrate is affected by this temperature and the time delay between the transmission and reception of a wave can be correlated to the temperature. Similarly, since SAW sensor 29 is affected by the pressure in the tire, the wave which travels along the substrate is affected by this pressure and the time delay between the transmission and reception of a wave can be correlated to the pressure.

In both of the embodiments shown in FIG. 2A and FIG. 2B, a separate temperature sensor is illustrated. This has two advantages. First, it permits the separation of the temperature effect from the pressure effect on the SAW device. Second, it permits a measurement of tire temperature to be recorded. Since a normally inflated tire can experience excessive temperature caused, for example, by an overload condition, it is desirable to have both temperature and pressure measurements of each vehicle tire The SAW devices 27, 28 and 29 are electrically attached to the valve stem 7 which again serves as an antenna to transmit radio frequency information to an interrogator. This electrical connection can be made by a wired connection; however, the impedance between the SAW devices and the antenna may not be properly matched. An alternate approach as described in Varadan, V. K. et al., "Fabrication, characterization and testing of wireless MEMS-IDT based microaccelerometers" Sensors and Actuators A 90 (2001) p. 7–19, 2001 Elsevier Netherlands, incorporated herein by reference, is to inductively couple the SAW devices to the brass tube.

Although an implementation into the valve stem and valve cap examples have been illustrated above, an alternate approach is to mount the SAW temperature and pressure monitoring devices elsewhere within the tire. Similarly, although the tire stem in both cases above serves the antenna, in many implementations, it is preferable to have a separately designed antenna mounted within or outside of the vehicle tire. For example, such an antenna can project into the tire from the valve stem or can be separately attached to the tire or tire rim either inside or outside of the tire. In some cases, it can be mounted on the interior of the tire on the sidewall.

Figure 3A:
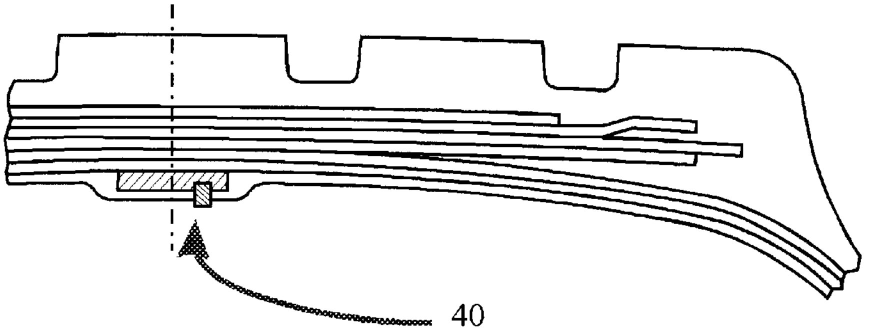
FIG. 3A is a view of an accelerometer-based tire monitor also incorporating a SAW pressure and temperature monitor and inserted into the tire opposite the tread during manufacture.
Figure 3:
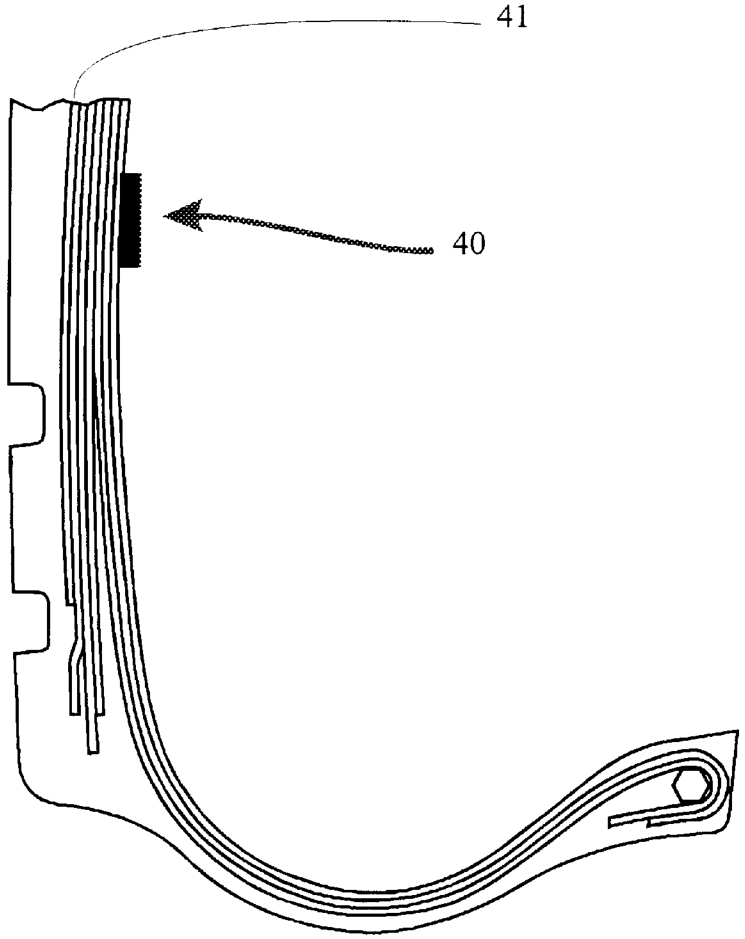
FIG. 3 is a view of an accelerometer-based tire monitor also incorporating a SAW pressure and temperature monitor and cemented to the interior of the tire opposite the tread.

A more advanced embodiment of a tire monitor in accordance with the invention is illustrated generally at 40 in FIGS. 3 and 3A. In addition to temperature and pressure monitoring devices as described in the previous applications, the tire monitor assembly 40 comprises an accelerometer of any of the types to be described below which is configured to measure either or both of the tangential and radial accelerations. Tangential accelerations as used herein mean accelerations tangent to the direction of rotation of the tire and radial accelerations as used herein mean accelerations toward or away from the wheel axis. For either accelerometer case, the acceleration will be zero when the monitor assembly 40 is closest to the road and will be at a maximum when the monitor assembly 40 is at its maximum distance from the road. Both accelerations will increase and decrease at all positions in between.

In FIG. 3, the tire monitor assembly 40 is cemented to the interior of the tire opposite the tread. In FIG. 3A, the tire monitor assembly 40 is inserted into the tire opposite the tread during manufacture.

Superimposed on the acceleration signals will be vibrations introduced into tire from road interactions and due to tread separation and other defects. Additionally, the presence of the nail or other object attached to the tire will, in general, excite vibrations that can be sensed by the accelerometers. When the tread is worn to the extent that the wire belts 41 begin impacting the road, additional vibrations will be induced.

Through monitoring the acceleration signals from the tangential or radial accelerometers within the tire monitor assembly 40, delamination, a worn tire condition, imbedded nails, other debris attached to the tire tread, hernias, can all be sensed. Additionally, as previously discussed, the length of time that the tire tread is in contact with the road opposite tire monitor 40 can be measured and, through a comparison with the total revolution time, the length of the tire footprint on the road can be determined. This permits the load on the tire to be measured, thus providing an indication of excessive tire loading. As discussed above, a tire can fail due to over loading even when the tire interior temperature and pressure are within acceptable limits. Other tire monitors cannot sense such conditions.

Since the acceleration changes during the rotation of the tire, a simple switch containing an acceleration sensing mass can now be designed that would permit data transmission only during one part of the tire rotation. Such a switch can be designed, for example, such that it shorts out the antenna except when the tire is experiencing zero acceleration at which time it permits the device to transmit data to the interrogator. Such a system would save on battery power, for example, for powered systems and minimize bandwidth use for passive systems.

In the discussion above, the use of the tire valve stem as an antenna has been discussed. An antenna can also be placed within the tire when the tire sidewalls are not reinforced with steel. In some cases and for some frequencies, it is sometimes possible to use the tire steel bead or steel belts as an antenna, which in some cases can be coupled to inductively. Alternately, the antenna can be designed integral with the tire beads or belts and optimized and made part of the tire during manufacture.

Although the discussion above has centered on the use of SAW devices, the configuration of FIG. 3 can also be effectively accomplished with other pressure, temperature and accelerometer sensors. One of the advantages of using SAW devices is that they are totally passive thereby eliminating the requirement of a battery. For the implementation of tire monitor assembly 40, the changes in acceleration can also be used to generate sufficient electrical energy to power a silicon microcircuit. In this configuration, additional devices, typically piezoelectric devices, are used as a generator of electricity that can be stored in one or more conventional capacitors or ultra-capacitors. Naturally, other types of electrical generators can be used such as those based on a moving coil and a magnetic field etc. A PVDF piezoelectric polymer can also be used to generate electrical energy based on the flexure of the tire as described below.

Figure 4:
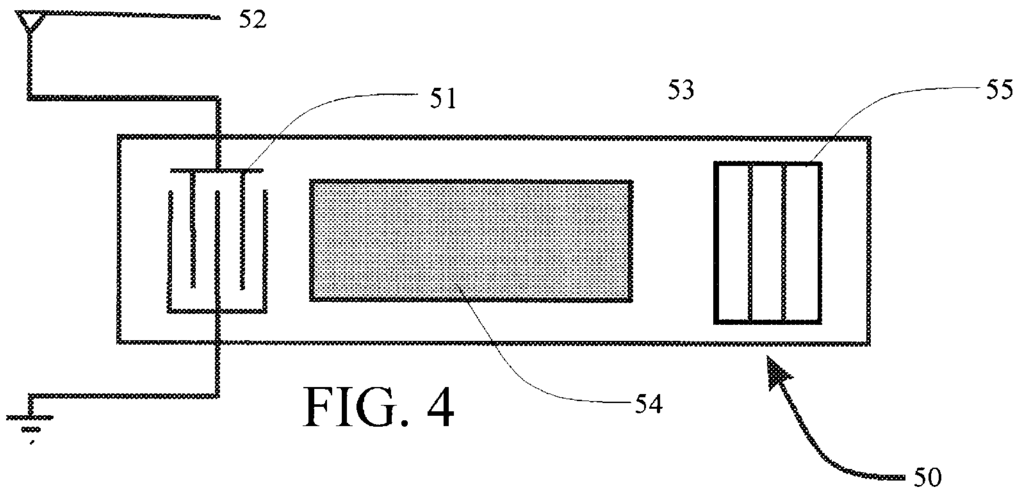
FIG. 4 is a detailed view of a polymer on SAW pressure sensor.

FIG. 4 illustrates an absolute pressure sensor based on surface acoustic wave (SAW) technology. A SAW absolute pressure sensor 50 has an interdigital transducer (IDT) 51 which is connected to antenna 52. Upon receiving an RF signal of the proper frequency, the antenna induces a surface acoustic wave in the material 53 which can be lithium niobate, quartz, zinc oxide, or other appropriate piezoelectric material. As the wave passes through a pressure sensing area 54 formed on the material 53, its velocity is changed depending on the air pressure exerted on the sensing area 54. The wave is then reflected by reflectors 55 where it returns to the IDT 51 and to the antenna 52 for retransmission back to the interrogator. The material in the pressure sensing area 54 can be a thin (such as one micron) coating of a polymer that absorbs or reversibly reacts with oxygen or nitrogen where the amount absorbed depends on the air density. The material in the pressure sensing area 54 can also be a rubber such as silicone rubber or other elastomeric material which serves to couple the air pressure to the surface acoustic wave device. The material of pressure sensing area 54 can either make the device more or less sensitive to air pressure changes depending on the properties of material.

Figure 4A:
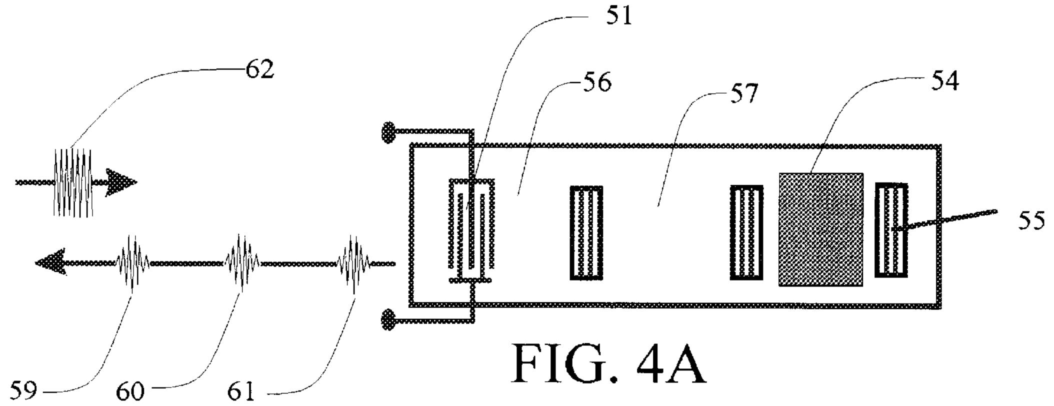
FIG. 4A is a view of a SAW temperature and pressure monitor on a single SAW device.

In FIG. 4A, two additional sections of the SAW device, designated 56 and 57, are provided such that the air pressure affects sections 56 and 57 differently than pressure sensing area 54. This is achieved by providing three reflectors. The three reflecting areas cause three reflected waves to appear, 59, 60 and 61 when input wave 62 is provided. The spacing between waves 59 and 60, and between waves 60 and 61 provides a measure of the pressure. This construction of a pressure sensor may be utilized in the embodiments of FIGS. 1A–3 or in any embodiment wherein a pressure measurement by a SAW device is obtained.

Figure 4B:
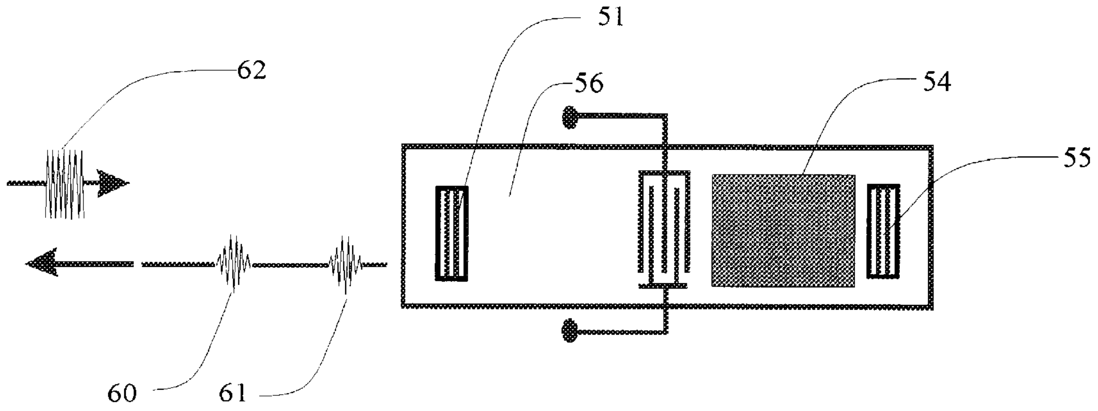
FIG. 4B is a view of an alternate design of a SAW temperature and pressure monitor on a single SAW device.

There are many other ways in which the pressure can be measured based on either the time between reflections or on the frequency or phase change of the SAW device as is well known to those skilled in the art. FIG. 4B, for example, illustrates an alternate SAW geometry where only two sections are required to measure both temperature and pressure. This construction of a temperature and pressure sensor may be utilized in the embodiments of FIGS. 1A–3 or in any embodiment wherein both a pressure measurement and a temperature measurement by a single SAW device is obtained.

Another method where the speed of sound on a piezoelectric material can be changed by pressure was first reported in Varadan et al., "Local/Global SAW Sensors for Turbulence" referenced above. This, phenomenon has not been applied to solving pressure sensing problems within an automobile until now. The instant invention is believed to be the first application of this principle to measuring tire pressure, oil pressure, coolant pressure, pressure in a gas tank, etc. Experiments to date, however, have been unsuccessful.

In some cases, a flexible membrane is placed loosely over the SAW device to prevent contaminants from affecting the SAW surface. The flexible membrane permits the pressure to be transferred to the SAW device without subjecting the surface to contaminants. Such a flexible membrane can be used in most if not all of the embodiments described herein.

Figure 5B:
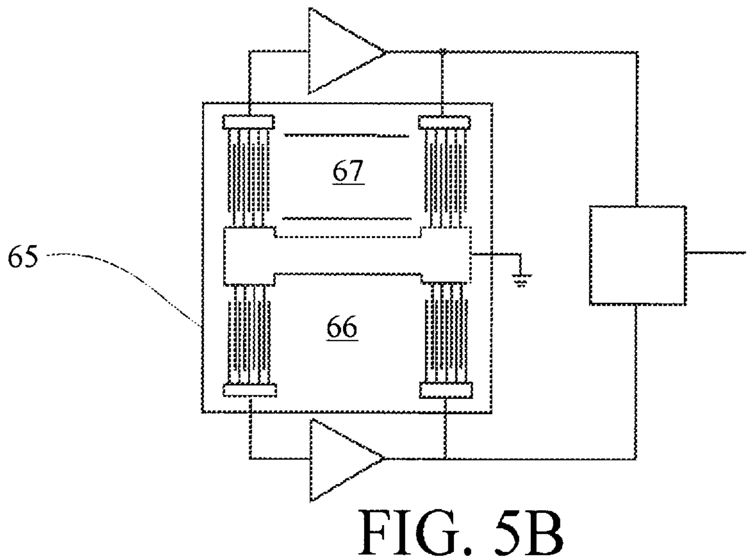
FIG. 5B is a top view of an alternate SAW device capable of determining two physical or chemical properties such as pressure and temperature.
Figure 5A:
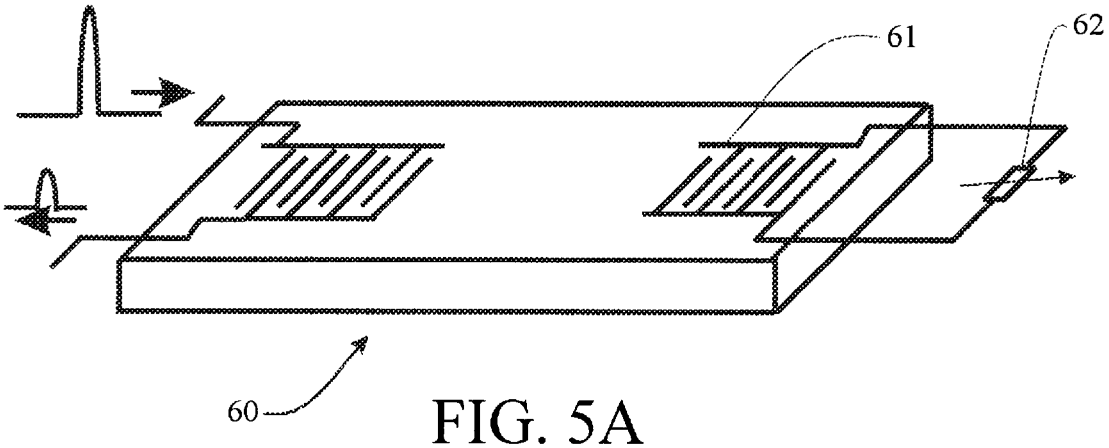
FIG. 5A is a perspective view of a device that can provide two measurements of temperature or one of temperature and another of some other physical or chemical property such as pressure or chemical concentration.
Figure 5:
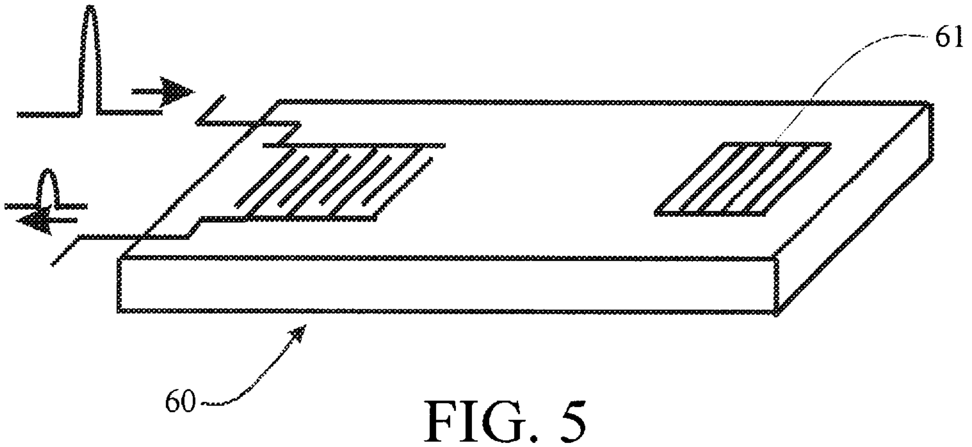
FIG. 5 is a perspective view of a SAW temperature sensor.

A SAW temperature sensor 60 is illustrated in FIG. 5. Since the SAW material, such as lithium niobate, expands significantly with temperature, the natural frequency of the device also changes. Thus, for a SAW temperature sensor to operate, a material for the substrate is selected which changes its properties as a function of temperature, i.e., expands. Similarly, the time delay between the insertion and retransmission of the signal also varies measurably. Since speed of a surface wave is typically 100,000 times slower then the speed of light, usually the time for the electromagnetic wave to travel to the SAW device and back is small in comparison to the time delay of the SAW wave and therefore the temperature is approximately the time delay between transmitting electromagnetic wave and its reception.

An alternate approach as illustrated in FIG. 5A is to place a thermistor 62 across an interdigital transducer (IDT) 61, which is now not shorted as it was in FIG. 5. In this case, the magnitude of the returned pulse varies with the temperature. Thus, this device can be used to obtain two independent temperature measurements, one based on time delay or natural frequency of the device 60 and the other based on the resistance of the thermistor 62.

When some other property such as pressure is being measured by the device 65 as shown in FIG. 5B, two parallel SAW devices are commonly used. These devices are designed so that they respond differently to one of the parameters to be measured. Thus, SAW device 66 and SAW device 67 can be designed to both respond to temperature and respond to pressure. However, SAW device 67, which contains a surface coating, will respond differently to pressure than SAW device 66. Thus, by measuring natural frequency or the time delay of pulses inserted into both SAW devices 66 and 67, a determination can be made of both the pressure and temperature, for example. Naturally, the device which is rendered sensitive to pressure in the above discussion could alternately be rendered sensitive to some other property such as the presence or concentration of a gas, vapor, or liquid chemical as described in more detail below.

Figure 6A:
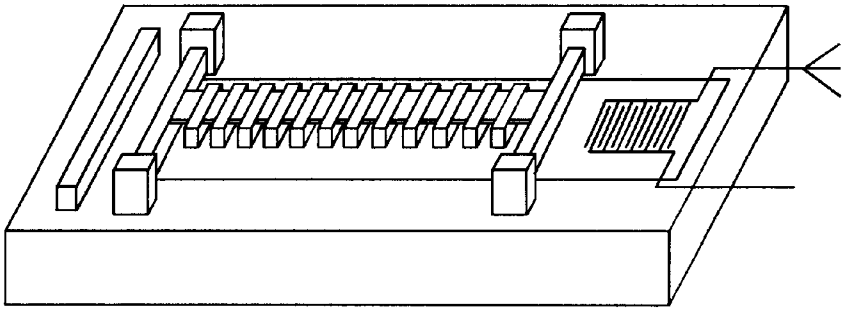
FIG. 6A PRIOR ART
FIGS. 6 and 6A are views of a prior art SAW accelerometer that can be used for the tire monitor assembly of FIG. 3.
Figure 6:
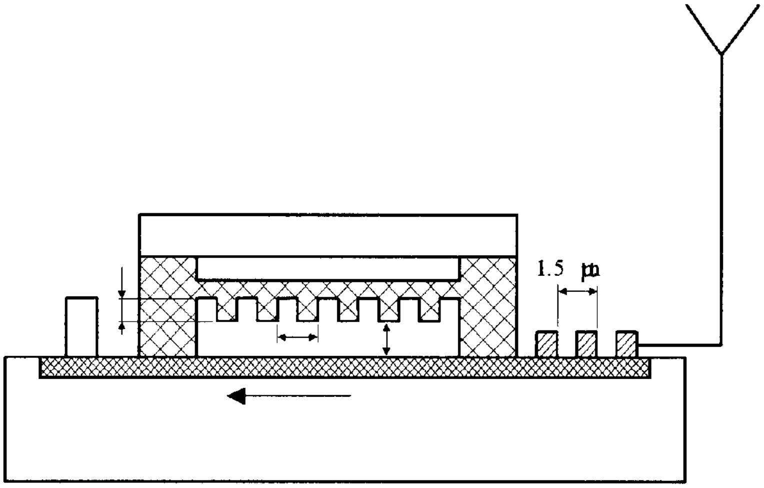
FIG. 6 PRIOR ART

An accelerometer that can be used for either radial or tangential acceleration in the tire monitor assembly of FIG. 3 is illustrated in FIGS. 6 and 6A. The design of this accelerometer is explained in detail in Varadan, V. K. et al., "Fabrication, characterization and testing of wireless MEMS-IDT based microaccelerometers" referenced above, which is incorporated in its entirety herein by reference, and will not be repeated herein.

Figure 7A:
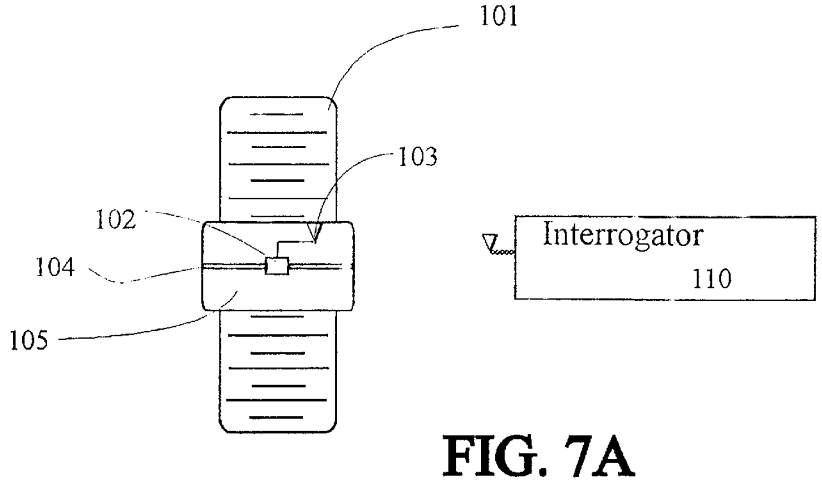
FIGS. 7A, 7B, 7C, 7D and 7E are views of occupant seat weight sensors using a slot spanning SAW strain gage and other strain concentrating designs.

A stud which is threaded on both ends and which can be used to measure the weight of an occupant seat is illustrated in FIGS. 7A–7D. The operation of this device is disclosed in co-pending U.S. patent application Ser. No. 09/849,558 wherein the center section of stud 101 is solid. It has been discovered that sensitivity of the device can be significantly improved if a slotted member is used as described in U.S. Pat. No. 5,539,236, which is incorporated herein by reference. FIG. 7A illustrates a SAW strain gage 102 mounted on a substrate and attached to span a slot 104 in a center section 105 of the stud 101. This technique can be used with any other strain-measuring device.

Figure 7B:
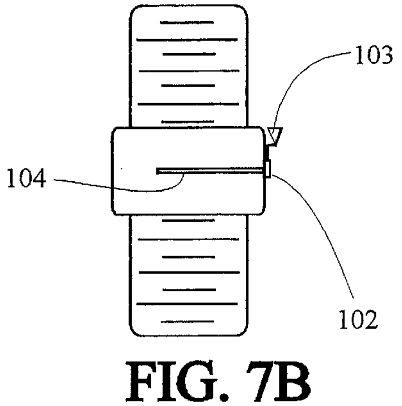

FIG. 7B is a side view of the device of FIG. 7A.

Figure 7C:
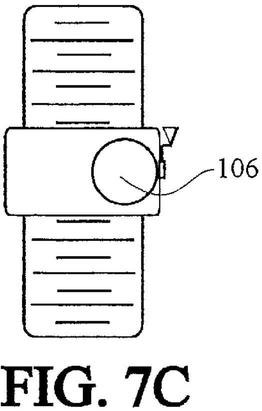

FIG. 7C illustrates use of a single hole 106 drilled off-center in the center section 105 of the stud 101. A single hole 106 also serves to magnify the strain as sensed by the strain gage 102. It has the advantage in that strain gage 102 does not need to span an open space. The amount of magnification obtained from this design, however, is significantly less than obtained with the design of FIG. 7A.

Figure 7D:
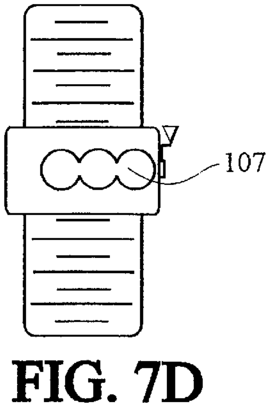
Figure 7E:
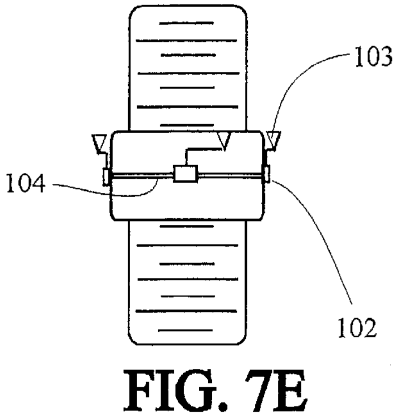

To improve the sensitivity of the device shown in FIG. 7C, multiple smaller holes 107 can be used as illustrated in FIG. 7D. FIG. 7E in an alternate configuration showing four gages for determining the bending moments as well as the axial stress in the support member.

In operation, the SAW strain gage 102 receives radio frequency waves from an interrogator 110 and returns electromagnetic waves via a respective antenna 103 which are delayed based on the strain sensed by strain gage 102.

Figure 8A:
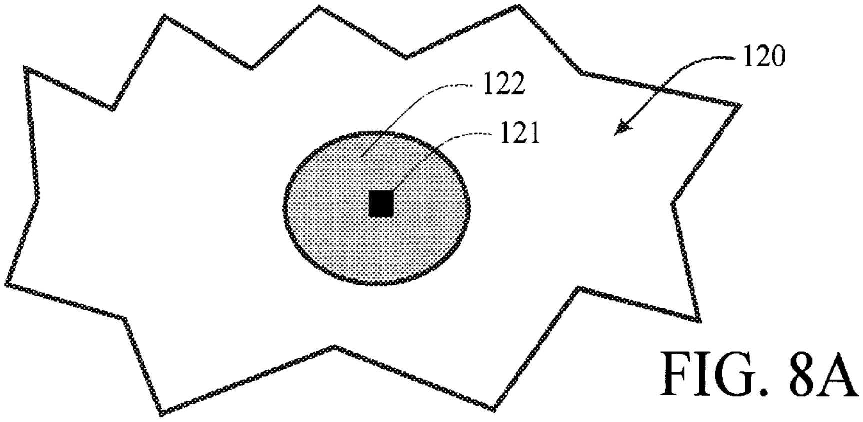
FIG. 8A is a view of a view of a SAW switch sensor for mounting on or within a surface such as a vehicle armrest.
Figure 8B:
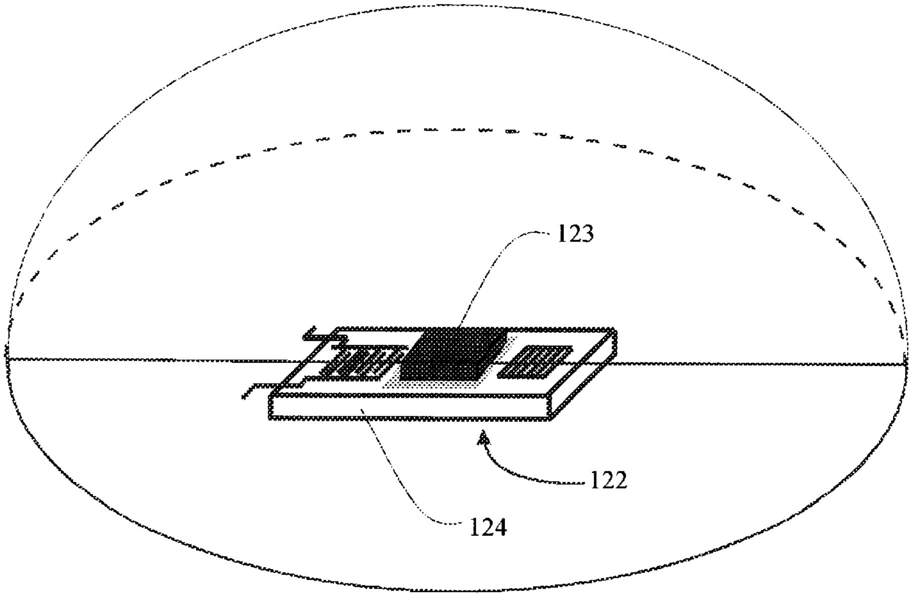
FIG. 8B is a detailed perspective view of the device of FIG. 8A with the force-transmitting member rendered transparent.

A SAW device can also be used as a wireless switch as shown in FIGS. 8A and 8B. FIG. 8A shows a surface 120 containing a projection 122 on top of a SAW device 121. Surface material 120 could be, for example, the armrest of an automobile, the steering wheel airbag cover, or any other surface within the passenger compartment of an automobile or elsewhere. Projection 122 will typically be a material which is capable of transmitting force to the surface of SAW device 121. As shown in FIG. 8B, a projection 123 may be placed on top of the SAW device 124. This projection 123 permits force exerted on the projection 122 to create a pressure on the SAW device 124. This increased pressure changes the time delay or natural frequency of the SAW wave traveling on the surface of material. Alternately, it can affect the magnitude of the retuned signal. The projection 123 is typically held slightly out of contact with the surface until forced into contact with it.

Figure 8C:
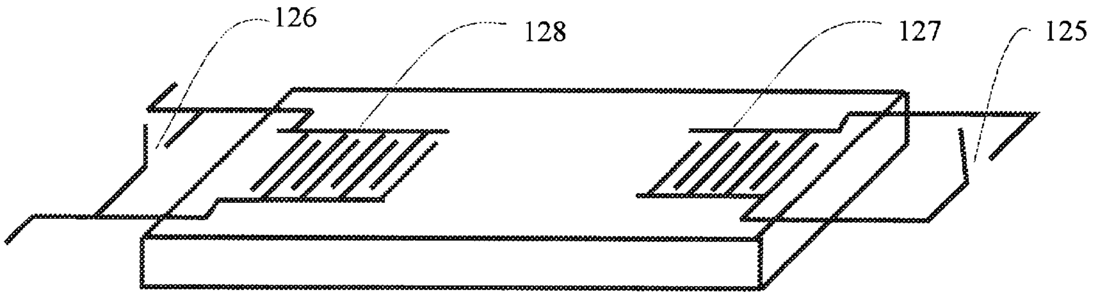
FIG. 8C is a detailed perspective view of an alternate SAW device for use in FIGS. 8A and 8B showing the use of one of two possible switches, one that activates the SAW and the other that suppresses the SAW.

An alternate approach is to place a switch across the IDT 127 as shown in FIG. 8C. If switch 125 is open, then the device will not return a signal to the interrogator. If it is closed, than the IDT 127 will act as a reflector sending a single back to IDT 128 and thus to the interrogator. Alternately, a switch 126 can be placed across the SAW device. In this case, a switch closure shorts the SAW device and no signal is returned to the interrogator. For the embodiment of FIG. 8C, using switch 126 instead of switch 125, a standard reflector IDT would be used in place of the IDT 127.

Figure 9A:
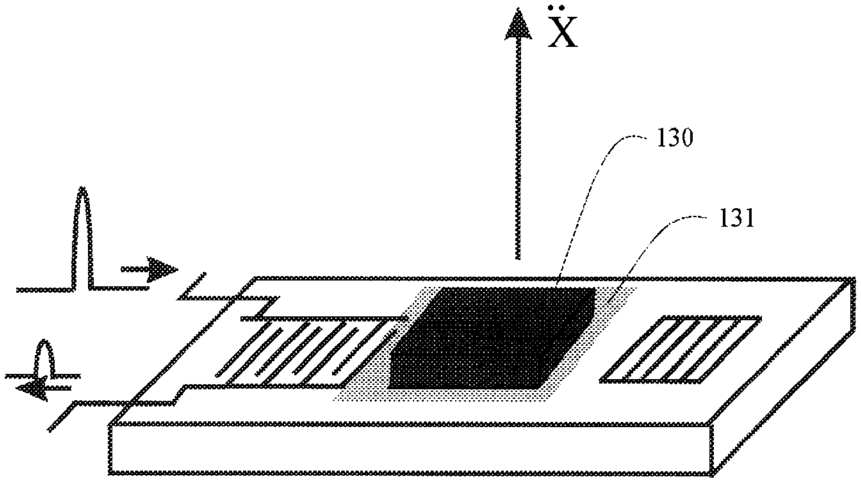
FIG. 9A is a detailed perspective view of a polymer and mass on SAW accelerometer for use in crash sensors, vehicle navigation, etc.
Figure 9B:
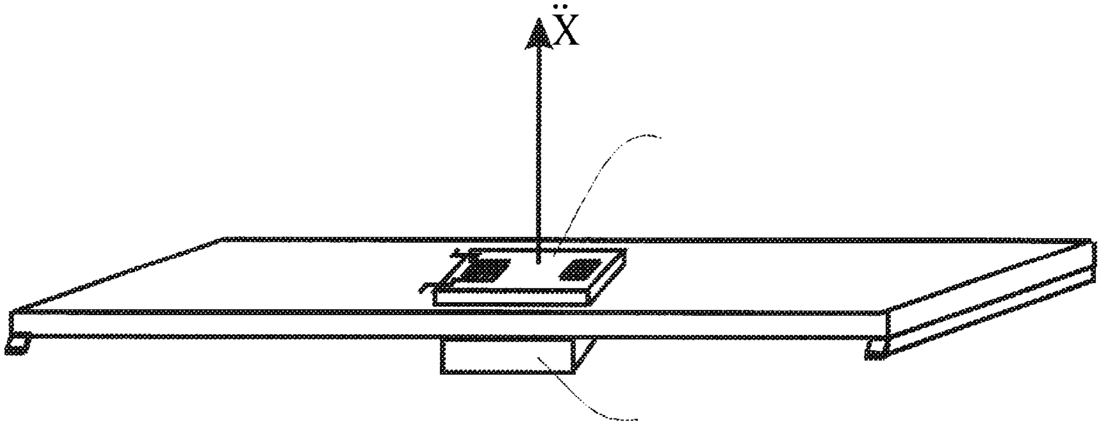
FIG. 9B is a detailed perspective view of a normal mass on SAW accelerometer for use in crash sensors, vehicle navigation, etc.

Most SAW-based accelerometers work on the principle of straining the SAW surface and thereby changing either the time delay or natural frequency of the system. An alternate novel accelerometer is illustrated FIG. 9A wherein a mass 130 is attached to a silicone rubber coating 131 which has been applied the SAW device. Acceleration of the mass in FIG. 9 in the direction of arrow X changes the amount of rubber in contact with the surface of the SAW device and thereby changes the damping, natural frequency or the time delay of the device. By this method, accurate measurements of acceleration below 1 G are readily obtained. Furthermore, this device can withstand high deceleration shocks without damage. The device acts a similar manner as the pressure sensors described above where mass provides the source of pressure. FIG. 9B illustrates a more conventional approach where the strain in a beam 137 caused by the acceleration acting on a mass 136 is measured with a SAW strain sensor 135.

It is important to note that all of these devices have a high dynamic range compared with most competitive technologies. In some cases, this dynamic range can exceed 100,000. This is the direct result of the ease with which frequency and phase can be accurately measured.

Figure 10:
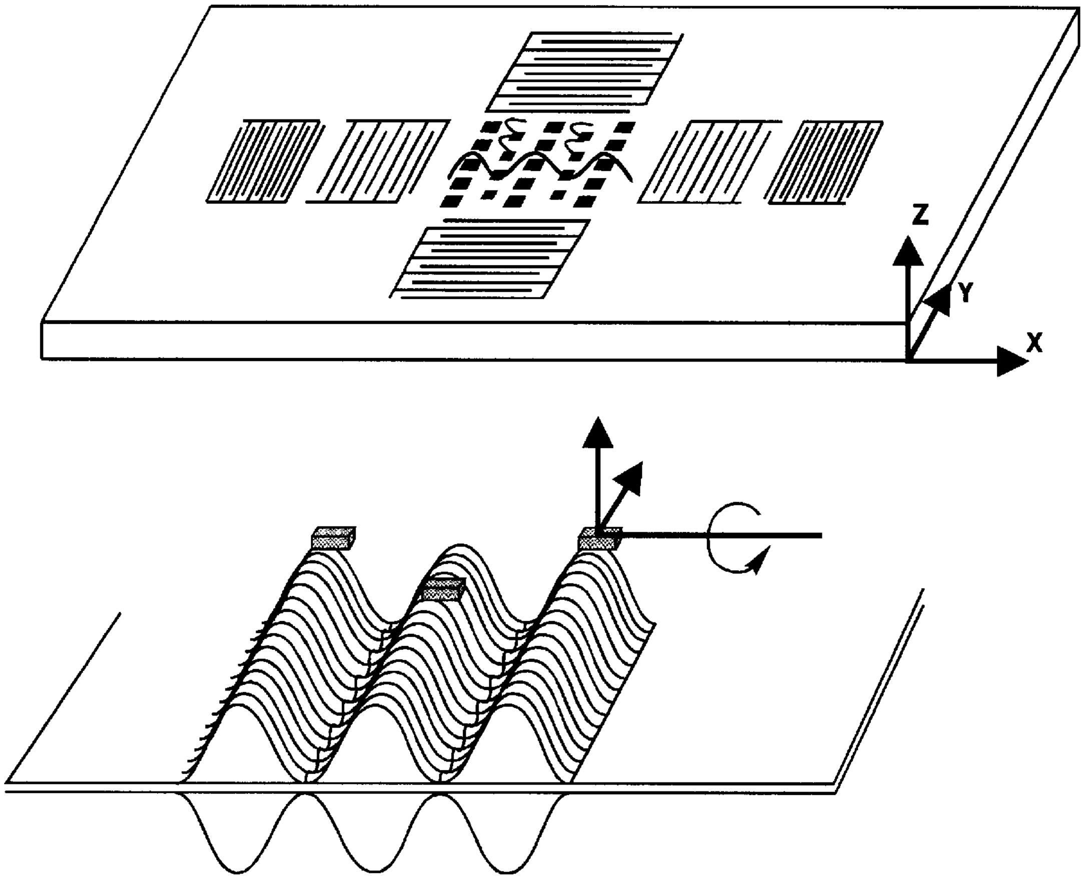
FIG. 10 is a view of a prior art SAW gyroscope that can be used with this invention.

A gyroscope, which is suitable for automotive applications, is illustrated in FIG. 10 and described in detail in V. K. Varadan's International Application No. WO 00/79217, which is incorporated by reference herein in its entirety. This SAW-based gyroscope has applicability for the vehicle navigation, dynamic control, and rollover sensing among others.

Figure 11A:
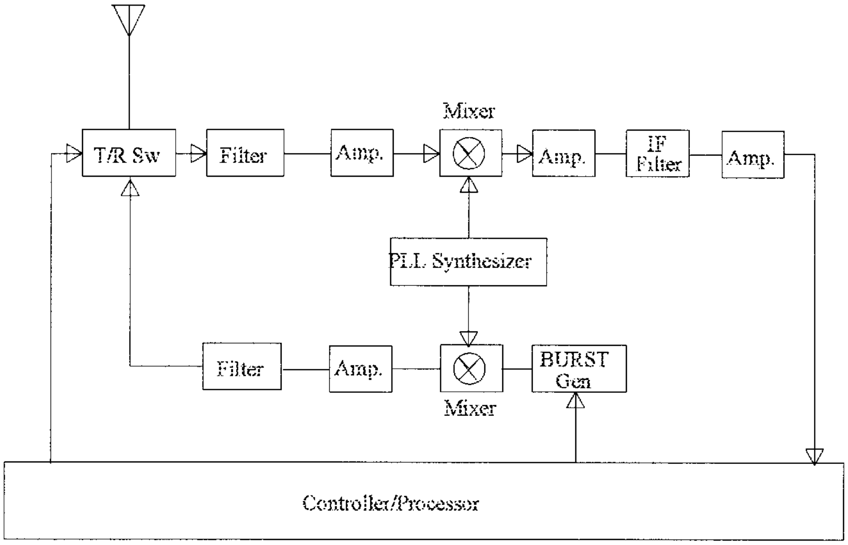
FIG. 11A, 11B and 11C are a block diagrams of three interrogators that can be used with this invention to interrogate several different devices.
Figure 11B:
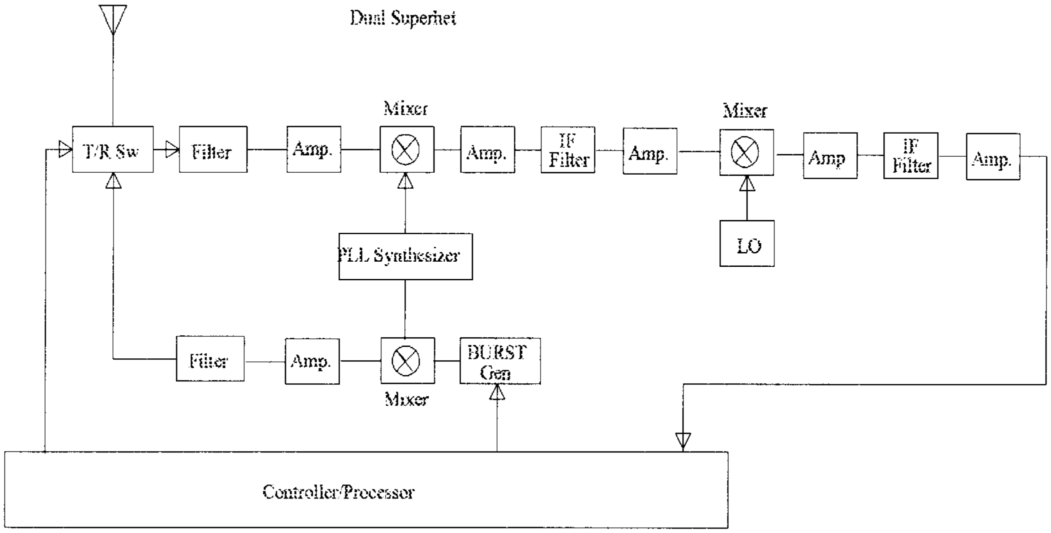
Figure 11C:
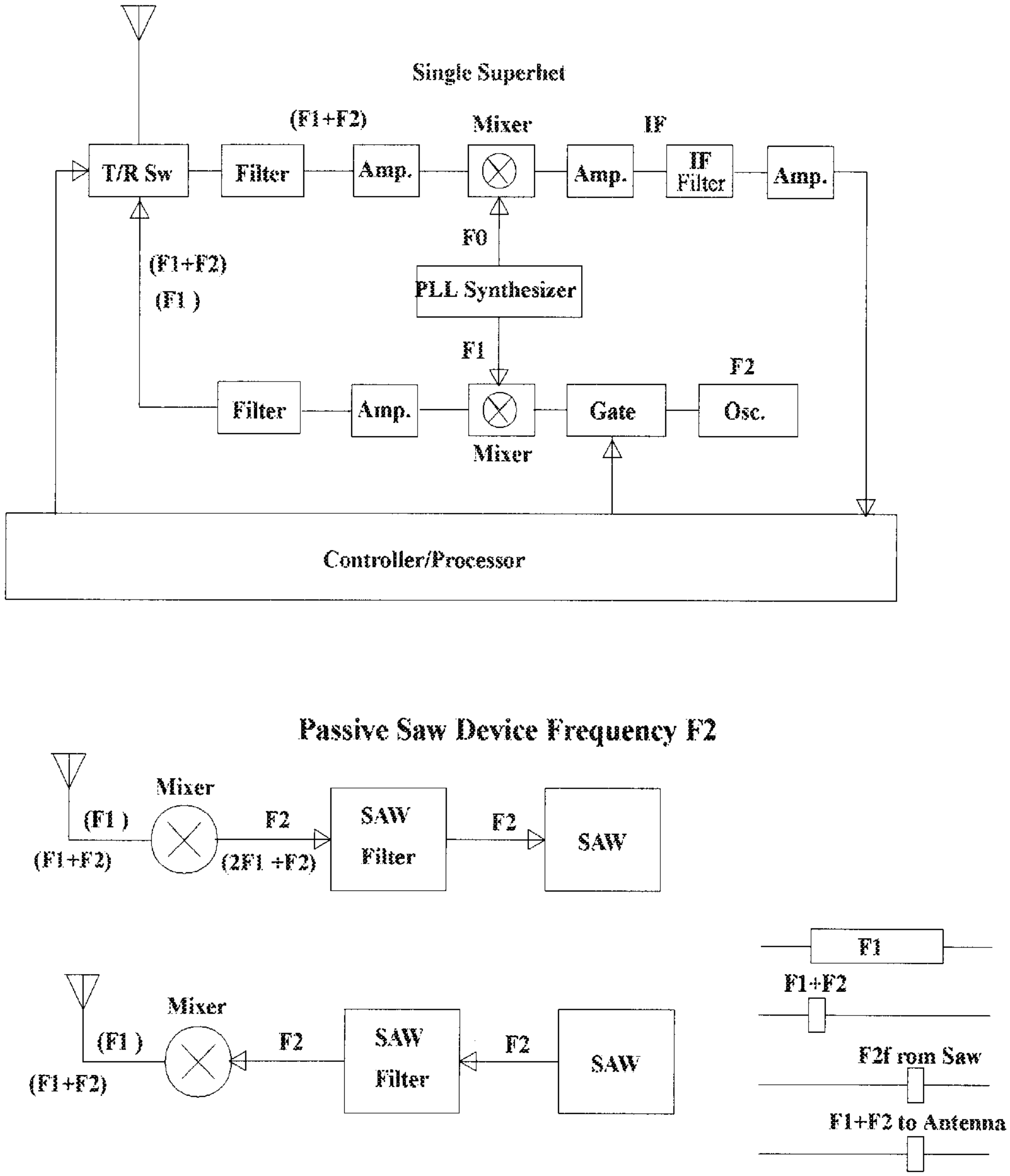

Note that any of the disclosed applications can be interrogated by the central interrogator of this invention and can either be powered or operated powerlessly as described in general above. Block diagrams of three interrogators suitable for use in this invention are illustrated in FIGS. 11A–11C. FIG. 11A illustrates a superheterodyne circuit and FIG. 11B illustrates a dual superheterodyne circuit. FIG. 11C operates as follows. During the burst time two frequencies, F1 and F1+F2, are sent by the transmitter after being generated by mixing using oscillator Osc. The two frequencies are needed by the SAW transducer where they are mixed yielding F2 which is modulated by the SAW and contains the information. Frequency (F1+F2) is sent only during the burst time while frequency F1 remains on until the signal F2 returns from the SAW. This signal is used for mixing. The signal returned from the SAW transducer to the interrogator is F1+F2 where F2 has been modulated by the SAW transducer. It is expected that the mixing operations will result in about 12 db loss in signal strength.

Figure 12:
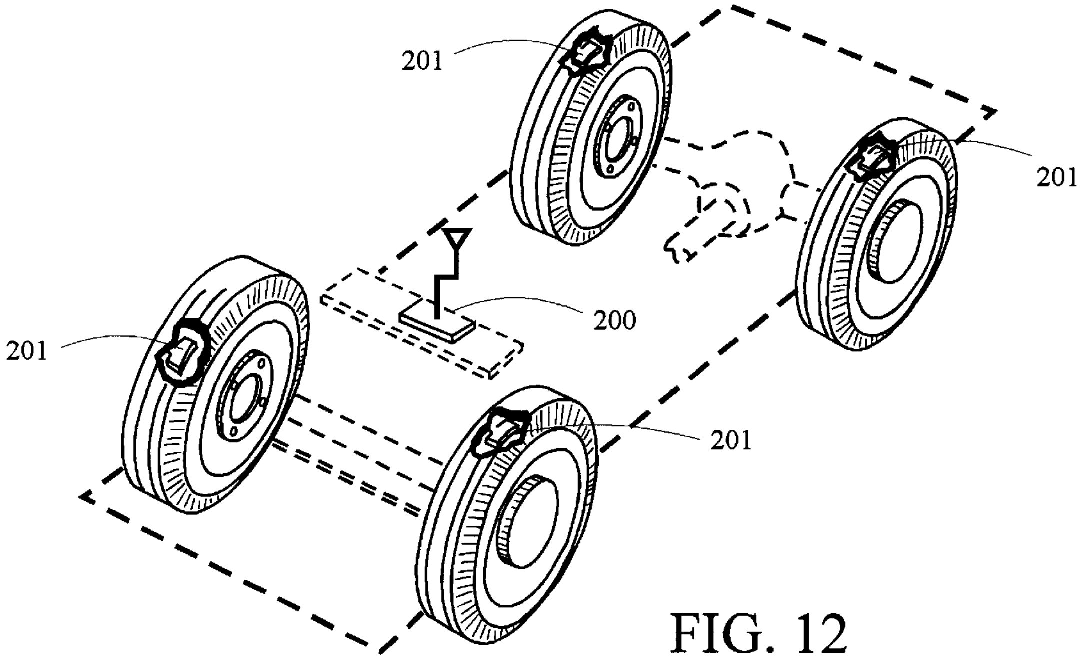
FIG. 12 is a perspective view of a SAW antenna system adapted for mounting underneath a vehicle and for communicating with the four mounted tires.

FIG. 12 illustrates a central antenna mounting arrangement for permitting interrogation of the tire monitors for four tires and is similar to that described in U.S. Pat. No. 4,237,728, which is incorporated by reference herein. An antenna package 200 is mounted on the underside of the vehicle and communicates with devices 201 through their antennas as described above. In order to provide for antennas both inside (for example for weight sensor interrogation) and outside of the vehicle, another antenna assembly (not shown) can be mounted on the opposite side of the vehicle floor from the antenna assembly 200.

Figure 12A:
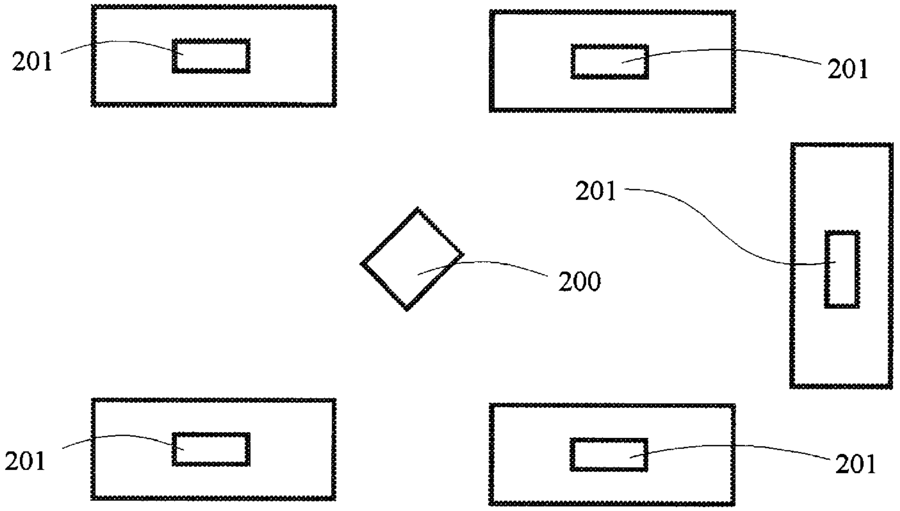
FIG. 12A is a detail view of an antenna system for use in the system of FIG. 12.

FIG. 12A is a schematic of the vehicle shown in FIG. 12. The antenna package 200, which can be considered as an electronics module, contains a time domain multiplexed antenna array that sends and receives data from each of the five tires (including the spare tire), one at a time. It comprises a microstrip or stripline antenna array and a microprocessor on the circuit board. The antennas that face each tire are in an X configuration so that the transmissions to and from the tire can be accomplished regardless of the tire rotation angle.

Figure 13:
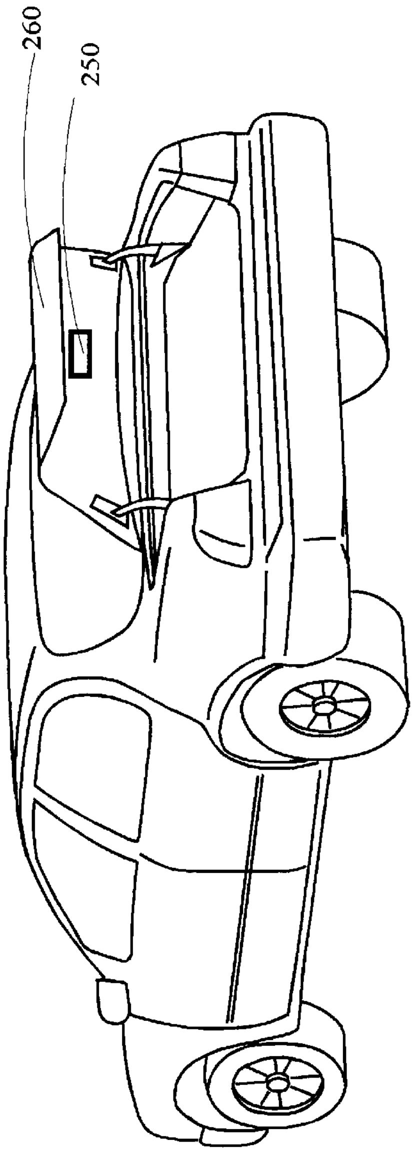
FIG. 13 is a perspective view of a carbon dioxide SAW sensor for mounting in the trunk lid for monitoring the inside of the trunk for detecting trapped children or animals.
Figure 13A:
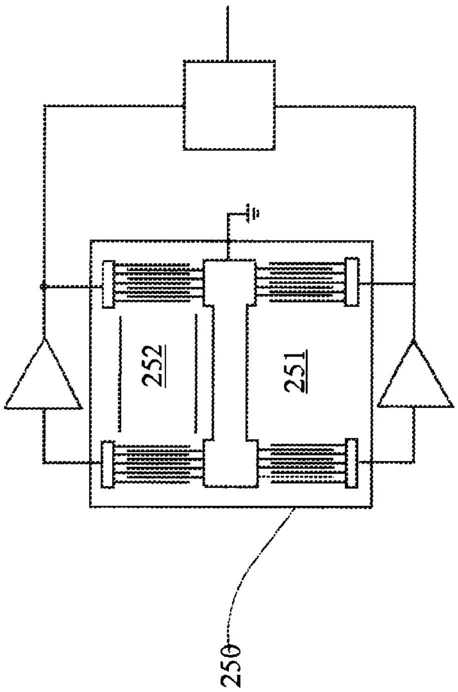
FIG. 13A is a detailed view of the SAW carbon dioxide sensor of FIG. 13.

A chemical sensor 250 similar to the sensor of FIG. 5B is illustrated in FIG. 13A for mounting in a vehicle trunk as illustrated in FIG. 13. The chemical sensor 250 is designed to measure carbon dioxide concentration through the mass loading effects as described in U.S. Pat. No. 4,895,017, which is incorporated by reference herein, with a polymer coating selected that is sensitive to carbon dioxide. The speed of the surface acoustic wave is a function of the carbon dioxide level in the atmosphere. Section 252 of the SAW device contains a coating of such a polymer and the acoustic velocity in this section is a measure of the carbon dioxide concentration. Temperature effects are eliminated through a comparison of the sonic velocities in sections 251 and 252 as described above.

Thus, when trunk lid 260 is closed and a source of carbon dioxide such as a child or animal is trapped within the trunk, the chemical sensor 250 will provide information indicating the presence of the carbon dioxide producing object to the interrogator which can then release the trunk lock permitting trunk to automatically open. In this manner, the problem of children and animals suffocating in closed trunks is eliminated.

A similar device can be distributed at various locations within the passenger compartment of vehicle along with a combined temperature sensor. If the car has been left with a child or other animal while owner is shopping, for example, and if the temperature rises within the vehicle to an unsafe level or, alternately, if the temperature drops below an unsafe level, then the vehicle can be signaled to take appropriate action which may involve opening the windows or starting the vehicle with either air conditioning or heating as appropriate. Thus, through these simple wireless powerless sensors, the problem of suffocation either from lack of oxygen or death from excessive heat or cold can all be solved in a simple, low-cost manner through using the same interrogator as used for other devices such as tire monitoring.

Additionally, a sensitive layer on a SAW can be made to be sensitive to other chemicals such as water vapor for humidity control or alcohol for drunk driving control. Similarly, the sensitive layer can be designed to be sensitive to carbon monoxide thereby preventing carbon monoxide poisoning. Many other chemicals can be sensed for specific applications such as to check for chemical leaks in commercial vehicles, for example. Whenever such a sensor system determines that a dangerous situation is developing, an alarm can be sounded and/or the situation can be automatically communicated to an off vehicle location through telematics, a cell phone such as a 911 call, the Internet or though a subscriber service such as OnStar®.

Figure 14:
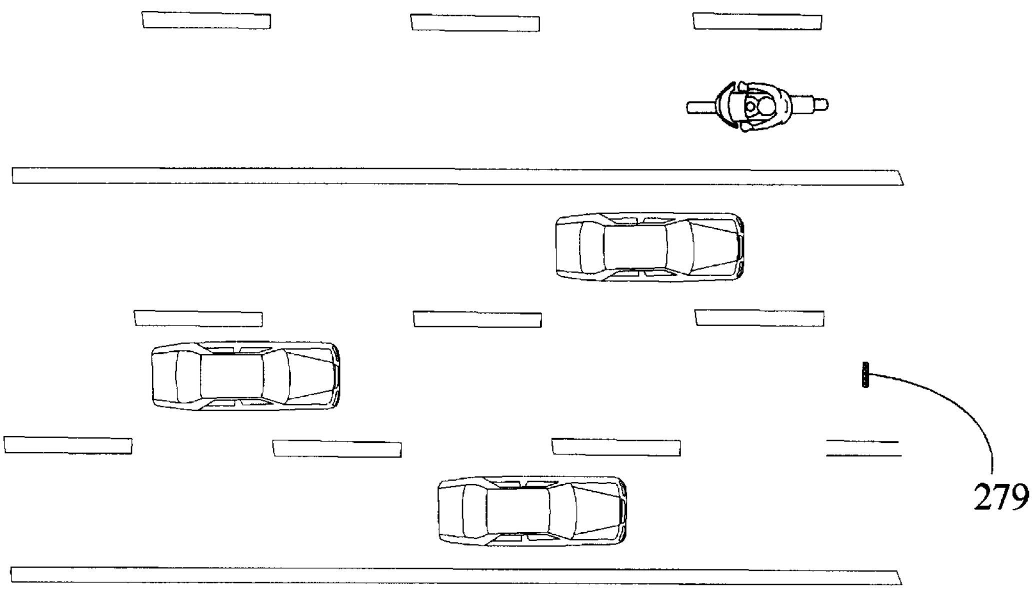
FIG. 14 is an overhead view of a roadway with vehicles and a SAW road temperature and humidity monitoring sensor.
Figure 14A:
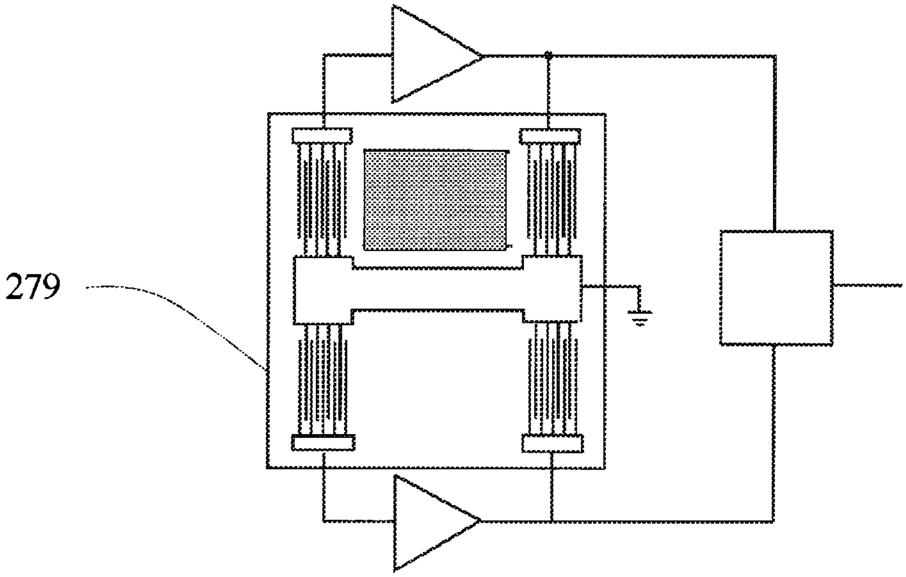
FIG. 14A is a detail drawing of the monitoring sensor of FIG. 14.

Based on the frequency and power available, and on FCC limitations, SAW devices can be designed to permit transmission distances of up to 100 feet or more. Since SAW devices can measure both temperature and humidity, they are also capable of monitoring road conditions in front of and around a vehicle. Thus, a properly equipped vehicle can determine the road conditions prior to entering a particular road section if such SAW devices are embedded in the road surface or on mounting structures close to the road surface as shown at 279 in FIG. 14. Such devices could provide advance warning of freezing conditions, for example. Although at 60 miles per hour, such devices may only provide a one second warning, this can be sufficient to provide information to a driver to prevent dangerous skidding. Additionally, since the actual temperature and humidity can be reported, the driver will be warned prior to freezing of the road surface. SAW device 279 is shown in detail in FIG. 14A.

Furthermore, the determination of freezing conditions of the roadway could be transmitted to a remote location where such information is collected and processed. All information about roadways in a selected area could be collected by the roadway maintenance department and used to dispatch snow removal vehicles, salting/sanding equipment and the like. To this end, the interrogator would be coupled to a communications device arranged on the vehicle and capable of transmitting information via a satellite, ground station, over the Internet and via other communications means. A communications channel could also be established to enable bi-directional communications between the remote location and the vehicle.

The information about the roadway obtained from the sensors by the vehicle could be transmitted to the remote location along with data on the location of the vehicle, obtained through a location-determining system possibly using GPS technology. Additional information, such as the status of the sensors, the conditions of the environment obtained from vehicle-mounted or roadway-infrastructure-mounted sensors, the conditions of the vehicle obtained from vehicle-mounted sensors, the occupants obtained from vehicle-mounted sensors, etc., could also be transmitted by the vehicle's transmission device or communications device to receivers at one or more remote locations. Such receivers could be mounted to roadway infrastructure or on another vehicle. In this manner, a complete data package of information obtained by a single vehicle could be disseminated to other vehicles, traffic management locations, road condition management facilities and the like. So long as a single vehicle equipped with such a system is within range of each sensor mounted in the roadway or along the roadway, information about the entire roadway can be obtained and the entire roadway monitored.

Figure 15:
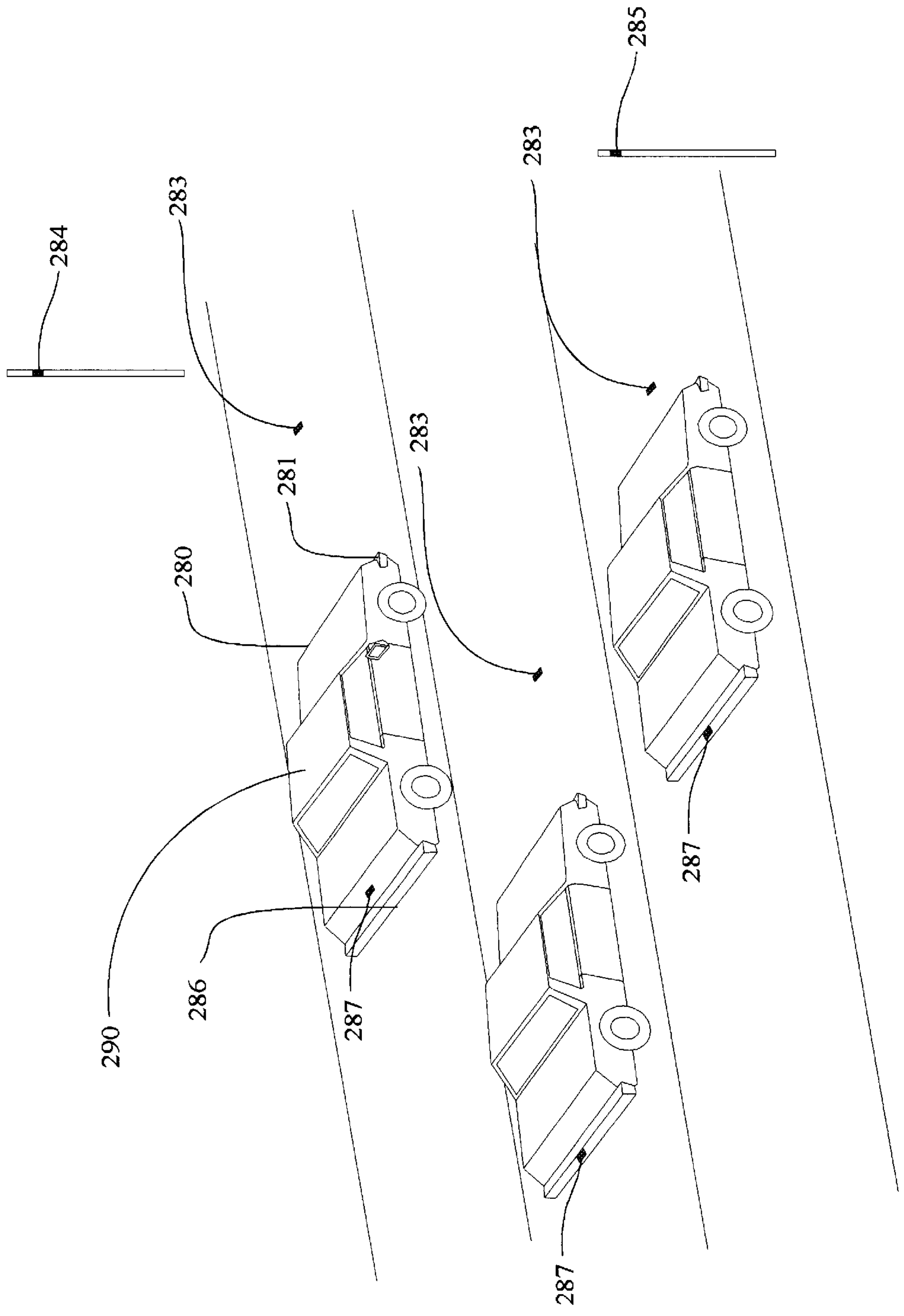
FIG. 15 is a perspective view of a SAW system for locating a vehicle on a roadway, and on the earth surface if accurate maps are available. It also illustrates the use of a SAW transponder in the license plate for the location of preceding vehicles and preventing rear end impacts.

If a SAW device 283 is placed in a roadway, possibly embedded in the roadway or arranged in a housing embedded or attached to the roadway, as illustrated in FIG. 15, and if a vehicle 290 has two receiving antennas 280 and 281, an interrogator can transmit a signal from either of the two antennas and at a later time, the two antennas will receive the transmitted signal from the SAW device. By comparing the arrival time of the two received pulses, the position of vehicle on a lane can precisely determined (since the direction from each antenna 280,281 to the SAW device 283 can be calculated). If the SAW device 283 has an identification code encoded into the returned signal generated thereby, then the vehicle 290 can determine, providing a precise map is available, its position on the surface of the earth. If another antenna 286 is provided, for example, at the rear of the vehicle 290 then the longitudinal position of the vehicle can also be accurately determined as the vehicle passes the SAW device 283. Of course the SAW device 283 need not be in the center of the road. Alternate locations for positioning of the SAW device 283 arc on overpasses above the road and on poles such as 284 and 285 on the roadside. Such a system has an advantage over a competing system using radar and reflectors in that it is easier to measure the relative time between the two received pulses than it is to measure time of flight of a radar signal to a reflector and back. Such a system operates in all weather conditions and is known as a precise location system. Eventually such a SAW device 283 can be placed every tenth of a mile along the roadway or at some other appropriate spacing If a vehicle is being guided by a DGPS and accurate map system such as disclosed in U.S. patent application Ser. No. 09/679,317 filed Oct. 4, 2000, which is incorporated by reference herein, a problem arises when the GPS receiver system looses satellite lock as would happen when the vehicle enters a tunnel, for example. If a precise location system as described above is placed at the exit of the tunnel then the vehicle will know exactly where it is and can re-establish satellite lock in as little as one second rather than typically 15 seconds as might otherwise be required. Other methods making use of the cell phone system can be used to establish an approximate location of the vehicle suitable for rapid acquisition of satellite lock as described in G. M. Djuknic, R. E. Richton "Geolocation and Assisted GPS", Computer Magazine, February 2001, IEEE Computer Society, which is incorporated by reference herein in its entirety.

More particularly, geolocation technologies that rely exclusively on wireless networks such as time of arrival, time difference of arrival, angle of arrival, timing advance, and multipath fingerprinting offer a shorter time-to-first-fix (TTFF) than GPS. They also offer quick deployment and continuous tracking capability for navigation applications, without the added complexity and cost of upgrading or replacing any existing GPS receiver in vehicles. Compared to either mobile-station-based, stand-alone GPS or network-based geolocation, assisted-GPS (AGPS) technology offers superior accuracy, availability, and coverage at a reasonable cost. AGPS for use with vehicles would comprise a communications unit with a partial GPS receiver arranged in the vehicle, an AGPS server with a reference GPS receiver that can simultaneously "see" the same satellites as the communications unit, and a wireless network infrastructure consisting of base stations and a mobile switching center. The network can accurately predict the GPS signal the communication unit will receive and convey that information to the mobile, greatly reducing search space size and shortening the TTFF from minutes to a second or less. In addition, an AGPS receiver in the communication unit can detect and demodulate weaker signals than those that conventional GPS receivers require. Because the network performs the location calculations, the communication unit only needs to contain a scaled-down GPS receiver. It is accurate within about 15 meters when they are outdoors, an order of magnitude more sensitive than conventional GPS.

Because an AGPS server can obtain the vehicle's position from the mobile switching center, at least to the level of cell and sector, and at the same time monitor signals from GPS satellites seen by mobile stations, it can predict the signals received by the vehicle for any given time. Specifically, the server can predict the Doppler shift due to satellite motion of GPS signals received by the vehicle, as well as other signal parameters that are a function of the vehicle's location. In a typical sector, uncertainty in a satellite signal's predicted time of arrival at the vehicle is about ±5 $\mu$s, which corresponds to ±5 chips of the GPS coarse acquisition (C/A) code. Therefore, an AGPS server can predict the phase of the pseudorandom noise (PRN) sequence that the receiver should use to despread the C/A signal from a particular satellite—each GPS satellite transmits a unique PRN sequence used for range measurements—and communicate that prediction to the vehicle. The search space for the actual Doppler shift and PRN phase is thus greatly reduced, and the AGPS receiver can accomplish the task in a fraction of the time required by conventional GPS receivers. Further, the AGPS server maintains a connection with the vehicle receiver over the wireless link, so the requirement of asking the communication unit to make specific measurements, collect the results, and communicate them back is easily met. After despreading and some additional signal processing, an AGPS receiver returns back "pseudoranges"—that is, ranges measured without taking into account the discrepancy between satellite and receiver clocks—to the AGPS server, which then calculates the vehicle's location. The vehicle can even complete the location fix itself without returning any data to the server.

Sensitivity assistance, also known as modulation wipe-off, provides another enhancement to detection of GPS signals in the vehicle's receiver. The sensitivity-assistance message contains predicted data bits of the GPS navigation message, which are expected to modulate the GPS signal of specific satellites at specified times. The mobile station receiver can therefore remove bit modulation in the received GPS signal prior to coherent integration. By extending coherent integration beyond the 20-ms GPS data-bit period—to a second or more when the receiver is stationary and to 400 ms when it is fast-moving—this approach improves receiver sensitivity. Sensitivity assistance provides an additional 3-to-4 dB improvement in receiver sensitivity. Because some of the gain provided by the basic assistance—code phases and Doppler shift values—is lost when integrating the GPS receiver chain into a mobile system, this can prove crucial to making a practical receiver.

Achieving optimal performance of sensitivity assistance in TIA/EIA-95 CDMA systems is relatively straightforward because base stations and mobiles synchronize with GPS time. Given that global system for mobile communication (GSM), time division multiple access (TDMA), or advanced mobile phone service (AMPS) systems do not maintain such stringent synchronization, implementation of sensitivity assistance and AGPS technology in general will require novel approaches to satisfy the timing requirement. The standardized solution for GSM and TDMA adds time calibration receivers in the field—location measurement units—that can monitor both the wireless-system timing and GPS signals used as a timing reference.

Many factors affect the accuracy of geolocation technologies, especially terrain variations such as hilly versus flat and environmental differences such as urban versus suburban versus rural. Other factors, like cell size and interference, have smaller but noticeable effects. Hybrid approaches that use multiple geolocation technologies appear to be the most robust solution to problems of accuracy and coverage.

AGPS provides a natural fit for hybrid solutions because it uses the wireless network to supply assistance data to GPS receivers in vehicles. This feature makes it easy to augment the assistance-data message with low-accuracy distances from receiver to base stations measured by the network equipment. Such hybrid solutions benefit from the high density of base stations in dense urban environments, which are hostile to GPS signals. Conversely, rural environments—where base stations are too scarce for network-based solutions to achieve high accuracy—provide ideal operating conditions for AGPS because GPS works well there.

SAW transponders can also be placed in the license plates 287 (FIG. 15) of all vehicles at nominal cost. An appropriately equipped automobile can then determine the angular location of vehicles in its vicinity. If a third antenna 286 is placed at the center of the vehicle front, then an indication of the distance to a license plate of a preceding vehicle can also be obtained as described above. Thus, once again, a single interrogator coupled with multiple antenna systems can be used for many functions. Alternately, if more than one SAW transponders is placed spaced apart on a vehicle and if two antennas are on the other vehicle, then the direction and position of the SAW vehicle can be determined by the receiving vehicle.

Figure 16:
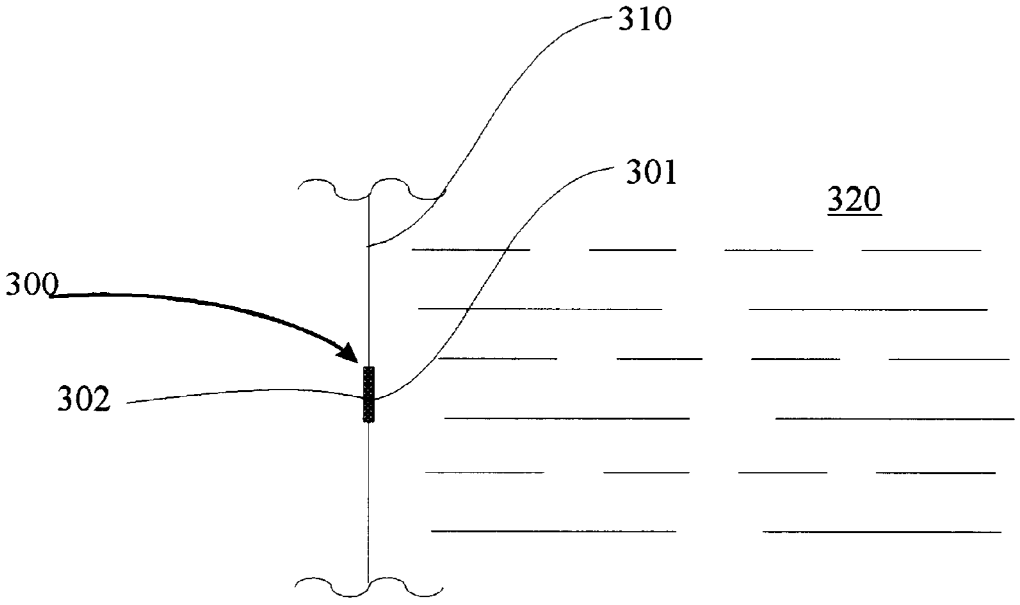
FIG. 16 is a partial cutaway view of a section of a fluid reservoir with a SAW fluid pressure and temperature sensor for monitoring oil, water, or other fluid pressure.

A general SAW temperature and pressure gage which can be wireless and powerless is shown generally at 300 located in the sidewall 310 of a fluid container 320 in FIG. 16. A pressure sensor 301 is located on the inside of the container 320, where it measures deflection of the container wall, and the fluid temperature sensor 302 on the outside. The temperature measuring SAW 300 can be covered with an insulating material to avoid influence from the ambient temperature outside of the container 320.

Figure 17:
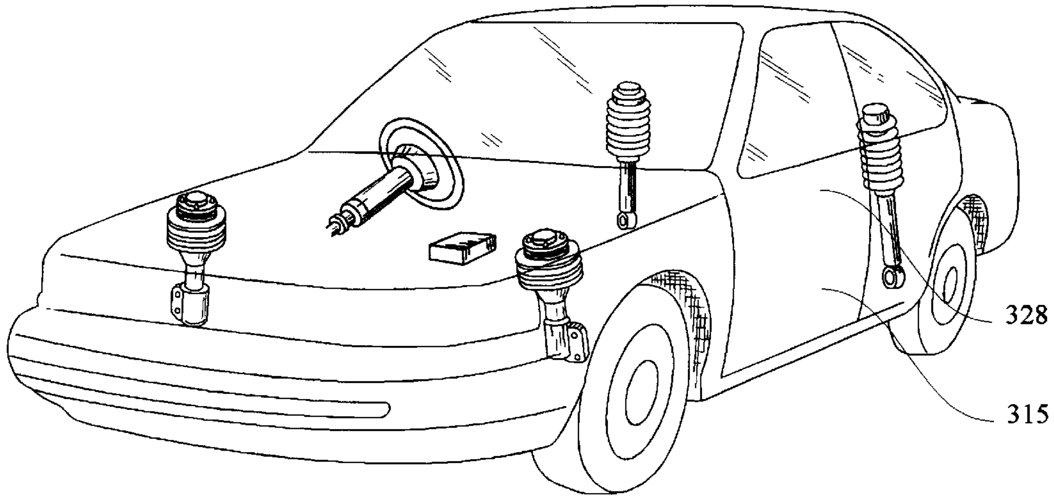
FIG. 17 is a perspective view of a vehicle suspension system with SAW load sensors.
Figure 17B:
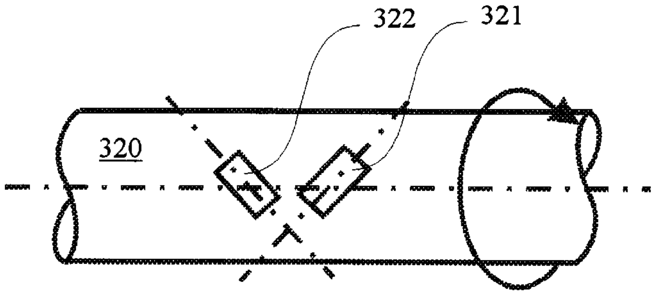
FIG. 17B is a detail view of a SAW torque sensor and shaft compression sensor arrangement for use with the arrangement of FIG. 17.
Figure 17A:
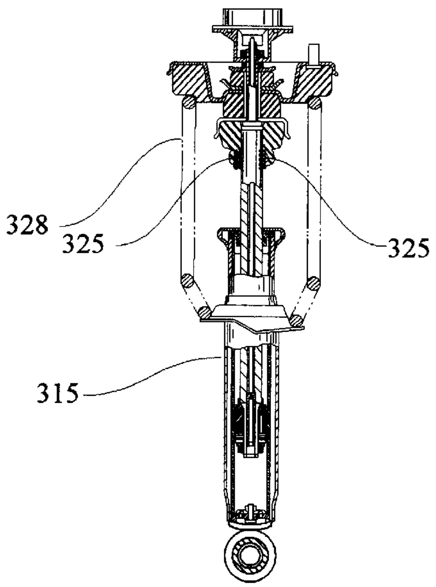
FIG. 17A is a cross section detail view of a vehicle spring and shock absorber system with a SAW torque sensor system mounted for measuring the stress in the vehicle spring of the suspension system of FIG. 17.

A SAW load sensor can also be used to measure load in the vehicle suspension system powerless and wirelessly as shown in FIG. 17. FIG. 17A illustrates a strut 315 such as either of the rear struts of the vehicle of FIG. 17. A coil spring 320 stresses in torsion as the vehicle encounters disturbances from the road and this torsion can be measured using SAW strain gages as described in U.S. Pat. No. 5,585,571 for measuring the torque in shafts. This concept is also disclosed in U.S. Pat. No. 5,714,695. The disclosures of both patents are incorporated herein by reference. The use of SAW strain gages to measure the torsional stresses in a spring, as shown in FIG. 17B, and in particular in an automobile suspension spring has, to the knowledge of the inventors, not been heretofore disclosed. In FIG. 17B, the strain measured by SAW strain gage 322 is subtracted from the strain measured by SAW strain gage 321 to get the temperature compensated strain in spring 320.

Since a portion of the dynamic load is also carried by the shock absorber, the SAW strain gages 321 and 322 will only measure the steady or average load on the vehicle. However, additional SAW strain gages 325 can be placed on a piston rod 326 of the shock absorber to obtain the dynamic load. These load measurements can then be used for active or passive vehicle damping or other stability control purposes.

Figure 18:
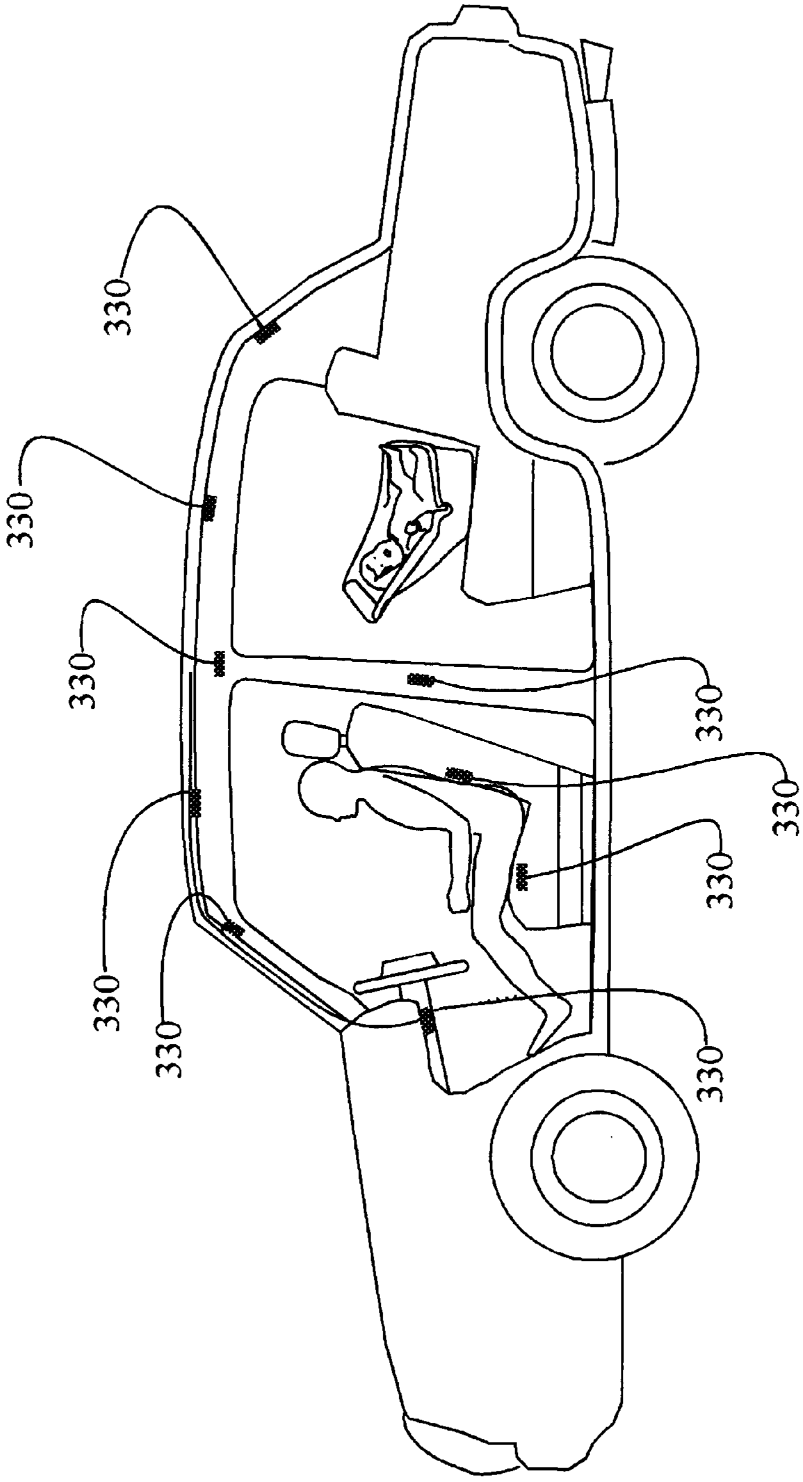
FIG. 18 is a cutaway view of a vehicle showing possible mounting locations for vehicle interior temperature, humidity, carbon dioxide, carbon monoxide, alcohol or other chemical or physical property measuring sensors.

FIG. 18 illustrates a vehicle passenger compartment, and the engine compartment, with multiple SAW temperature sensors 330. SAW temperature sensors are distributed throughout the passenger compartment, such as on the A-pillar, on the B-pillar, on the steering wheel, on the seat, on the ceiling, on the headliner, and on the rear glass and generally in the engine compartment. These sensors, which can be independently coded with different IDs and different delays, can provide an accurate measurement of the temperature distribution within the vehicle interior. Such a system can be used to tailor the heating and air conditioning system based on the temperature at a particular location in the passenger compartment. If this system is augmented with occupant sensors, then the temperature can be controlled based on seat occupancy and the temperature at that location. If the occupant sensor system is based on ultrasonics than the temperature measurement system can be used to correct the ultrasonic occupant sensor system for the speed of sound within the passenger compartment. Without such a correction, the error in the sensing system can be as large as 20 percent.

In one case, the SAW temperature sensor can be made from PVDF film and incorporated within the ultrasonic transducer assembly. For the 40 kHz ultrasonic transducer case, for example, the SAW temperature sensor would return the several pulses sent to drive the ultrasonic transducer to the control circuitry using the same wires used to transmit the pulses to the transducer after a delay that is proportional to the temperature within the transducer housing. Thus a very economical device can add this temperature sensing function using much of the same hardware that is already present for the occupant sensing system. Since the frequency is low, PVDF could be fabricated into a very low cost temperature sensor for this purpose. Other piezoelectric materials could also be used.

Other sensors can be combined with the temperature sensors 330, or used separately, to measure carbon dioxide, carbon monoxide, alcohol, humidity or other desired chemicals as discussed above.

The SAW temperature sensors 330 provide the temperature at their mounting location to a processor unit 332 via an interrogator with the processor unit including appropriate control algorithms for controlling the heating and air conditioning system based on the detected temperatures. The processor unit can control, e.g., which vents in the vehicle are open and closed, the flow rate through vents and the temperature of air passing through the vents In general, the processor unit can control whatever adjustable components are present or form part of the heating and air conditioning system.

As shown in FIG. 18, a child seat 334 is present on the rear vehicle seat. The child seat 334 can be fabricated with one or more RFID tags or SAW tags 336. The RFID tag(s) and SAW tag(s) can be constructed to provide information on the occupancy of the child seat, i.e., whether a child is present, based on the weight. Also, the mere transmission of waves from the RFID tag(s) or SAW tag(s) on the child seat would be indicative of the presence of a child seat. The RFID tag(s) and SAW tag(s) can also be constructed to provide information about the orientation of the child seat, i.e., whether it is facing rearward or forward. Such information about the presence and occupancy of the child seat and its orientation can be used in the control of vehicular systems, such as the vehicle airbag system. In this case, a processor would control the airbag system and would receive information from the RFID tag(s) and SAW tag(s) via an interrogator.

Figure 19A:
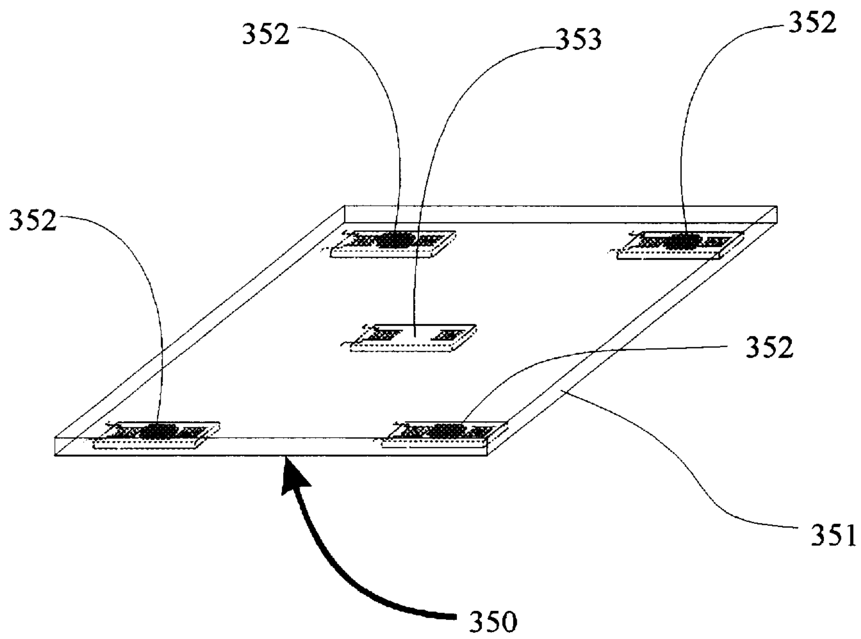
FIG. 19A is a perspective view of a SAW tilt sensor using four SAW assemblies for tilt measurement and one for temperature.
Figure 19B:
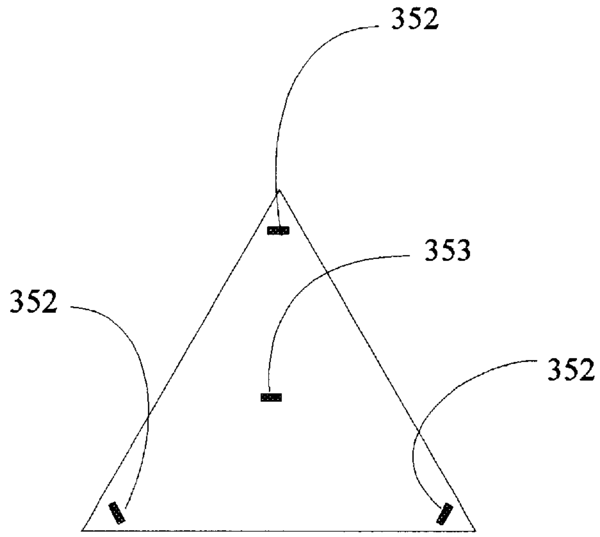
FIG. 19B is a top view of a SAW tilt sensor using three SAW assemblies for tilt measurement each one of which can also measure temperature.

There are many applications for which knowledge of the pitch and/or roll orientation of a vehicle or other object is desired. An accurate tilt sensor can be constructed using SAW devices. Such a sensor is illustrated in FIG. 19A and designated 350. This sensor 350 utilizes a substantially planar and rectangular mass 351 and four supporting SAW devices 352 which are sensitive to gravity. For example, the mass acts to deflect a membrane on which the SAW device resides thereby straining the SAW device. Other properties can also be used for a tilt sensor such as the direction of the earth's magnetic field. SAW devices 352 are shown arranged at the corners of the planar mass 351, but it must be understood that this arrangement is a preferred embodiment only and not intended to limit the invention. A fifth SAW device 353 can be provided to measure temperature. By comparing the outputs of the four SAW devices 352, the pitch and roll of the automobile can be measured. This sensor 350 can be used to correct errors in the SAW rate gyros described above. If the vehicle has been stationary for a period of time, the yaw SAW rate gyro can initialized to 0 and the pitch and roll SAW gyros initialized to a value determined by the tilt sensor of FIG. 19A. Many other geometries of tilt sensors utilizing one or more SAW devices can now be envisioned for automotive and other applications. In particular, an alternate preferred configuration is illustrated in FIG. 19B where a triangular geometry is used. In this embodiment, the planar mass is triangular and the SAW devices 352 are arranged at the corners, although as with FIG. 19A, this is a non-limiting, preferred embodiment.

Figure 20:
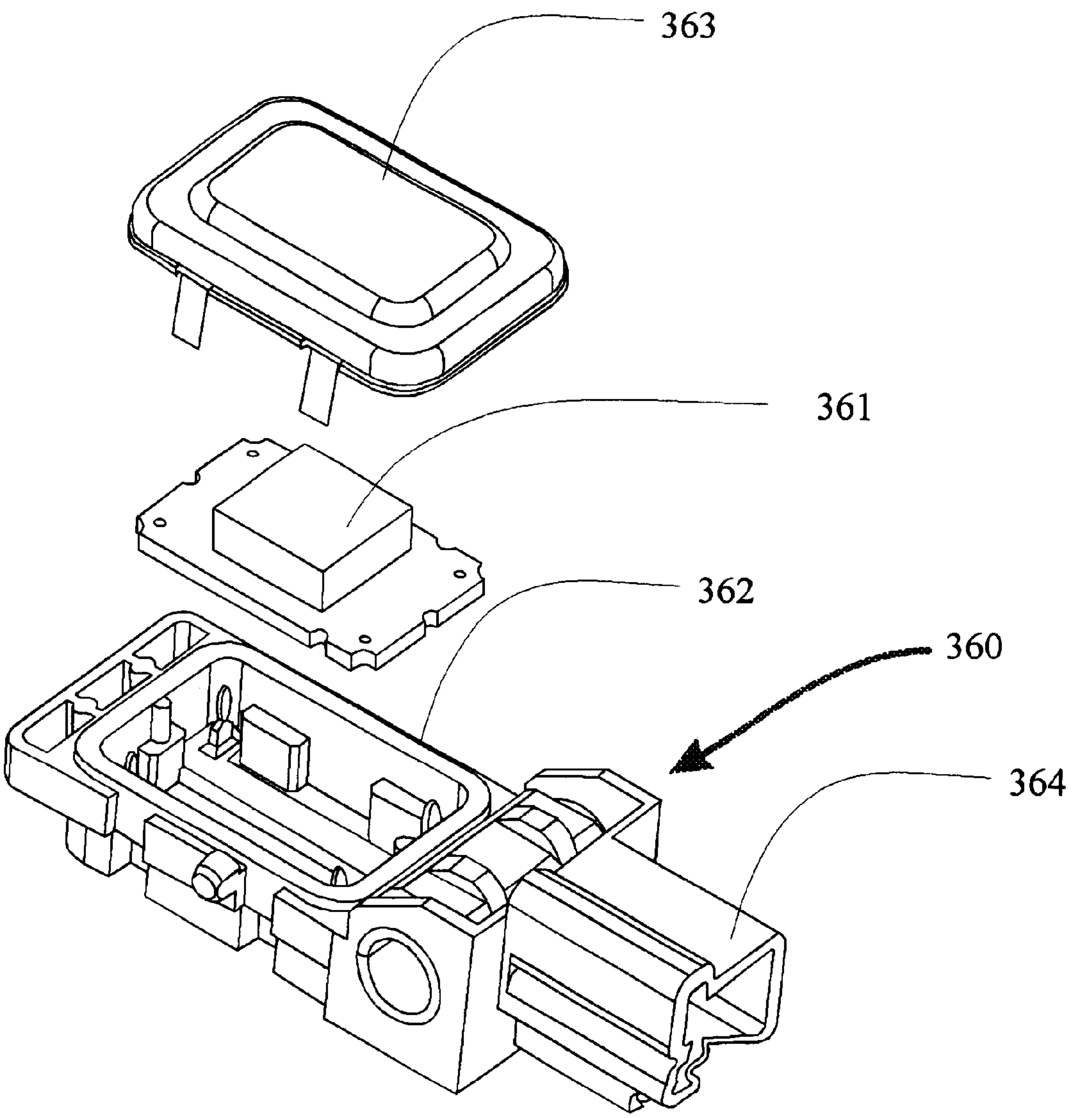
FIG. 20 is a perspective exploded view of a SAW crash sensor for sensing frontal, side or rear crashes.

Either of the SAW accelerometers described above can be utilized for crash sensors as shown in FIG. 20. These accelerometers have a substantially higher dynamic range than competing accelerometers now used for crash sensors such as those based on MEMS silicon springs and masses and others based on MEMS capacitive sensing. As discussed above, this is partially a result of the use of frequency or phase shifts which can be easily measured over a very wide range. Additionally, many conventional accelerometers that are designed for low acceleration ranges are unable to withstand high acceleration shocks without breaking. This places practical limitations on many accelerometer designs so that the stresses in the silicon springs are not excessive. Also for capacitive accelerometers, there is a narrow limit over which distance, and thus acceleration, can be measured.

The SAW accelerometer for this particular crash sensor design is housed in a container 361 which is assembled into a housing 362 and covered with a cover 363. This particular implementation shows a connector 364 indicating that this sensor would require power and the response would be provided through wires. Alternately, as discussed for other devices above, the connector 364 can be eliminated and the information and power to operate the device transmitted wirelessly. Such sensors can be used as frontal, side or rear impact sensors. They can be used in the crush zone, in the passenger compartment or any other appropriate vehicle location. If two such sensors are separated and have appropriate sensitive axes, then the angular acceleration of the vehicle can be also be determined. Thus, for example, forward-facing accelerometers mounted in the vehicle side doors can used to measure the yaw acceleration of the vehicle. Alternately two vertical sensitive axis accelerometers in the side doors can be used to measure the roll acceleration of vehicle, which would be useful for rollover sensing.

Figure 21:
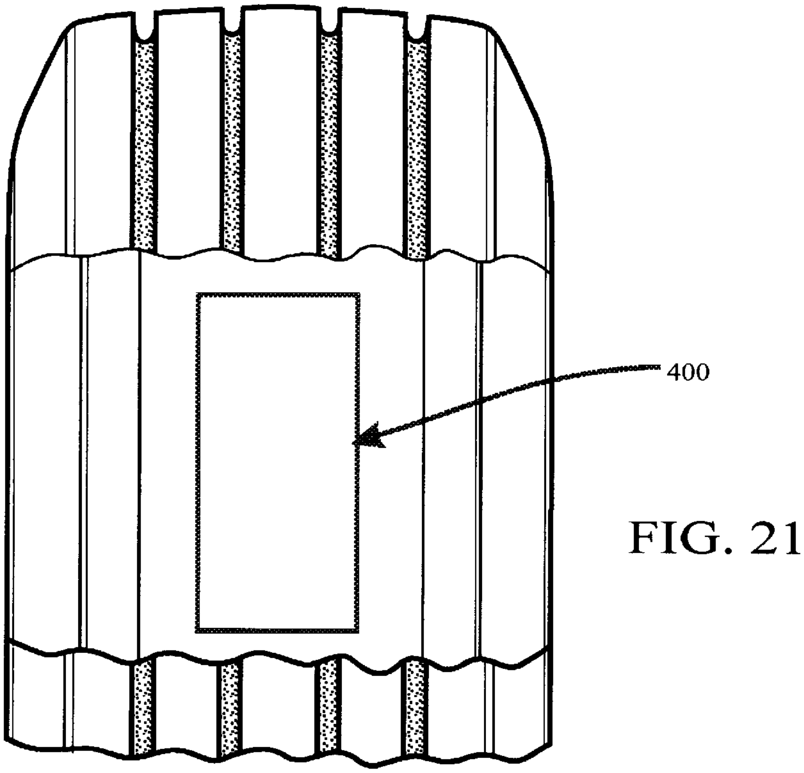
FIG. 21 is a partial cutaway view of a piezoelectric generator and tire monitor using PVDF film.
Figure 21A:
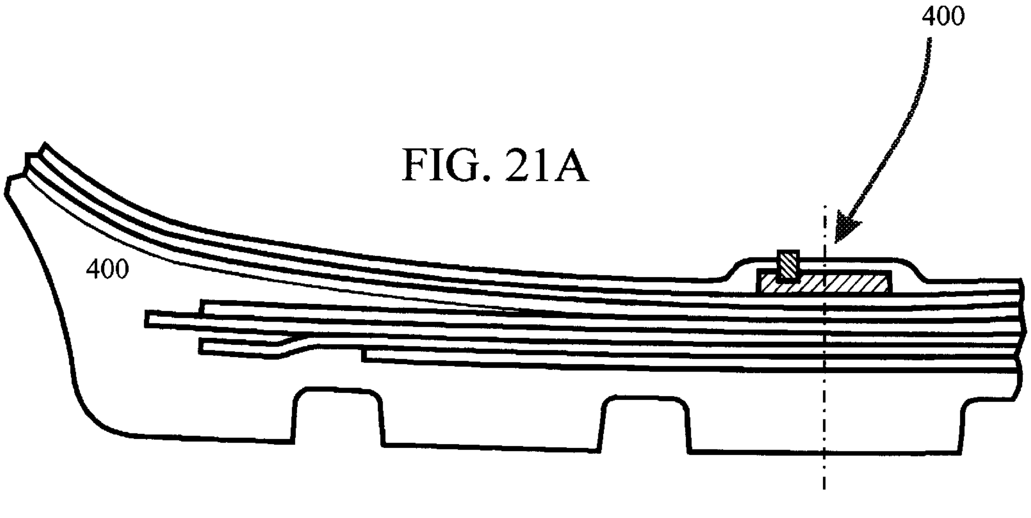
FIG. 21A is a cutaway view of the PVDF sensor of FIG. 21.

Although piezoelectric SAW devices normally use rigid material such as quartz or lithium niobate, it is also possible to utilize polyvinylidene fluoride (PVDF) providing the frequency is low. A piece of PVDF film can also be used as a sensor of tire flexure by itself. Such a sensor is illustrated in FIGS. 21 and 21A at 400. The output of flexure of the PVDF film can be used to supply power to a silicon microcircuit that contains pressure and temperature sensors. The waveform of the output from the PVDF film also provides information as to the flexure of an automobile tire and can be used to diagnose problems with the tire as well as the tire footprint in a manner similar to the device described in FIG. 3. In this case, however, the PVDF film supplies sufficient power to permit significantly more transmission energy to be provided. The frequency and informational content can be made compatible with the SAW interrogator described above such that the same interrogator can be used. The power available for the interrogator, however, can be significantly greater thus increasing the reliability and reading range of the system.

There is a general problem with tire pressure monitors as well as systems that attempt to interrogate passive SAW or electronic RFID type devices in that the FCC severely limits the frequencies and radiating power that can be used. Once it becomes evident that these systems will eventually save many lives, the FCC can be expected to modify their position. In the meantime, various schemes can be used to help alleviate this problem. The lower frequencies that have been opened for automotive radar permit higher power to be used and they could be candidates for the devices discussed above. It is also possible, in some cases, to transmit power on multiple frequencies and combine the received power to boost the available energy. Energy can of course be stored and periodically used to drive circuits and work is ongoing to reduce the voltage required to operate semiconductors. The devices of this invention will make use of some or all of these developments as they take place.

If the vehicle has been at rest for a significant time period, power will leak from the storage capacitors and will not be available for transmission. However, a few tire rotations are sufficient to provide the necessary energy.

Figure 22:
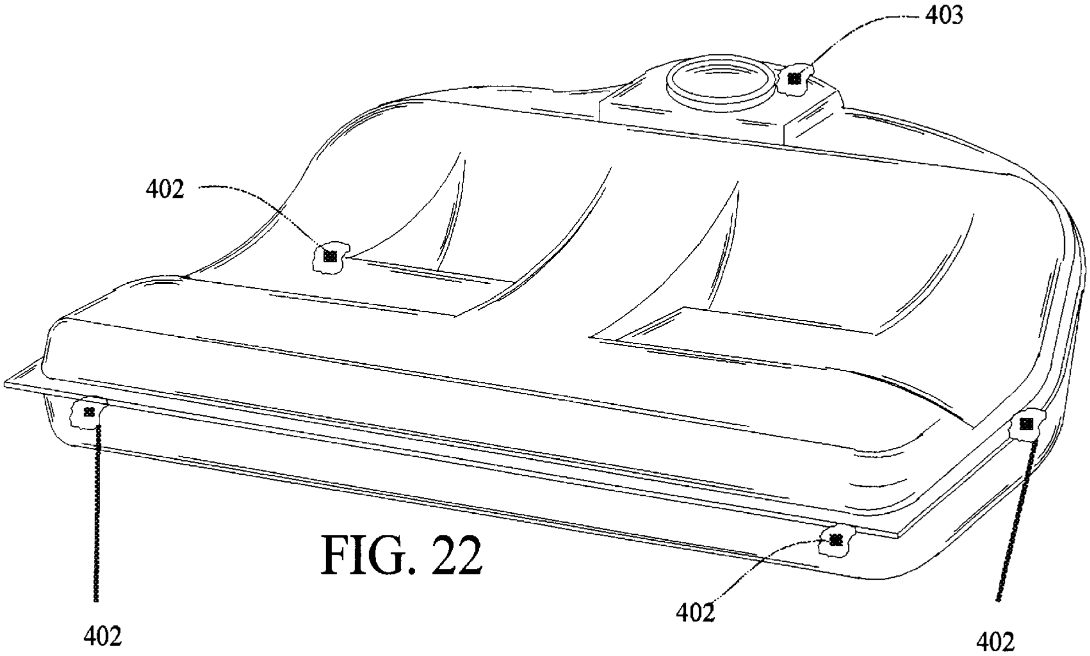
FIG. 22 is a perspective view with portions cutaway of a SAW based vehicle gas gage.
Figure 22A:
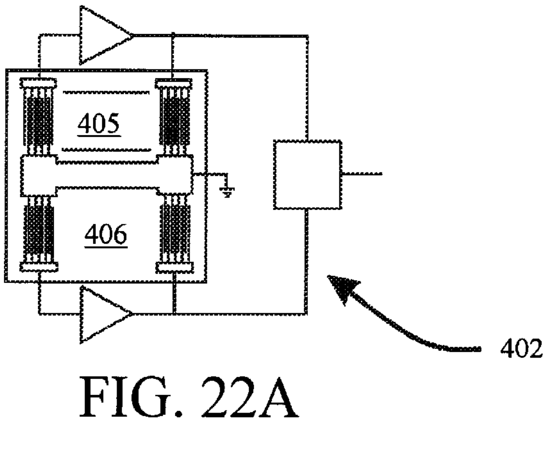
FIG. 22A is a top detailed view of a SAW pressure and temperature monitor for use in the system of FIG. 22.

U.S. patent application Ser. No. 08/819,609, assigned to the current assignee of this invention, provides multiple means for determining the amount of gas in a gas tank. Using the SAW pressure devices of this invention, multiple pressure sensors can be placed at appropriate locations within a fuel tank to measure the fluid pressure and thereby determine the quantity of fuel remaining in the tank. This is illustrated in FIG. 22. In this example, four SAW pressure transducers 402 are placed on the bottom of the fuel tank and one SAW pressure transducer 403 is placed at the top of the fuel tank to eliminate the effects of vapor pressure within tank. Using neural networks, or other pattern recognition techniques, the quantity of fuel in the tank can be accurately determined from these pressure readings in a manner similar that described the '609 patent application. The SAW measuring device illustrated in FIG. 22A combines temperature and pressure measurements in a single unit using parallel paths 405 and 406 in the same manner as described above.

Occupant weight sensors can give erroneous results if the seatbelt is pulled tight pushing the occupant into the seat. This is particularly a problem when the seatbelt is not attached to the seat. For such cases, it has been proposed to measure the tension in various parts of the seatbelt. Using conventional technology requires that such devices be hardwired into the vehicle complicating the wire harness.

Figure 23:
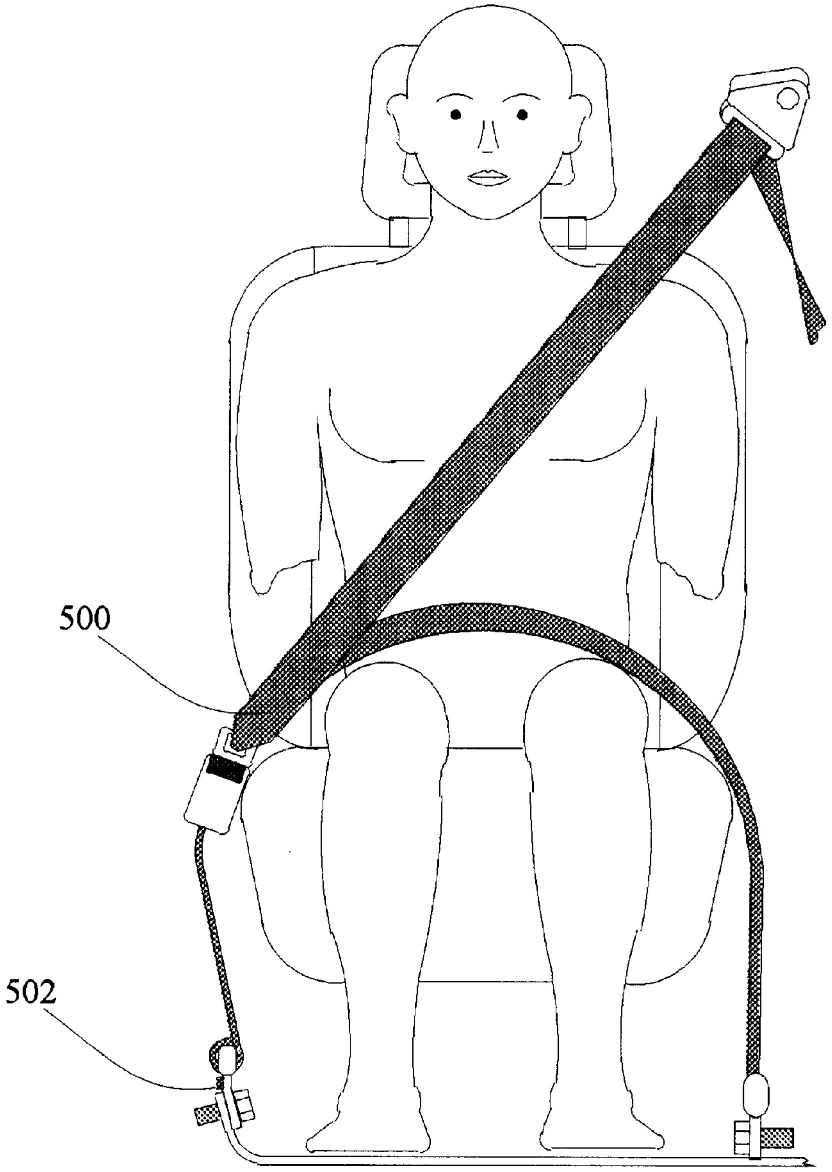
FIG. 23 is a partial cutaway view of a vehicle drives wearing a seatbelt with SAW force sensors.

With reference to FIG. 23, using a SAW strain gage as described above, the tension in the seat belt 500 can be measured without the requirement of power or signal wires. FIG. 23 illustrates a powerless and wireless passive SAW strain gage based device 502 for this purpose. There are many other places that such a device can be mounted to measure the tension in the seatbelt at one or at multiple places.

Figure 24:
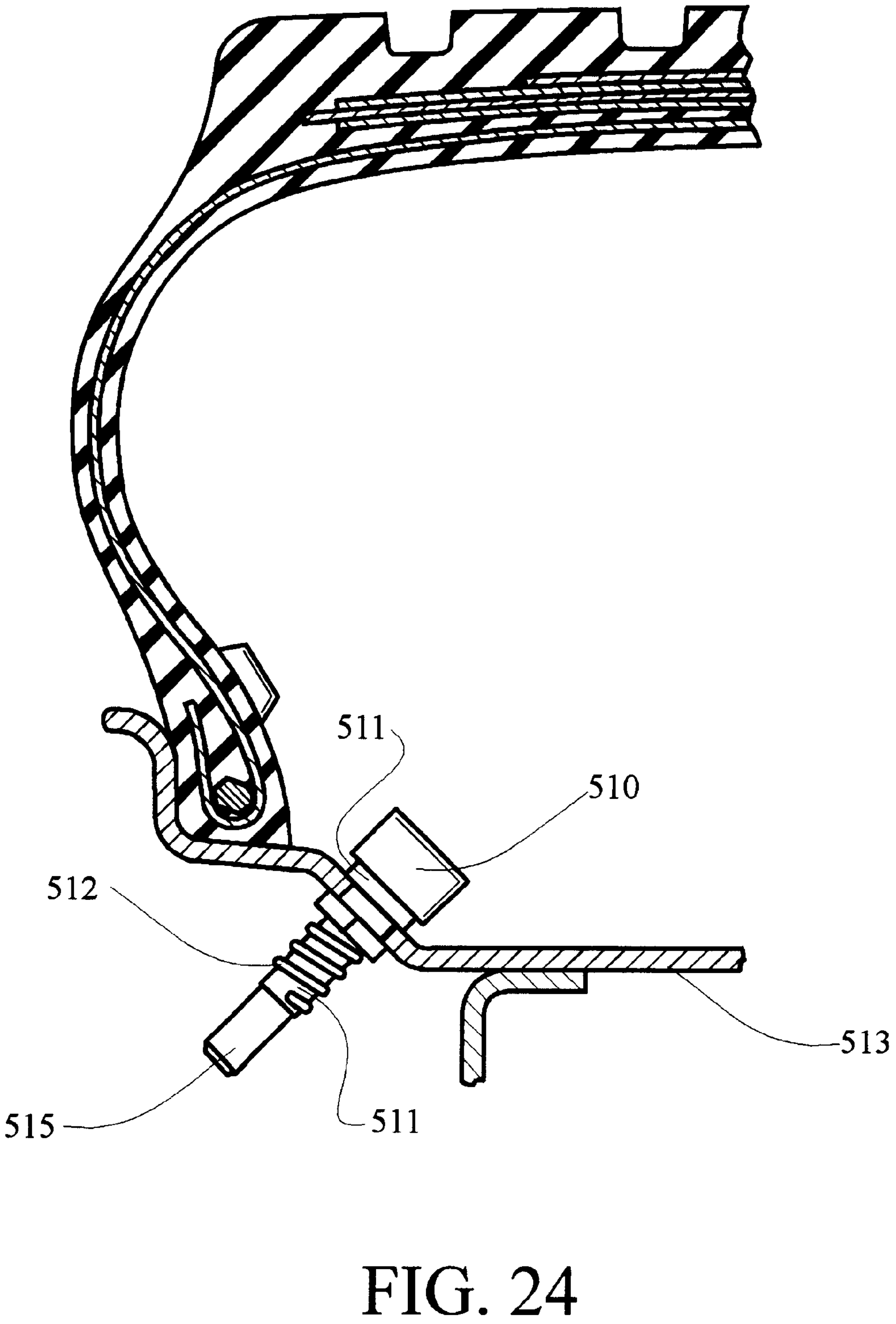
FIG. 24 is an alternate arrangement of a SAW tire pressure and temperature monitor installed in the wheel rim facing inside.

FIG. 24 illustrates another version of a tire temperature and/or pressure monitor 510. Monitor 510 may include at an inward end, any one of the temperature transducers or sensors described above and/or any one of the pressure transducers or sensors described above, or any one of the combination temperature and pressure transducers or sensors described above.

The monitor 510 has an elongate body attached through the wheel rim 513 typically on the inside of the tire so that the under-vehicle mounted antenna(s) have a line of sight view of antenna 515. Monitor 510 is connected to an inductive wire 512, which matches the output of the device with the antenna 515, which is part of the device assembly. Insulating material 511 surrounds the body which provides an air tight seal and prevents electrical contact with the wheel rim 513.

Figure 25A:
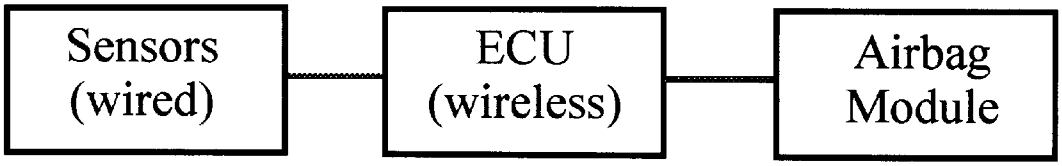
FIG. 25A is a schematic of a prior art deployment scheme for an airbag module.

FIG. 25A shows a schematic of a prior art airbag module deployment scheme in which sensors, which detect data for use in determining whether to deploy an airbag in the airbag module, are wired to an electronic control unit (ECU) and a command to initiate deployment of the airbag in the airbag module is sent wirelessly.

Figure 25B:
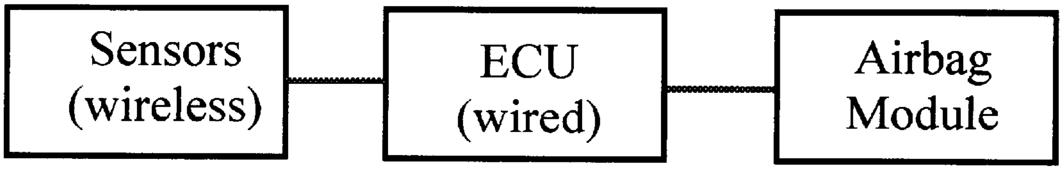
FIG. 25B is a schematic of a deployment scheme for an airbag module in accordance with the invention.

By contrast, as shown in FIG. 25B, in accordance with the invention, the sensors are wireless connected to the electronic control unit and thus transmit data wirelessly. The ECU is however wired to the airbag module.

SAW sensors also have applicability to various other sectors of the vehicle, including the powertrain, chassis, and occupant comfort and convenience. For example, SAW sensors have applicability to sensors for the powertrain area including oxygen sensors, gear-tooth Hall effect sensors, variable reluctance sensors, digital speed and position sensors, oil condition sensors, rotary position sensors, low pressure sensors, manifold absolute pressure/manifold air temperature (MAP/MAT) sensors, medium pressure sensors, turbo pressure sensors, knock sensors, coolant/fluid temperature sensors, and transmission temperature sensors.

SAW sensors for chassis applications include gear-tooth Hall effect sensors, variable reluctance sensors, digital speed and position sensors, rotary position sensors, non-contact steering position sensors, and digital ABS (anti-lock braking system) sensors.

SAW sensors for the occupant comfort and convenience area include low tire pressure sensors, HVAC temperature and humidity sensors, air temperature sensors, and oil condition sensors.

SAW sensors also have applicability such areas as controlling evaporative emissions, transmission shifting, mass air flow meters, oxygen, NOx and hydrocarbon sensors. SAW based sensors are particularly useful in high temperature environments where many other technologies fail.

SAW sensors can facilitate compliance with U.S. regulations concerning evaporative system monitoring in vehicles, through a SAW fuel vapor pressure and temperature sensors that measure fuel vapor pressure within the fuel tank as well as temperature. If vapors leak into the atmosphere, the pressure within the tank drops. The sensor notifies the system of a fuel vapor leak, resulting in a warning signal to the driver and/or notification to a repair facility. This application is particularly important since the condition within the furl tank can be ascertained wirelessly reducing the chance of a fuel fire in an accident. The same interrogator that monitors the tire pressure SAW sensors can also monitor the fuel vapor pressure and temperature sensors resulting in significant economies.

A SAW humidity sensor can be used for measuring the relative humidity and the resulting information can be input to the engine management system or the heating, ventilation, and air conditioning (HVAC) system for more efficient operation. The relative humidity of the air entering an automotive engine impacts the engine's combustion efficiency; i.e., the ability of the spark plugs to ignite the fuel/air mixture in the combustion chamber at the proper time. A SAW humidity sensor in this case can measure the humidity level of the incoming engine air, helping to calculate a more precise fuel/air ratio for improved fuel economy and reduced emissions.

Dew point conditions are reached when the air is fully saturated with water. When the cabin dew point temperature matches the windshield glass temperature, water from the air condenses quickly, creating frost or fog. A SAW humidity sensor with a temperature-sensing element and a window glass-temperature-sensing element can prevent the formation of visible fog formation by automatically controlling the HVAC system.

Thus, disclosed above is a tire with an integral monitoring system, two spaced beads comprising steel wire, a tread, sidewalls, an innerliner and plies. The monitoring system comprises a tire monitor fixed opposite the tread and including a plurality of SAW sensors, a first SAW sensor measuring tangential and/or radial acceleration. Another SAW sensor is arranged to measure pressure of the tire while another can be arranged to measure temperature of the tire.

Another integral monitoring system comprises an elongate body extending through the wheel rim from an inward side of the wheel rim to an outward side of the wheel rim, a transducer arranged on one end of the body and arranged to provide a measurement of at least one of the temperature and pressure in a tire when a tire is mounted on the wheel rim, an antenna arranged on another end of the body, and an inductive wire coupling the transducer to the antenna to enable transmission of a signal related to the measurement provided by the transducer. Insulating material is optionally arranged over the body to prevent contact between the body and the wheel rim.

One embodiment of a SAW sensor in accordance with the invention comprises a substrate made of a material on which a wave is capable of traveling, an interdigital transducer arranged in connection with the substrate, an antenna coupled to the interdigital transducer, at least one reflector spaced from the interdigital transducer, and at least one coating of a material sensitive to pressure arranged on the substrate between the interdigital transducer and the reflector such that the sensor provides a measurement of pressure. The coating may be an oxygen or nitrogen absorbent or reactive material, or made of at least one polymer.

When multiple reflectors are provided, one coating is arranged immediately between the interdigital transducer and a proximate one of the reflectors and additional coating are arranged between adjacent reflectors.

When two reflectors are provided, the substrate can be made of a material which changes as a function of temperature. In this case, the interdigital transducer may be arranged between the reflectors such that the sensor provides a measurement of both pressure and temperature. A flexible membrane may be arranged over the sensor.

Another embodiment of a SAW sensor in accordance with the invention comprises a substrate made of a material on which a wave is capable of traveling and which changes as a function of temperature, a first interdigital transducer arranged on the substrate, an antenna coupled to the first interdigital transducer, and a thermister arranged on the substrate spaced from the first interdigital transducer such that the sensor provides a measurement of temperature.

Yet another embodiment of a SAW sensor in accordance with the invention comprises a substrate made of a material on which a wave is capable of traveling, first and second interdigital transducers arranged on the substrate, at least one antenna coupled to the first and second interdigital transducers, and first and second reflectors spaced from the at least one interdigital transducer such that two properties of the substrate are measured. A coating of a material sensitive to pressure is optionally arranged on the substrate between the first interdigital transducer and the first reflector. The coating can comprise at least one oxygen or nitrogen sensing material. If two antennas are provided, each may be coupled to a respective one of the first and second interdigital transducers. Optionally, a material is arranged on the substrate which is sensitive to the presence or concentration of a gas, vapor, or liquid chemical. Also, a coating of a material sensitive to carbon dioxide may be arranged on the substrate between the first interdigital transducer and the first reflector.

Still another embodiment of a SAW sensor in accordance with the invention comprises a substrate made of a material on which a wave is capable of traveling, an interdigital transducer arranged in connection with the substrate, an antenna coupled to the interdigital transducer, at least one reflector spaced from the interdigital transducer, and at least one coating of a material sensitive to carbon dioxide arranged on the substrate between the interdigital transducer and the reflector such that the sensor provides a measurement of the presence of carbon dioxide. Such a SAW sensor is optimally arranged in an interior of a vehicle trunk. In this case, an automatic trunk opening device is coupled to the sensor such that upon the sensor detecting carbon dioxide in the interior of the trunk indicative of the presence of a life form, the automatic trunk opening device opens the trunk. An interrogator may be provided to interrogate the sensor and be coupled to the automatic trunk opening device.

One embodiment of a switch for a vehicle in accordance with the invention comprises a SAW sensor having a substrate, an interdigital transducer arranged on the substrate and a reflector arranged on the substrate spaced from the interdigital transducer; and a material sheet including a projection in engagement with the substrate in a space between the interdigital transducer and the reflector such that pressure on the substrate is transferred by the projection to the substrate.

Another embodiment of a switch comprises a SAW sensor having a substrate, an interdigital transducer arranged on the substrate, a reflector arranged on the substrate spaced from the interdigital transducer and a projection arranged on the substrate between the interdigital transducer and the reflector, and a material sheet arranged in engagement with the projection such that pressure on the substrate is transferred by the projection to the substrate.

An embodiment of an accelerometer in accordance with the invention comprises a SAW sensor having a substrate, an interdigital transducer arranged on the substrate, a reflector arranged on the substrate spaced from the interdigital transducer, an interface material adjacent to the substrate between the interdigital transducer and the reflector, and an acceleration-sensing mass arranged on the interface material whereby acceleration of the mass changes pressure on the substrate and thereby dampens or changes the speed on a surface wave on the substrate. The interface material may be a silicone rubber foam.

In one embodiment of a method for operating an interrogator for interrogating at least one SAW sensor, the following steps are performed: generating and transmitting two frequencies, F1 and F1+F2, from the interrogator during a burst time; continuing transmission of frequency F1 after the burst time until a frequency F2 is received from the at least one SAW sensor; receiving the two frequencies at the at least one SAW sensor; and mixing the two frequencies to yield a frequency F2 which is modulated by the at least one SAW sensor and contains the information about the measurement being performed by the at least one SAW sensor. The two frequencies may be generated using an oscillator and a mixer.

An embodiment of a tire monitoring system in accordance with the invention comprises an antenna package comprising a microstrip or stripline antenna array and a SAW sensor associated with each tire and including an antenna adapted to receive data from and transmit data to the antenna array. The antennas of the antenna array which face each tire may be in an X configuration such that the transmissions to and from the tires can be accomplished regardless of tire rotation angle.

In one embodiment of a method for monitoring tire temperature and pressure, the following steps are performed: mounting sensors in positions to obtain a reading of the temperature and/or pressure of tires, the sensors being sensitized to react to a transmission at a particular frequency, mounting an interrogator on the vehicle adapted to receive communications from the sensors, periodically sending a signal at the frequency to which the sensors are sensitized causing the sensors to respond and transmit a signal containing the temperature and/or pressure of the associated tire, and processing the signals from the sensors to obtain an indication of the temperature and/or pressure of the tires. Further, the temperature and/or pressure of the tires can be analyzed to determine if the tires are deflated, experiencing or about to experience tread separation or are overheating. The driver may be notified or indicia to the driver displayed, of the condition of the tires. At least one of the sensors may be mounted to a valve stem of a tire. The interrogator may be provided with several antennas spaced apart from one another such that a comparison of the signal from the sensors enables the location of each of the sensors to be approximately determined. The sensors can use surface acoustic wave technology wherein a radio frequency wave is converted into an acoustic wave which then travels on the surface of a material whereby the acoustic wave is modified based on a state being measured by the sensor and the modified wave is sensed by one or more interdigital transducers and converted back to a radio frequency wave which is used to excite an antenna for transmitting the wave to interrogator. The interrogator may be positioned relative to the sensors such that the distance between each of the sensors and the interrogator is different.

An embodiment of a system for controlling deployment of an occupant restraint device in accordance with the invention comprises acceleration sensors for measuring accelerations of the vehicle or a part thereof, each sensor including a receiving unit for receiving a radio frequency signal, first conversion means for converting the radio frequency signal into an acoustic wave, means for causing the acoustic wave to be modified based on the measured acceleration, second conversion means for converting the modified acoustic wave into a radio frequency signal, and a transmission unit for transmitting the radio frequency signal; and at least one interrogator structured and arranged to transmit and receive radio frequency signals such that the at least one interrogator receives the radio frequency signals transmitted by the acceleration sensors and processes the signals to determine whether the vehicle is experiencing a crash requiring deployment of the occupant restraint device. As to the arrangement of sensors, one or more may be arranged in a front or rear crush zone of the vehicle, in a door of the vehicle and/or in a passenger compartment of the vehicle. A sensor may comprise a substrate whereby the means for causing the acoustic wave to be modified based on the measured acceleration comprises bending of the substrate and an acceleration-sensing mass engages the substrate whereby acceleration of the mass changes a property of an acoustic wave on the substrate.

An embodiment of a system for controlling access to a vehicle in accordance with the invention comprises a portable card containing a SAW identification system including a receiving unit for receiving a radio frequency signal, first conversion means for converting the radio frequency signal into an acoustic wave, means for modifying the acoustic wave, second conversion means for converting the modified acoustic wave into a radio frequency signal, and a transmission unit for transmitting the radio frequency signal; and an interrogator arranged on the vehicle and structured and arranged to transmit and receive radio frequency signals such that the interrogator receives the radio frequency signal transmitted by the portable card and processes the signal to determine whether the signal is identical to a signal indicative of an authorized user of the vehicle. A processor may be coupled to the interrogator for controlling ignition of the vehicle and/or locks on the vehicles based on the determination of whether the signal is identical to a signal indicative of an authorized user of the vehicle, a distance between the portable card and the vehicle and/or the presence or absence of an occupant in the vehicle.

An embodiment of a tire monitoring device in accordance with one embodiment of the invention comprises sensor means for measuring pressure and temperature of the tire, an accelerometer for measuring acceleration of a tread of the tire adjacent the sensor means; and a processor coupled to the sensor means and the accelerometer for receiving the measured pressure, temperature and acceleration and determining whether the tire is at a non-optimal condition. The processor can also measure a length of time that a tread portion is in contact with the road surface such that a diameter of the tire footprint on the road is obtained. The diameter of the tire footprint is analyzed to determine whether the tire is at a non-optimal condition.

Another embodiment of a tire-monitoring device in accordance with the invention comprises means for monitoring the curvature of the tire as it rotates and means for correlating the curvature of the tire into an indication of an operational state of the tire. The monitoring means may comprise a sensor mounted inside the tire at its largest diameter for measuring, e.g., mechanical strain. The correlation means may comprise a processor for determining a ratio of a time in which the sensor indicates constant strain and a time in which the sensor indicates increased stretch. The sensor can measure acceleration in any one axis, in which case, the correlation means may comprise a processor for analyzing a time of zero acceleration in relation to a time of non-zero acceleration.

Many changes, modifications, variations and other uses and applications of the subject invention will now become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the following claims.

We claim:

1. A driving condition monitoring system for a vehicle on a roadway, comprising:

stationary mounting structures arranged proximate the roadway;

sensors located in said mounting structures in a vicinity of the roadway and apart from the roadway, said sensors being structured and arranged to generate and wirelessly transmit information about the roadway, travel conditions relating to the roadway or external objects on or in the vicinity of the roadway in response to an activation signal; and at least one interrogator arranged on the vehicle to wirelessly transmit the activation signal to said sensors to cause said sensors to wirelessly transmit information generated by said sensors and to receive the information generated by said sensors.

2. The system of claim 1, wherein said at least one interrogator includes two receiving antennas whereby, by transmitting the activation signal from one of said antennas and receiving a return signal at both of said antennas, a position of the vehicle relative to said sensors is determinable.

3. The system of claim 1, wherein said sensors are structured to transmit an identification code indicative of their position with the information generated by said sensors such that the absolute position of the vehicle is determinable using a map and the known position of said sensors.

4. The system of claim 1, wherein said sensors are arranged to utilize time, code, space or frequency multiplexing in the transmission of the information.

5. The system of claim 1, wherein a plurality of said sensors each include a SAW device whereby said sensors are arranged to transmit information after a delay, said sensors being arranged to use time-multiplexing such that each sensor has a different delay.

6. The system of claim 1, wherein at least one of said sensors includes power-receiving means for receiving power wirelessly from said at least one interrogator.

7. The system of claim 1, wherein said at least one of said sensors is connected to a power source via one or more wires.

8. The system of claim 1, wherein said at least one interrogator comprises a plurality of interrogators, each of said interrogators having one or more antennas which transmit radio frequency energy to said sensors and receive modulated radio frequency signals from said sensors containing the sensor information.

9. The system of claim 1, wherein at least one of said sensors is a RFID type whereby said at least one sensor is arranged to return information immediately to said at least one interrogator in the form of a modulated RF signal.

10. The system of claim 1, wherein at least one of said sensors includes a SAW device whereby said at least one sensor is arranged to return information after a delay.

11. The system of claim 1, wherein at least one of said sensors includes a RFID circuit and a SAW circuit whereby said at least one sensor is arranged to return information immediately to said at least one interrogator in the form of a modulated RF signal and after a delay.

12. The system of claim 1, wherein a plurality of said sensors are RFID type whereby said sensors are arranged to return information immediately to said at least one interrogator in the form of a modulated RF signal, said sensors being arranged to use frequency-multiplexing such that each sensor responds only to a narrow frequency.

13. The system of claim 1, wherein each of said sensors is structured and arranged to transmit information including an identification of said sensor.

14. The system of claim 1, wherein at least one of said mounting structures is a pole adjacent the roadway, at least one of said sensors being arranged on said pole.

15. The system of claim 1, wherein at least one of said sensors is arranged to measure friction of a surface of the roadway.

16. The system of claim 1, wherein at least one of said sensors is arranged to measure atmospheric pressure.

17. The system of claim 1, wherein at least one of said sensors is arranged to measure atmospheric temperature.

18. The system of claim 1, wherein at least one of said sensors is arranged to measure temperature of the roadway or moisture content of the roadway.

19. The system of claim 1, wherein at least one of said sensors is arranged to measure humidity of the atmosphere.

20. The system of claim 1, further comprising a communications device arranged on the vehicle and coupled to said at least one interrogator for transmitting the information generated by said sensors and received by said at least one interrogator to a remote location.

21. The system of claim 20, wherein said communications device comprises a cellular phone.

22. The system of claim 20, wherein said communications device is arranged to transmit the information via a satellite or the Internet to the remote location.

23. The system of claim 1, further comprising a location-determining system arranged on the vehicle for determining the location of the vehicle.

24. The system of claim 23, further comprising a communications device arranged on the vehicle and coupled to said at least one interrogator and said location-determining system for transmitting the information generated by said sensors and the location of the vehicle to a remote location.

25. A driving condition monitoring system for a vehicle on a roadway, comprising:

sensors located on or in a vicinity of the roadway, said sensors being structured and arranged to generate and wirelessly transmit information about the roadway, travel conditions relating to the roadway or external objects on or in the vicinity of the roadway in response to an activation signal; and at least one interrogator arranged on the vehicle to wirelessly transmit the activation signal to said sensors to cause said sensors to wirelessly transmit information generated by said sensors and to receive the information generated by said sensors; and a communications device arranged on the vehicle and coupled to said interrogator for transmitting the information generated by said sensors and received by said interrogator to a remote location spaced from the vehicle.

26. The system of claim 25, wherein said sensors are embedded in the roadway.

27. The system of claim 25, wherein said sensors are arranged in mounting structures proximate the roadway and spaced from the roadway.

28. The system of claim 25, wherein each of said sensors is structured and arranged to transmit information including an identification of said sensor.

29. The system of claim 25, wherein at least one of said sensors is arranged on a note adjacent the roadway.

30. The system of claim 25, wherein at least one of said sensors is arranged to measure friction of a surface of the roadway.

31. The system of claim 25, wherein at least one of said sensors is arranged to measure temperature of the roadway or moisture content of the roadway.

32. The system of claim 25, wherein said communications device comprises a cellular phone.

33. The system of claim 25, wherein said communications device is arranged to transmit the information via a satellite or the Internet to the remote location.

34. The system of claim 25, further comprising a location-determining system arranged on the vehicle for determining the location of the vehicle, said communications device being coupled to said location-determining system for transmitting the location of the vehicle to the remote location.

35. A method for monitoring driving conditions on a roadway using a vehicle, comprising the steps of:

arranging stationary mounting structures proximate the roadway;

arranging sensors in the mounting structures in a vicinity of the roadway and apart from the roadway, each sensor generating information about the roadway, travel conditions relating to the roadway or external objects on or in the vicinity of the roadway and being arranged to wirelessly transmit the information in response to an activation signal;

arranging at least one interrogator on the vehicle;

transmitting an activation signal from the at least one interrogator on the vehicle to the sensors to cause the sensors to wirelessly transmit the information to the at least one interrogator.

36. The method of claim 35, wherein the step of arranging the sensors in the vicinity of the roadway comprises the step of arranging at least one sensor on a pole adjacent the roadway.

37. The method of claim 35, further comprising the step of transmitting the information generated by the sensors and received by the at least one interrogator to a remote location via a cellular phone, a satellite or the Internet.

38. A driving condition monitoring system for a roadway, comprising:

sensors located on or in a vicinity of the roadway, said sensors being structured and arranged to generate information about the roadway, travel conditions relating to the roadway or external objects on or in the vicinity of the roadway and wirelessly transmit the information in response to an activation signal;

a receiver arranged on a vehicle for receiving information generated and transmitted by said sensors;

a transmitter arranged on the vehicle and coupled to said receiver for transmitting information received by said receiver to at least one remote location spaced from the vehicle; and at least one interrogator arranged on the vehicle for transmitting activation signals to said sensors to cause said sensors to wirelessly transmit the information to said receiver.

39. The system of claim 38, further comprising a location-determining system arranged on the vehicle for determining the location of the vehicle, said transmitter being coupled to said location-determining system and arranged to transmit the location of the vehicle.

40. The system of claim 38, further comprising additional sensors mounted on the vehicle and arranged to generate information on the status of the additional sensors, conditions of an environment around the vehicle, conditions of the vehicle and conditions of any occupants of the vehicle, said transmitter being coupled to said additional sensors and arranged to transmit the information generated by said additional sensors.

41. A method for monitoring driving conditions, comprising the steps of:

arranging sensors on or in a vicinity of the roadway, each sensor generating information about the roadway, travel conditions relating to the roadway or external objects on or in the vicinity of the roadway and being arranged to wirelessly transmit the information in response to an activation signal;

arranging a receiver on the vehicle for receiving information generated and transmitted by the sensors;

transmitting information received by the receiver from the vehicle to at least one remote location spaced from the vehicle; and transmitting an activation signal from the vehicle to the sensors to cause the sensors to wirelessly transmit information to said receiver.

42. The method of claim 37, further comprising the steps of arranging a location-determining system on the vehicle to determine the location of the vehicle and transmitting the location of the vehicle to the remote location.

43. The method of claim 37, further comprising the steps of:

mounting additional sensors on the vehicle;

generating information on the status of the additional sensors, conditions of an environment around the vehicle, conditions of the vehicle and conditions of any occupants of the vehicle by means of the additional sensors; and transmitting the information generated by the additional sensors to the remote location.

44. The system of claim 1, further comprising a communications device arranged on the vehicle and coupled to said at least one interrogator for establishing a bi-directional communications channel between the vehicle and a remote facility spaced from the vehicle such that the information generated by said sensors and received by said at least one interrogator is transmitted by said communications device over said communications channel to the remote location.

45. The method of claim 35, further comprising the steps of:

arranging a communications device on the vehicle and coupled to the at least one interrogator for establishing a bi-directional communications channel between the vehicle and a remote facility spaced from the vehicle; and transmitting the information generated by the sensors and received by the at least one interrogator from the communications device over the communications channel to the remote location.

46. A driving condition monitoring system for a vehicle on a roadway, comprising:

sensors located on or in a vicinity of the roadway, said sensors being structured and arranged to provide information about the roadway, travel conditions relating to the roadway or external objects on or in the vicinity of the roadway; and at least one interrogator arranged on the vehicle for receiving information obtained by said sensors and transmitted by said sensors using a wireless radio frequency mechanism, said at least one interrogator including at least one antenna arranged to receive at least one return signal transmitted by said sensors such that a position of the vehicle in a lane of the roadway relative to said sensors is determinable from analysis of the at least one return signal.

47. The system of claim 41, wherein said at least one interrogator includes two antennas spaced apart from one another and arranged such that a single return signal transmitted by each of said sensors is received at a different time at said two antennas such that the position of the vehicle in the lane of the roadway relative to said sensors is determinable from a comparison of the arrival time of the return signals received at said antennas.

48. The system of claim 41, wherein said sensors are embedded in the roadway.

49. A method for monitoring driving conditions on a roadway using a vehicle, comprising the steps of:

arranging sensors on or in a vicinity of the roadway, each sensor providing information about the roadway, travel conditions relating to the roadway or external objects on or in the vicinity of the roadway;

arranging at least one interrogator including at least one antenna on the vehicle;

transmitting a signal from the at least one interrogator to cause the sensors to transmit the information using a wireless radio frequency mechanism; and determining a position of the vehicle in a lane of the roadway relative to the sensors based on at least one return signal transmitted by the sensors and received by the at least one antenna.

50. The system of claim 49, wherein two antennas are arranged on the vehicle spaced apart from one another and arranged such that a single return signal transmitted by each of the sensors is received at a different time at the two antennas such that the position of the vehicle in the lane of the roadway relative to the sensors is determinable from a comparison of the arrival time of the return signals received at the antennas.

51. The method of claim 49, wherein the step of arranging the sensors on or in the vicinity of the roadway comprises the step of embedding at least one sensor in the roadway.

52. The system of claim 1, wherein said sensors are structured and arranged to generate and wirelessly transmit information about the roadway, travel conditions relating to the roadway and external objects on or in the vicinity of the roadway in response to the activation signal.

53. The system of claim 25, wherein said sensors are structured and arranged to generate and wirelessly transmit information about the roadway, travel conditions relating to the roadway and external objects on or in the vicinity of the roadway in response to the activation signal.

54. The system of claim 40, wherein said sensors are structured and arranged to generate information about the roadway, travel conditions relating to the roadway and external objects on or in the vicinity of the roadway and wirelessly transmit the information in response to the activation signal.

* * * * *